United States Patent
Jain et al.

(10) Patent No.: US 12,514,818 B2
(45) Date of Patent: *Jan. 6, 2026

(54) PHARMACEUTICAL COMPOSITIONS COMPRISING A FLOATING INTERPENETRATING POLYMER NETWORK FORMING SYSTEM

(71) Applicant: Tris Pharma, Inc., Monmouth Junction, NJ (US)

(72) Inventors: Paras Rameshlal Jain, Dayton, NJ (US); Sachin Vasant Chaudhari, Monmouth Junction, NJ (US)

(73) Assignee: TRIS PHARMA, INC., Monmouth Junction, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/955,373

(22) PCT Filed: Dec. 18, 2018

(86) PCT No.: PCT/US2018/066301
§ 371 (c)(1),
(2) Date: Jun. 18, 2020

(87) PCT Pub. No.: WO2019/126216
PCT Pub. Date: Jun. 27, 2019

(65) Prior Publication Data
US 2021/0015744 A1    Jan. 21, 2021

Related U.S. Application Data

(60) Provisional application No. 62/607,129, filed on Dec. 18, 2017.

(51) Int. Cl.
| | |
|---|---|
| A61K 9/00 | (2006.01) |
| A61K 9/16 | (2006.01) |
| A61K 9/51 | (2006.01) |
| A61K 31/197 | (2006.01) |
| A61K 47/58 | (2017.01) |

(52) U.S. Cl.
CPC .......... *A61K 9/0065* (2013.01); *A61K 9/1617* (2013.01); *A61K 9/1652* (2013.01); *A61K 9/1664* (2013.01); *A61K 9/5146* (2013.01); *A61K 31/197* (2013.01); *A61K 47/585* (2017.08)

(58) Field of Classification Search
None
See application file for complete search history.

(56) References Cited

U.S. PATENT DOCUMENTS

| | | |
|---|---|---|
| 3,138,525 A | 6/1964 | Koff |
| 3,499,960 A | 3/1970 | Macek et al. |
| 3,901,232 A | 8/1975 | Michaels et al. |
| 4,221,778 A | 9/1980 | Raghunathan |
| 4,352,891 A | 10/1982 | Quinlan |
| 4,393,236 A | 7/1983 | Klosa |
| 4,575,539 A | 3/1986 | DeCrosta et al. |
| 4,844,905 A | 7/1989 | Ichikawa et al. |
| 4,847,077 A | 7/1989 | Raghunathan |
| 4,996,047 A | 2/1991 | Kelleher et al. |
| 5,368,852 A | 11/1994 | Umemoto et al. |
| 5,604,927 A | 2/1997 | Moore |
| 5,780,057 A | 7/1998 | Conte et al. |
| 5,808,107 A | 9/1998 | Hollingsworth |
| 5,908,631 A | 6/1999 | Arnaud et al. |
| 5,972,389 A | 10/1999 | Shell et al. |
| 5,980,882 A | 11/1999 | Eichman |
| 5,990,162 A | 11/1999 | Scharf |
| 6,022,562 A | 2/2000 | Autant et al. |
| 6,120,803 A | 9/2000 | Wong et al. |
| 6,187,323 B1 | 2/2001 | Aiache et al. |
| 6,340,475 B2 | 1/2002 | Shell et al. |
| 6,488,962 B1 | 12/2002 | Barner et al. |
| 6,713,639 B1 | 3/2004 | Gurjar et al. |
| 7,294,347 B2 | 11/2007 | Menjoge et al. |
| 7,405,238 B2 | 7/2008 | Markey et al. |
| 7,413,751 B2 | 8/2008 | Devane et al. |
| 7,682,629 B1 | 3/2010 | Besse |
| 7,906,145 B2 | 3/2011 | Castan et al. |
| 7,910,133 B2 | 3/2011 | Castan et al. |
| 7,976,870 B2 | 7/2011 | Berner et al. |
| 8,062,667 B2 | 11/2011 | Mehta et al. |

(Continued)

FOREIGN PATENT DOCUMENTS

| | | |
|---|---|---|
| JP | 2008-174511 A | 7/2008 |
| WO | WO 2007/001300 A1 | 1/2007 |

(Continued)

OTHER PUBLICATIONS

Patil, Digest Journal of Nanomaterials and Biostructures, 5, 1, 2010 (Year: 2010).*

Guar, International Journal of Pharmacology and Pharmaceutical Sciences, 1, 2014 (Year: 2014).*

Banerjee S et al., Investigation on crosslinking density for development of novel interpenetrating polymer network (IPN) based formulation, Journal of Scientific and Industrial Research, 2010, 69(10):777-784.

Bhardwaj V et al., Interpenetrating Polymer Network (IPN): Novel approach in Drug delivery, Int. J. Drug Dev. Res., 4(3), Jul.-Sep. 2012.

Bhardwaj L et al., A Short Review on Gastro Retentive Formulations for Stomach Specific Drug Delivery: Special Emphasis on Floating In situ Gel Systems, African J of Basic & Applied Sciences, 2011, 3(6):300-312.

(Continued)

*Primary Examiner* — Susan T Tran
*Assistant Examiner* — William Craigo
(74) *Attorney, Agent, or Firm* — Howson & Howson LLP; Cathy A. Kodroff

(57) ABSTRACT

Drug delivery systems comprising a floating interpenetrating network (IPN) are provided. The pharmaceutical compositions contain at least one IPN forming system, at least one drug, and at least one gas generating agent, such that upon oral ingestion of the compositions, a floating IPN is formed in situ. These floating IPN provide extended release of the drug entrapped therein for at least about 3 hours.

17 Claims, 4 Drawing Sheets

(56) References Cited

U.S. PATENT DOCUMENTS

| | | | |
|---|---|---|---|
| 8,193,211 | B2 | 6/2012 | Liang et al. |
| 8,202,542 | B1 | 6/2012 | Mehta et al. |
| 8,263,650 | B2 | 9/2012 | Cook et al. |
| 8,277,843 | B2 | 10/2012 | Singh et al. |
| 8,287,848 | B2 | 10/2012 | Mehta et al. |
| 8,313,770 | B2 | 11/2012 | Pathak et al. |
| 8,318,210 | B2 | 11/2012 | Tengler et al. |
| 8,324,275 | B2 | 12/2012 | Cook et al. |
| 8,470,375 | B1 | 6/2013 | McMahen et al. |
| 8,512,759 | B1 | 8/2013 | McMahen et al. |
| 8,586,083 | B2 | 11/2013 | Mohammad |
| 8,591,922 | B1 | 11/2013 | Allphin et al. |
| 8,592,481 | B2 | 11/2013 | Berner et al. |
| 8,668,929 | B2 | 3/2014 | Han et al. |
| 8,747,902 | B2 | 6/2014 | Mehta et al. |
| 8,778,396 | B2 | 7/2014 | Pillay et al. |
| 8,790,700 | B2 | 7/2014 | Mehta et al. |
| 8,802,157 | B2 | 8/2014 | Berner et al. |
| 8,859,619 | B2 | 10/2014 | Cook et al. |
| 8,901,173 | B2 | 12/2014 | Allphin et al. |
| 9,000,046 | B2 | 4/2015 | Berner et al. |
| 9,132,107 | B2 | 9/2015 | Allphin et al. |
| 9,161,911 | B2 | 10/2015 | Hou |
| 9,301,934 | B2 | 4/2016 | Berner et al. |
| 9,439,851 | B2 | 9/2016 | Dharmadhkari et al. |
| 9,555,017 | B2 | 1/2017 | Allphin et al. |
| 9,566,258 | B2 | 2/2017 | Hou |
| 10,092,511 | B2 | 10/2018 | Castan et al. |
| 10,398,662 | B1 | 9/2019 | Allphin et al. |
| 11,337,919 | B2 | 5/2022 | Jain et al. |
| 11,337,920 | B2 | 5/2022 | Jain et al. |
| 11,666,546 | B2 | 6/2023 | Jain et al. |
| 2002/0034541 | A1 | 3/2002 | Valducci et al. |
| 2002/0037941 | A1* | 3/2002 | Lau ............... C08G 61/02 521/134 |
| 2003/0099711 | A1 | 5/2003 | Meadows et al. |
| 2004/0092455 | A1 | 5/2004 | Mamelak et al. |
| 2004/0219186 | A1 | 11/2004 | Ayres |
| 2005/0136114 | A1 | 6/2005 | Kulkarni et al. |
| 2006/0062844 | A1 | 3/2006 | Chenevier et al. |
| 2006/0210630 | A1 | 9/2006 | Liang et al. |
| 2007/0036843 | A1 | 2/2007 | Hirsh et al. |
| 2007/0148239 | A1 | 6/2007 | Hall et al. |
| 2007/0215511 | A1 | 9/2007 | Mehta et al. |
| 2009/0275530 | A1 | 11/2009 | Tester et al. |
| 2012/0076865 | A1 | 3/2012 | Allphin et al. |
| 2013/0142846 | A1* | 6/2013 | Lee ............... A61K 9/5084 424/400 |
| 2016/0128981 | A1* | 5/2016 | Chen ............... A61K 9/2027 514/417 |
| 2016/0228379 | A1 | 8/2016 | Kumar et al. |
| 2016/0317388 | A1 | 11/2016 | Bhargava et al. |
| 2021/0069136 | A1 | 3/2021 | Jain et al. |
| 2022/0241189 | A1 | 8/2022 | Jain et al. |
| 2022/0241190 | A1 | 8/2022 | Jain et al. |
| 2025/0099376 | A1 | 3/2025 | Jain et al. |
| 2025/0108005 | A1 | 4/2025 | Patil et al. |

FOREIGN PATENT DOCUMENTS

| | | |
|---|---|---|
| WO | WO 2007/010400 | 1/2007 |
| WO | WO 2007/109104 A3 | 9/2007 |
| WO | WO 2011/018582 | 2/2011 |
| WO | WO 2011/119839 A1 | 9/2011 |
| WO | WO 2012/107652 A1 | 8/2012 |
| WO | WO 2013/188413 A1 | 12/2013 |
| WO | WO2015/166473 A1 | 11/2015 |
| WO | WO 2015/186108 A1 | 12/2015 |
| WO | WO 2016/066256 A1 | 5/2016 |
| WO | WO-2016087952 A1 * | 6/2016 ............... A61K 9/10 |
| WO | WO 2019/126214 A1 | 6/2019 |
| WO | WO 2019/126215 A1 | 6/2019 |
| WO | WO 2019/126218 A1 | 6/2019 |

OTHER PUBLICATIONS

Hanninen K et al., Mechanistic evaluation of factors affecting compound loading into ion-exchange fibers, Eur. J. Pharm. Sci., 2007, 31(5): 306-317.

Koul V et al., Interpenetrating polymer network (IPN) nanogels based on gelatin and poly(acrylic acid) by inverse mini-emulsion technique: synthesis and characterization, Colloids Surf. B. Biointerfaces, 2011, 83(2):2014-213.

Koshmala JD et al., Preparation of interpenetrating networks of gelatin and dextran as degradable biomaterials, Biomaterials, 2000, 21(20) :2019-2023.

Landfester K et al., Synthesis of colloidal particles in miniemulsions, Annual Review of Materials Research, 2006, 36:231-279.

Lohani A et al., Interpenetrating Polymer Networks as Innovative Drug Delivery Systems, Journal of Drug Delivery, 2014, 2014:1-11.

Lu J et al., One-step synthesis of interpenetrating network hydrogels: Environment sensitivities and drug delivery properties, Saudi J. Biol. Sci. 2016, 2016(3):S22-S31.

Nirmal HB et al., In-Situ gel: New trends in Controlled and Sustained Drug Delivery System, Int. J. of PharmTech Research, 2010, 2(2):1398-1408.

Yashwantrao PA et al., A Raft Forming System: An Novel Approach for Gastroretention, Int. J. Pure App. Biosci., 2015, 3(4):178-192.

Shailaja P et al., A Review on Gastroretentive Drug Delivery System, International Journal of Research and Development in Pharmacy and Life Sciences, 2016, 5(4):2178-2187.

Sharma AR and Khan A, Gastroretentive Drug Delivery System: An Approach to Enhance Gastric Retention for Prolonged Drug Release, International Journal of Pharmaceutical Sciences and Research, 2014, 5(4):1095-1106.

Subrahmanyam PJ, Design and development of guar gum and borax crosslinked guar gum matrix tablets of theophylline for colon specific drug, Journal of Chemical and Pharmaceutical Research, 2012, 4(2):1052-1060.

Rajesh AM et al, Taste masking of ciprofloxacin by ion-exchange resin and sustain release at gastric-intestinal through interpenetrating polymer network, Asian Journal of Pharmaceutical Sciences, 2015, 10(2015):331-340.

Rajesh AM et al, Taste masking of ofloxacin and formation of interpenetrating polymer network beads for sustained release, Journal of Pharmaceutical Analysis, 2017, 7(2017):244-251.

El Nabarawi MA et al., Formulation, release characteristics, and bioavailability study of gastroretentive floating matrix tablet and floating raft system of Mebeverine HCl, Drug Design, Development and Therapy, 2017, 11:1081-1093.

Shah SH et al, Stomach Specific Floating Drug Delivery System: A Review, International Journal of PharmTech Research, 2009, 1(3):623-633.

Gupta KC and Ravi Kumar Mnv, Semi-interpenetrating polymer network beads of crosslinked chitosan-glycine for controlled release of chlorphenramine maleate, Journal of Applied Polymer Science, 2000, 76(5):672-683.

Qadri MF et al, Biomedical Applications of Interpenetrating Polymer Network System, Open Pharmaceutical Sciences Journal, 2015, 2: 21-30.

Sperling LH and Hu R, Interpenetrating Polymer Networks, Polymer Blends Handbook, 2003, 417-447.

Klempner et al, Interpenetrating Polymer Networks, Advances in Chemistry; American Chemical Society, 1994, 21-38.

Dolas RT et al, Raft Technology for Gatsro Retentive Drug Delivery, Human Journal, 2015, 3(1):232-252.

Prajapati VD et al, Raft forming system—An upcoming approach of gastroretentive drug delivery system, Journal of Controlled Release, 2013, 168(2):151-165.

Davis SS et al., Transit of Pharmaceutical Dosage Forms Through the Small Intestine, Gut, 1986, 27(8):886-892.

Broughton et al., Gamma-hydroxy-butyrate in the treatment of narcolepsy: a preliminary report, In: Guilleminault et al. (Eds.). Narcolepsy (Advances in sleep research. vol. 3.). Holliswood, NY: Spectrum Publications, pp. 659-667, Jan. 1976.

(56) References Cited

OTHER PUBLICATIONS

Flamel Technologies Announces Positive Results of a Second Clinical Trial with Micropump® Sodium Oxybate, Dec. 19, 2014, which reports achieving the objective of one single dose before bedtime.
Frucht et al., A Pilot Tolerability and Efficacy Trial of Sodium Oxybate in Ethanol-Responsive Movement Disorders, Movement Disorders, vol. 20(10):1330-1337, Jun. 2005.
Mamelak et al., The effects of [gamma]-hydroxybutyrate on sleep, Biol Psychiatry, vol. 12(2):273-288, Aug. 1976 (published 1977).
Arora S et al., Floating Drug Delivery Systems: A Review, AAPS PharmScieTech, 2005, 6(3):E372-E390.
Chen Y et al., Cubic and Hexagonal Liquid Crystals as Drug Delivery Systems, BioMed Research International, 2014:1-12.
Jain D et al., Recent technologies in pulsatile drug delivery systems, Biomatter, 2011, 1(1):57-65.
Kumar KK et al., Formulation and evaluation of floating in situ gelling system of losartan potassium, Der Pharmacia Lettre, 2015, 7(1):98-112.
Lam WK et al., Monocarboxylate Transporter-Mediated Transport of Gamma-Hydroxybutyric Acid in Human Intestinal Caco-2 Cells, Drug Metabolism and Disposition, 2010, 38(3):441-447.
Liechti ME et al., Pharmacokinetics and pharmacodynamics of gamma- hydroxybutyrate in healthy subjects, British Journal of Clinical Pharmacology, 2016, 81:980-988.
Madan JR et al., Development and evaluation of in situ gel of pregabalin, International Journal of Pharmaceutical Investigation, 2015, 5(4):226-233.
Patel DM et al., Formulation and Evaluation of Floating Oral In Situ Gelling System of Amoxicillin, ISRN Pharmaceutics, 2011.
Sajan J et al., Chromotherapeutics and Chronotherapeutic Drug Delivery Systems, Tropical Journal of Pharmaceutical Research, 2009, 8(5):467-475.
Vijaya C and Goud KS, Ion-activated In Situ Gelling Ophthalmic Delivery Systems of Azithromyin, Indian Journal of Pharmaceutical Sciences, 2011, 73(6):615-620.
Saito S et al., Combination of borane-dimehtyl sulfide complex with catalytic sodium tetrahydroborate as a selective reducing agent for alpha-hydroxy esters, versatile chiral building block from (s)-(-)-malic acid, Chemistry Letters, 1984, 1984:1389-1392.
Jain, U.S. Appl. No. 16/955,377, filed Jun. 18, 2020.
Jain, U.S. Appl. No. 16/955,389, filed Jun. 18, 2020.
Jain, U.S. Appl. No. 16/955,392, filed Jun. 18, 2020.
International Search Report and Written Opinion issued Apr. 3, 2019 in International Patent Application No. PCT/US2018/066301.
International Search Report and Written Opinion issued Apr. 3, 2019 in International Patent Application No. PCT/US2018/066303.
International Search Report and Written Opinion issued Apr. 15, 2019 in International Patent Application No. PCT/US2018/066300.
International Search Report and Written Opinion issued Apr. 2, 2019 in International Patent Application No. PCT/US2018/066299.
Thakral, S et al. Eudragit®: a technology evaluation *Expert Opinion on Drug Delivery*, Oct. 26, 2012, 10(1): 131-149.
Sing, I. et al. Ion Exchange Resins: Drug Delivery and Therapeutic Applications *FABAD J. Pharm. Sci.*, Jul. 2006, 32: 91-100.
Non-Final Office Action, dated Jun. 30, 2021, issued in U.S. Appl. No. 16/955,392, and response.
Non-Final Office Action, dated Jul. 7, 2021, issued in U.S. Appl. No. 16/955,377, and response.
Notice of Allowance, dated Feb. 3, 2022, issued in U.S. Appl. No. 16/955,377.
Notice of Allowance, dated Jan. 26, 2022, issued in U.S. Appl. No. 16/955,392.
Office Action issued in European Patent Application No. 18834152.3, dated May 14, 2021, and response.
Office Action issued in European Patent Application No. 18834153.1, dated May 14, 2021.
Office Action issued in European Patent Application No. 18840118.6, dated May 31, 2021, and response.
Non-Final Office Action, dated Mar. 21, 2022, issued in U.S. Appl. No. 16/955,389, and response.
Final Office Action, dated Sep. 16, 2022, issued in U.S. Appl. No. 16/955,389, and response.
Office Action issued in European Patent Application 18834152.3, dated Nov. 10, 2022, and response.
Office Action issued in Israeli Patent Application 275312, dated Dec. 1, 2022, and response.
Office Action issued in European Patent Application 18840118.6, dated Nov. 10, 2022, and response.
Office Action issued in Chinese Patent Application 201880089838.9, dated Feb. 28, 2023.
Office Action issued in Israeli Patent Application 275444, dated Dec. 11, 2022, and response.
Office Action issued in European Patent Application 18834153.1, dated Nov. 10, 2022, and response.
Office Action issued in Japanese Patent Application 2020-554387, dated Oct. 12, 2022.
Non-Final Office Action, dated Oct. 24, 2023, issued in U.S. Appl. No. 17/725,677.
Office Action issued in Canadian Patent Application 3,097,737, issued Sep. 27, 2023, and response.
Office Action issued in European Patent Application 18834152.3, dated Nov. 11, 2023.
Office Action issued in Canadian Patent Application 3,085,941, issued Sep. 27, 2023, and response.
Office Action issued in European Patent Application 18840118.6, dated Dec. 5, 2023.
Non-Final Office Action, dated Nov. 7, 2023, issued in U.S. Appl. No. 17/725,673.
Office Action issued in Israeli Patent Application 275444, dated Jan. 30, 2024.
Final Rejection issued in Japanese Patent Application 2020-554387, dated Jun. 2, 2023.
Office Action issued in European Patent Application 18834153.1, dated Nov. 24, 2023.
Office Action issued in Canadian Patent Application 3,086,153, issued Sep. 27, 2023, and response.
Examination Report issued in Australian Patent Application 2018388577, issued Nov. 8, 2023.
Office Action issued in Chinese Patent Application 201880089838.9, dated Aug. 23, 2023.
Office Action issued in Chinese Patent Application 201880089838.9, dated Jan. 10, 2024.
Notice of Allowance issued in Israeli Patent Application No. 275444, dated May 19, 2024.
Notice of Allowance issued in U.S. Appl. No. 17/725,677, dated Sep. 10, 2024.
Notice of Acceptance issued in Australian Patent Application No. 2018388577, dated May 22, 2024.
Notice to Grant Patent Right issued in Chinese Patent Application No. 201880089838.9, dated Jun. 3, 2024.
Office Action issued in Canadian Patent Application 3,086,153, issued Jun. 3, 2024.
Office Action issued in Canadian Patent Application 3,097,737, issued May 29, 2024, and response.
Office Action issued in Canadian Patent Application 3,085,941, issued May 28, 2024, and response.
Office Action issued in European Patent Application 18834152.3, dated Feb. 27, 2025.
Office Action issued in European Patent Application 18840118.6, dated Apr. 17, 2025.
Restriction Requirement, dated Jun. 18, 2025, issued in U.S. Appl. No. 18/302,525.
Non-Final Office Action, dated Feb. 14, 2025, issued in related U.S. Appl. No. 17/725,673.
Office Action issued in European Patent Application 18834153.1, dated Feb. 27, 2025.

* cited by examiner

PHARMACEUTICAL COMPOSITIONS COMPRISING A FLOATING INTERPENETRATING POLYMER NETWORK FORMING SYSTEM

CROSS-REFERENCE TO RELATED APPLICATIONS

This is a National Stage Entry under 35 U.S.C. 371 of International Patent Application No. PCT/US2018/066301, filed Dec. 18, 2018, which claims priority to U.S. Provisional Patent Application No. 62/607,129, filed Dec. 18, 2017. These applications are incorporated by reference herein.

BACKGROUND OF THE INVENTION

The present invention relates to the field of drug delivery systems.

Interpenetrating polymer networks (IPNs) based on biocompatible and biodegradable materials have been described as a suitable approach for drug delivery where controlled release is desired. An IPN is a combination of at least two polymers, each exhibiting different characteristics. An IPN is formed when at least one polymer network is synthesized or crosslinked independently in the presence of a second other polymer without any covalent bonds forming between them. Typically, an IPN is not formed from normal mixing of two or more polymers.

There are literature reports of different applications of IPNs in the field of drug delivery. IPN based drug delivery systems under development include microspheres, transdermal membranes, sustained release tablets, hydrogel capsules, nanoparticles, sheets for wound dressings, sponges for wound dressings, films, bioengineered tissue, bone substitutes, cartilage scaffolds, calcifiable matrix systems with potential applications in plastic surgery, [Bhardwaj Vineet et al, Interpenetrating Polymer Network (IPN): Novel approach in Drug delivery, International Journal of Drug Development and Research, July-September 2012/Vol 4/Issue 3.]. IPN based drug delivery systems are designed to deliver drugs in zero-order pattern with minimum fluctuation. See, V Bhardway, et al, International J Drug Dev & Research, Vol. 4, Issue 3, July-September 2012.

Gastroretentive drug delivery systems based on floating rafts have been described in the literature. Certain raft systems are floating, which contain a polymer and gas generating agent, designed to delay clearance of the raft system from the stomach. Different raft forming approaches discussed in the prior art include: swelling based raft formation, temperature dependent gelling based raft formation, pH dependent gelling agent based raft formation, ionic cross-linking based raft formation [Pawar Ashish Yashwantrao et al, A Raft forming system: A Novel approach for gastro-retention, Int. J. Pure App. Biosci. 3 (4): 2015 (178-192).] However, Raft formation has been applied in drug delivery field with limited success. Lack of flexibility in tailoring properties so as to impart desired attributes to the resulting raft poses significant limitation on practical applications of current raft forming approaches.

Suitable approaches to raft forming much take into account the gastrointestinal tract physiology. The stomach primarily aims at processing and transporting food. The stomach provides for short term food reservation and quick consumption of relatively large meal. The primary substantial metabolism of enzymes is promoted in stomach of proteins. The peristalsis of stomach mixes up and grinds consumed food with secretions of the stomach, turning food in simplified liquid form. The liquefied bulk is transported to the small intestine for further digestion. The human anatomy categorizes stomach in three main parts: fundus, body and antrum (pylorus). The proximal portion referred to as fundus and the body functions as storage for undigested food. The antrum provides for the main site for mixing motions and acts as gastric emptying pump by propeller actions. See, Sharma and Khan, Intl J Pharm Sci Res, 2014; Vol 5(4): 1095-1106. The contents of stomach are emptied into duodenum at frequent intervals via a process called gastric emptying. Gastric emptying involves sequence of events (stomach and intestine motility patterns) which are repeated at frequent intervals. Both the fasting and fed states cause gastric emptying. However, the two states are varied upon pattern of motility. Food delays gastric emptying significantly. In this phenomenon, series of electric events takes place in cycles via stomach and intestine every 2 to 3 hours. There occurs a phenomenon of interdigestive myoelectric cycle or migrating myoelectric cycle (MMC), which is divided in 4 phases. The 4 phases are enumerated below (Shailaja pant et al, A Review on Gastroretentive Drug Delivery System, International Journal of Research and Development in Pharmacy and Life Sciences June-July, 2016, Vol. 5, No. 4, pp 2178-2187). More particularly, as described therein, Phase I, the basal phase, lasts from 30 to 60 minutes with rare contractions and is characterized by a lack of secretory, electrical, and contractile activity. Phase II, pre-burst phase, lasts for 20 to 40 minutes with intermittent contractions, during which contractile motions increase in frequency and size. Phase III, burst phase, lasts for 10 to 20 minutes with intense and regular contractions for short period, termed housekeeper waves that sweep off undigested food. Phase IV lasts for 0 to 5 minutes and is the transition period between Phases III and I. Phase III corresponds opening of pyloric valve to fullest To effectively prolong the retention of dosage form in upper GIT, the Raft must possess attributes of floating, swelling, integrity or resiliency and sustained drug release. Floating keeps raft buoyant on biological fluid for longer time periods. Swelling to a size larger than pyloric valve is critical to prevent emptying of raft into duodenum following the gastric emptying process. Raft must possess enough integrity or resiliency to withstand the agitations induced by peristaltic movements and other phases of the interdigestive myoelectric cycle or migrating myoelectric cycle (MMC). While achieving all three attributes, the raft must effectively entrap drug containing particles and provide sustained drug release over targeted period of time. Lack of flexibility in tailoring properties of the raft to achieve desired attributes of swelling, floating, integrity and sustained release poses serious limitation on properties of traditional raft forming approaches. The main reason lies in the fact properties of the raft depend upon the properties of the polymer used for making the raft.

Since there is limitation on number of materials forming the raft, there is limitation on properties/attributes which can be imparted to the raft.

SUMMARY OF THE INVENTION

In one aspect, an orally administrable extended release composition which comprises a floating inter-penetrating network (IPN) forming system comprising at least one biologically active moiety selected from a drug, a nutraceutical, a vitamin, a protein, enzyme and/or hormone and an IPN forming polymer blend is provided, with the proviso that the composition does not include a gamma hydroxybutyrate or its salts, hydrates, tautomers, or solvates, or complexes thereof.

In one aspect, the composition comprises a floating interpenetrating network (IPN) forming system. The composition comprises at least one biologically active moiety (e.g., a drug, a nutraceutical, a vitamin, a protein, enzyme and/or hormone), with the proviso that the composition does not include a gamma hydroxybutyrate or its salts, hydrates, tautomers, or solvates, or complexes thereof. The composition further contains a non-toxic gas generating agent and an inter-penetrating network (IPN) forming blend which self-assembles into a floating IPN in situ following oral ingestion. The IPN forming blend comprises (i) at least two polymers which are capable of cross-linking comprising at least one IPN forming anionic polymer and/or at least one IPN forming galactomannan polysaccharide; (ii) at least one cross-linking agent which interacts non-covalently e.g., ionically with the at least two polymers to promote crosslinking in situ, and an optional IPN or a semi-IPN which further cross-links in situ, and one or more optional excipients; wherein following oral ingestion, the composition provides a floating IPN which comprises the polymers individually crosslinked to crosslinking agent/s but not to each other, the biologically active moiety (e.g., drug) and the non-toxic gas entrapped therein, thereby providing a floating IPN which controls release of the moiety (e.g., drug(s)). In certain embodiments, the two or more IPN-forming polymers are capable of cross-linking individually to crosslinking agent/s but not to each other via non-covalent bonds, e.g., via ionic bonds. Preferably, the composition is a powder which is reconstituted under conditions which restrict the aqueous component (e.g., water, suspension base, etc.) in order to provide optimal floating IPN properties. In certain embodiments, a product is provided which comprises a floating IPN powder composition for reconstitution in water or an aqueous suspension base comprising a ratio of the (a) powder composition to (b) water of 1:0.1 to 1:15, or 1:0.5 to 1:10, or 1:2 to 1:7. In certain embodiments, the product reconstituted according to these powder:water ratios is a suspension (e.g., at a solid content of less than 20 wt %), a pudding or a paste (e.g., at a solids content of 20 wt % to 50 wt %).

In certain embodiments, the composition self-assembles into a floating IPN in situ following oral ingestion. In certain embodiments, the floating IPN forming system comprises: (i) two or more IPN-forming polymers comprising at least one IPN forming anionic polymer and/or at least one IPN forming galactomannan polysaccharide; (ii) at least one cross-linking agent which interacts with the at least one IPN forming anionic polymer or galactomannan (i) to form an IPN; and (iii) a non-toxic gas generating agent, wherein the gas generating agent forms a non-toxic gas when exposed to stomach acid, wherein following oral ingestion, the composition provides a floating IPN which comprises the at least one moiety and the non-toxic gas entrapped therein, thereby providing a floating IPN. In certain embodiments, the composition IPN forming blend comprises a partially formed IPN or a semi-IPN which further cross-links in situ.

In certain embodiments, the orally administrable composition comprises: (a) at least one anionic polymer, at least one galactomannan, and at least two cross linking agents; (b) at least two anionic polymers and at least one cross linking agent; (c) at least one galactomannan, at least one anionic polymer, at least one non-ionic polymer and at least two cross linking agents; (d) at least one galactomannan, at least two anionic polymers, at least one non-ionic polymer and at least two cross linking agents; (e) at least two galactomannan polymers and at least one cross linking agent; (f) at least two galactomannan polymers, at least one anionic polymer and at least two cross linking agents; (g) at least two galactomannan polymers, at least one anionic polymer, at least one non-ionic polymer and at least two cross linking agents; (h) at least two galactomannan polymers, at least one non-ionic polymer and at one cross linking agent; (i) at least one anionic polymer, at least one galactomannan, and at least two cross linking agents at least one of which is pH dependent cross-linking agent; (j) at least two galactomannan polymers, at least one anionic polymer and at least two cross linking agents wherein at least one cross-linking agent is pH-dependent; or (k) at least two galactomannan polymers, at least one anionic polymer, at least one non-ionic polymer and at least two cross linking agents wherein at least one cross-linking agent is pH-dependent.

In certain embodiments, the composition is a tablet, pellet, or capsule. In other embodiments, the composition is a powder. In yet other embodiments, the composition is a powder for suspension (POS) or a suspension. In other embodiments, a composition of the invention is a suspension. In yet another embodiment, the composition is a powder to be reconstituted in the form of pudding. In yet another embodiment, the composition is a powder to be reconstituted in the form of paste. In yet another embodiment, composition is a POS in sachet supplied along-with suspension base in glass bottle. A powder comprising the biological moiety for delivery, the IPN forming blend, at the at least one gas generating agent may be reconstituted with (dissolved and/or dispersed in) an aqueous suspension base (e.g., purified water, or water with excipients.

In one aspect, an orally administrable composition is provided which comprises at least one biologically active moiety selected from a drug, a nutraceutical, a vitamin, a protein, enzyme and/or hormone, and a floating IPN forming system, wherein the IPN forming blend comprises at least one semi-IPN comprising at least one of a cross-linked IPN forming anionic polymer or a crosslinked galactomannan; and at least one cross-linking agent for the at least one IPN forming anionic polymer or galactomannan, wherein following oral ingestion, the semi-IPN is further cross-linked in situ by the cross-linking agent to afford a full-IPN comprising the at least one moiety compound and a non-toxic gas entrapped therein, provided that the composition does not include a gamma hydroxybutyrate or its salts, hydrates, tautomers, or solvates, or complexes thereof. However, with this proviso, more than one drug (or other biological moiety) and/or more than one form of a drug may be in a composition.

In one aspect, an orally administrable composition is provided which comprises at least one biologically active moiety selected from a drug, a nutraceutical, a vitamin, a protein, enzyme and/or hormone, and at least one non-toxic gas generating agent, and an IPN forming blend, wherein the IPN forming blend comprises: at least one of a cross-linked IPN forming anionic polymer or a crosslinked galactomannan; and at least one cross-linking agent for the at least one IPN forming anionic polymer or galactomannan, wherein following oral ingestion, at least one polymer network of the IPN is further cross-linked in situ by the cross-linking agent comprising the at least one moiety compound and non-toxic gas entrapped therein, provided that the composition does not include a gamma hydroxybutyrate or its salts, hydrates, tautomers, or solvates, or complexes thereof.

In certain embodiments, an orally administrable composition is provided which comprises at least one drug (or other moiety) and a floating IPN forming system comprising at least one non-toxic gas generating agent, two or more anionic polymers, and at least one cross-linking agent, provided that the composition does not include a gamma hydroxybutyrate or its salts, hydrates, tautomers, or solvates, or complexes thereof. In certain embodiments, the composition comprises two or more anionic polymers comprise 10 wt % to 40 wt % of the composition, based on the total dry components (e.g., powder blend). In certain embodiments, the anionic polymers are selected from pectin, gellan gum and/or carrageenan. In certain embodiments, the cross-linking agent(s) comprises about 5 wt % to 15 wt %, or 5 wt % to 12 wt %, or about 11 wt % or 6 wt % to 8 wt %, or about 7 wt % of the composition based on the total dry components (e.g., powder blend). In certain embodiments, the gas generating agent(s) comprises about 5 wt % to about 15 wt %, or about 7 wt % to about 12 wt %, or about 7 wt %, or about 11 wt % of the composition based on the total dry components (e.g., powder blend). In certain embodiments, the gas generating agent is a bicarbonate. In certain embodiments, the bicarbonate is a potassium bicarbonate. In certain embodiments, the remainder of the composition comprises excipients such as diluents, binders, disintegrating agents, and the like.

In certain embodiments, a composition as provided herein comprises an interpenetrating forming blend which comprises an IPN or a semi-IPN which further cross-links in situ.

In other embodiments, use of a composition as provided herein in treating a subject with a selected drug is provided. In further embodiments, a method for extending the gastric residence and/or release of a drug is provided, which comprises delivering the drug in a composition of the invention.

Still other aspects and advantages of the invention will be apparent from the following detailed description of the invention.

BRIEF DESCRIPTION OF THE DRAWINGS

FIG. 1A provides an overview of the digestive system, including the stomach, duodenum and jejunum. FIG. 1B provides an enlarged schematic of the stomach, illustrating the entry to the stomach from the esophagus and the exit from the stomach through the pyloric valve into the duodenum. Within the stomach, the floating of the IPN on the gastric fluid is illustrated at different times post-administration, including "floating" and when it "sinks" following drug release in order to clear through the pyloric valve.

DETAILED DESCRIPTION OF THE INVENTION

Figure 1A:
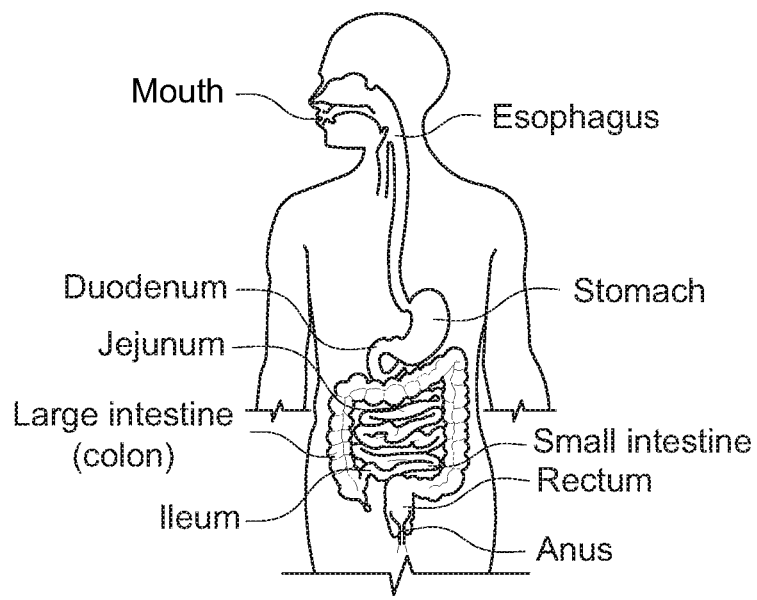
FIGS. 1A and 1B provide schematics of the human gastrointestinal system.

Compositions comprising floating IPN forming systems are provided which comprise at least one interpenetrating network forming system and at least one gas generating agent. In certain embodiments, the composition containing at least one biologically active moiety, desired for retention in the stomach and/or for which absorption in the upper gastro-intestinal tract (GIT) is desired. In certain, the embodiments, the compositions may contain at least one drug-ion exchange resin complex coated with a modified release barrier, at least one IPN forming system interpenetrating network, at least one gas generating agent and excipients. The compositions comprising floating IPN forming systems as provided herein can be formulated into a variety of dosage forms including, e.g., tablets, pellets, capsules, powders for suspension (POS) and/or suspensions. These compositions are particularly well suited for extended release compositions. In certain embodiments, the compositions do not include a gamma hydroxybutyrate, its salts, hydrates, tautomers, or solvates, or complexes thereof. The compositions comprising floating IPN forming systems as provided herein can be formulated into a variety of dosage forms including, e.g., tablets, pellets, capsules, powders for suspension (POS) and/or suspensions. These compositions are particularly well suited for extended release compositions.

In one aspect, an orally administrable extended release composition which comprises a floating inter-penetrating network (IPN) forming system comprising at least one non-toxic gas generating agent and an IPN forming polymer blend is provided. Suitably, the drug is not a gamma hydroxybutyrate or a salt, hydrate, tautomer, solvate, or complex thereof. In certain embodiments, the composition contains a drug-ion exchange resin complex, optionally coated with a modified release coating. In certain embodiments, the composition contains two or more drug ion exchange resin complexes which are different (e.g., uncoated and coated, coated with two different coating thicknesses or layers, etc.).

In one aspect, the composition comprises a floating inter-penetrating network (IPN) forming system. The composition comprises at least one drug or other biological moiety which is not a gamma hydroxybutyrate or a salt, hydrate, tautomer, or solvate, or complex thereof as the active pharmaceutical ingredient. The composition further contains a non-toxic gas generating agent and an inter-penetrating network (IPN) forming blend which self-assembles into a floating IPN in situ following oral ingestion. The IPN forming blend comprises (i) at least two polymers which are capable of cross-linking comprising at least one IPN forming anionic polymer and/or at least one IPN forming galactomannan polysaccharide; (ii) at least one cross-linking agent which interacts non-covalently e.g., ionically with the at least two polymers to promote crosslinking in situ, and an optional IPN or a semi-IPN which further cross-links in situ, and one or more optional excipients; wherein following oral ingestion, the composition provides a floating IPN which comprises the polymers individually crosslinked to crosslinking agent/s but not to each other, the gamma hydroxybutyrate drug and the non-toxic gas entrapped therein, thereby providing a floating IPN which controls release of the drug(s). In certain embodiments, the two or more IPN-forming polymers are capable of cross-linking individually to cross-linking agent/s but not to each other via non-covalent bonds, e.g., via ionic bonds. Preferably, the composition is a powder which is reconstituted under conditions which restrict the aqueous component (e.g., water, suspension base, etc.) in order to provide optimal floating IPN properties. In certain embodiments, a product is provided which comprises a floating IPN powder composition for reconstitution in water or an aqueous suspension base comprising a ratio of the (a) powder composition to (b) water of 1:0.1 to 1:15, or 1:0.5 to 1:10, or 1:2 to 1:7. In certain embodiments, the product reconstituted according to these powder:water ratios is a suspension (e.g., at a solid content of less than 20 wt %), a pudding or a paste (e.g., at a solids content of 20 wt % to 50 wt %).

As used herein, the term "biologically active moiety" or "biologically useful moiety" may include an "active pharmaceutical ingredient" or "API), a nutraceutical, a vitamin or other desired moiety. As used herein, an API is any substance or mixture of substances intended to be used in the manufacture of a drug product and that, when used in the production of a drug, becomes an active ingredient in the drug product. Thus, an AP may be, e.g., one or more small molecule drugs, cancer therapeutics, or biologics (e.g., hormones, enzymes, peptides, polypeptides, antibodies, antibody fragments, single domain antibody, etc.)). Small molecule drugs are generally under about 900 daltons in molecular weight and may be a free base or acid drug or a pharmaceutically acceptable salt, solvate, or hydrate, thereof. In certain embodiments, a biologically useful moiety is in a particle or granule. In certain embodiments, such particles or granules may contain one or more drug-ion exchange resin complexes. In certain embodiments, such particles or granules contain excipients. In certain embodiments, such biologically active moieties (and/or complexes, particles or granules containing same) may be uncoated, or coated with a modified release coating. Unless otherwise specified, where the term "drug" is used in this specification, another biologically active moiety may be substituted. It will further be understood that unless otherwise specified, more than one drug may be used. In certain embodiments, the compositions provided herein do not include a gamma hydroxybutyrate, its salts, hydrates, tautomers, or solvates, or complexes thereof. In certain embodiments, the biologically active moiety is about 0.1% w/w % to 90% w/w, about 0.1% w/w to about 80% w/w, about 1% w/w to 75% w/w, or about 1% w/w to about 60% w/w, or about 10% w/w to about 80% w/w, or about 15% w/w to about 80% w/w, or about 15% w/w to about 60% w/w based on the total weight of the solids in the final dosage form.

A "drug-ion exchange resin complex" refers to the product resulting from loading at least one drug onto an ion exchange resin. Methods for preparing such complexes have been described, e.g., in WO 2007/109104 and US 2007/0215511A1, incorporated herein by reference. In certain embodiments, this describes the complexation which occurs when the active drug(s) and the ion exchange resin are mixed together in an aqueous medium to facilitate the "exchange" between a salt of the drug and the "ion" of the ion exchange resin and the formation of the complex. Unless otherwise specified, a drug-ion exchange resin complex may be uncoated or coated. In certain embodiments, a drug-ion exchange resin complex may have two or more different drugs complexed to the same ion exchange resin. Additionally, or alternatively, compositions provided herein, may contain two different drug-ion exchange resin complexes. In certain embodiments, a drug—in exchange resin complex does not contain a gamma hydroxybutyrate, its salts, hydrates, tautomers, or solvates, or complexes thereof.

Suitable moieties are described in more detail below. In certain, the embodiments, the compositions may contain at least one biologically active moiety, e.g., a drug or a pharmaceutically acceptable salt thereof, or a drug-ion exchange resin complex coated with a modified release barrier, at least one interpenetrating network forming system, at least one gas generating agent and excipients.

Figure 1B:
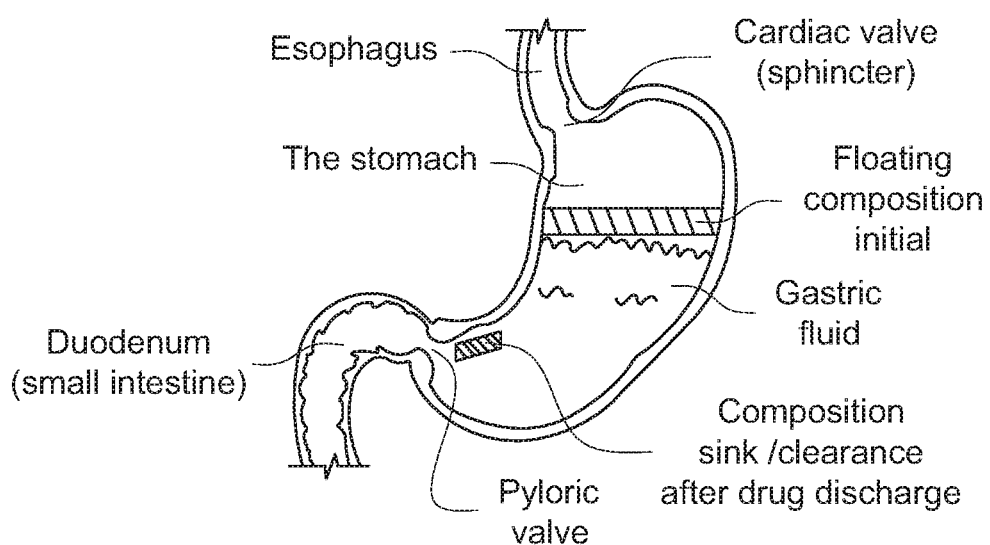

The compositions comprising floating IPN forming systems provide, following dosing, an IPN which floats in acidic pH by entrapping a non-toxic gas into an interpenetrating network. Such non-toxic gas can be generated by gas generating agent after interacting with stomach acid. The present inventors have found that such a floating IPN can entrap one or more APIs or any API salts or API-ion exchange resin complexes optionally granulated and/or coated with release retarding agent (or another biological moiety as described herein). In certain embodiments, this provides products containing at least one moiety that exhibits faster and greater absorption in upper part of gastrointestinal tract (upper GIT). See, e.g., FIG. 1.

As used throughout the specification, the "upper part of the GI tract" for absorption includes the stomach, duodenum and jejunum.

Without wishing to be bound by theory, the prolonged retention of the drug(s) in the floating IPN is believed this is due to the fact that the floating IPN is larger than the pyloric valve and desired integrity/resiliency to withstand agitations induced by peristaltic movement. Further, the floating IPN provide modified drug release profile up from at least 2 hours to up to 24 hours; in certain embodiments, drug release is at least about 3 hours to 24 hours, at least about 6 hours, at least about 8 hours, or at least about 12 hours, or for other desired time periods.

In one aspect, an orally administrable modified release composition is provided which comprises a floating interpenetrating network (IPN) forming system comprising at least one biologically active moiety, at least one non-toxic gas generating agent, and an IPN blend which comprises: (i) at least one IPN forming anionic polymer or at least one IPN forming galactomannan polysaccharide; and (ii) at least one cross-linking agent which interacts with the at least one IPN forming anionic polymer or galactomannan (i) to form an IPN; wherein the gas generating agent forms a non-toxic gas when exposed to stomach acid, wherein following oral ingestion, the composition provides a floating IPN which comprises the at least one moiety and the non-toxic gas entrapped therein, thereby providing a floating IPN. In certain embodiments, composition does not include a gamma hydroxybutyrate and its salts, hydrates, tautomers, or solvates, or complexes thereof.

In certain embodiments, a product is an extended release powder for reconstitution comprising (a) a composition comprising the floating IPN forming system and (b) water wherein the ratio, by weight, of the composition to water is 1:0.1 to 1:15, or 1:0.5 to 1:10, or 1:2 to 1:7.

In certain embodiments, the orally administrable drug composition comprises: (a) at least one anionic polymer, at least one galactomannan, and at least two cross linking agents; (b) at least two anionic polymers and at least one cross linking agent; (c) at least one galactomannan, at least one anionic polymer, at least one non-ionic polymer and at least two cross linking agents; (d) at least one galactomannan, at least two anionic polymers, at least one non-ionic polymer and at least two cross linking agents; (e) at least two galactomannan polymers and at least one cross linking agent; (f) at least two galactomannan polymers, at least one anionic polymer and at least two cross linking agents; (g) at least two galactomannan polymers, at least one anionic polymer, at least one non-ionic polymer and at least two cross linking agents; (h) at least two galactomannan polymers, at least one non-ionic polymer and at one cross linking agent; (i) at least one anionic polymer, at least one galactomannan, and at least two cross linking agents; (j) at least one anionic polymer, at least one galactomannan, and at least two cross linking agents at least one of which is pH dependent cross-linking agent; (k) at least one galactomannan, at least one anionic polymer, at least one non-ionic polymer and at least two cross linking agents; (l) at least one galactomannan polysaccharide, at least two anionic polymers, at least one non-ionic polymer and at least two cross linking agents; (m) at least two galactomannan polymers, at least one anionic polymer and at least two cross linking agents; or (n) at least two galactomannan polymers, at least one anionic polymer, at least one non-ionic polymer and at least two cross linking agents.

In one aspect, an orally administrable composition is provided which comprises an inter-penetrating network (IPN) forming system formed in situ comprising at least one biologically active moiety and at least one non-toxic gas generating agent, wherein the composition comprises: (a) at least one biologically active moiety; (b) at least one semi-IPN comprising at least one of a cross-linked IPN forming anionic polymer or a crosslinked galactomannan; and (ii) at least one cross-linking agent for the at least one IPN forming anionic polymer or galactomannan, wherein following oral ingestion, the semi-IPN is further cross-linked in situ by the cross-linking agent to afford a fully cross-linked IPN comprising the at least one moiety compound and non-toxic gas entrapped therein. In certain embodiments, the composition does not include a gamma hydroxybutyrate and its salts, hydrates, tautomers, or solvates, or complexes thereof.

In one aspect, an orally administrable composition is provided which comprises an floating IPN forming system comprising at least one biologically active moiety selected from a drug, a nutraceutical, a vitamin, a protein, enzyme and/or hormone, at least one non-toxic gas generating agent, and an IPN forming blend, wherein the IPN forming blend comprises at least one IPN comprising at least one of a cross-linked IPN forming anionic polymer or a crosslinked galactomannan; and (ii) at least one cross-linking agent for the at least one IPN forming anionic polymer or galactomannan, wherein following oral ingestion, at least one polymer network of the IPN is further cross-linked in situ by the cross-linking agent to form IPN having greater cross-linked networks comprising the at least one moiety compound and non-toxic gas entrapped therein, provided that the composition does not include a gamma hydroxybutyrate or its salts, hydrates, tautomers, or solvates, or complexes thereof. Optionally, the an inter-penetrating network (IPN) blend may contain an IPN or a semi-IPN which further cross-links in-situ.

In certain embodiments, a product is an extended release powder for reconstitution comprising (a) a composition comprising the floating IPN forming system and (b) water wherein the ratio, by weight, of the composition to water is 1:0.1 to 1:15, or 1:0.5 to 1:10, or 1:2 to 1:7.

In other embodiments, use of a composition as provided herein in treating a subject with a selected drug is provided. In further embodiments, a method for extending the gastric residence and/or release of a drug is provided, which comprises delivering the drug in a composition of the invention.

In one aspect, an orally administrable composition is provided which comprises a "floating inter-penetrating network (IPN) forming system" comprising at least one non-toxic gas generating agent and an IPN forming polymer blend. The non-toxic gas generating agent produces a gas in the presence of an acid (e.g., stomach acid or an acid of equivalent pH, i.e., a pH of about 1.5 to about 4) to produce a gas. The gas is generated following reaction with the acid and is non-toxic and physiologically compatible. The resulting gas is entrapped within the IPN to afford a floating IPN formed in situ.

This composition comprising a floating IPN forming system provides advantages over the prior art, which utilize polymer blends. By cross-linking the polymers in presence of each other, the resulting floating IPN/semi-IPN having unique properties. Also entrapped within the floating IPN is one or more drugs. The floating IPN provides prolonged gastric retention for these moieties. These features are discussed in more detail below.

As used herein, an "IPN forming blend" or "IPN forming polymer blend" refers to the combination of at least two polymers and at least one cross-linking agent which cross-link with the polymers to form an IPN in situ, and an optional IPN or a semi-IPN which further cross-links in situ, and one or more optional excipients. Suitably, the composition comprises at least one drug and/or biologically active moiety which is trapped within the floating IPN formed in situ. Preferably, the polymers do not covalently cross-link with each other, but cross-link via the cross-linking agent.

As provided herein, a "floating IPN" comprises a full IPN and entrapped gas. Suitably, the floating IPN further contains the active drug(s).

As used herein, a "interpenetrating polymer network (IPN)" forming system useful in a composition as provided herein comprises two or more polymer networks which are at least partially interlocked on a molecular scale but not covalently bonded to each other and cannot be separated unless chemical bonds are broken. An IPN may be formed sequentially, i.e., in sequential IPN the second polymeric network is formed following the completion of formation of first polymeric network. Alternatively, an IPN may be formed simultaneously, i.e., prepared by a process in which all polymer networks are formed concurrently.

As used herein a "semi IPN" refers to an IPN system wherein less than all the polymer networks are interlocked on a molecular scale. For example, in an IPN system containing two polymer/polysaccharide components which can be crosslinked, a semi-IPN would reference the system when only one of the two components is crosslinked (networked). For example, in an IPN system containing two crosslinkable polymer/polysaccharide components which can be crosslinked, a semi-IPN would reference the system when only one of the two polymer components is cross-linked (networked). A composition as provided herein, suitable for oral ingestion, may contain a fully crosslinked (full IPN), or a semi IPN.

In certain embodiments, an IPN may be formed, isolated in-vitro and then used in composition comprising the drug(s) or other biological moiet(ies) as provided herein. Additionally, or alternatively, a semi-IPN can be formed first in-vitro. In certain embodiments in which the composition contains an IPN or semi-IPN, the composition is designed such that these form further crosslinks upon coming into contact with fluid of upper GIT to form a floating IPN comprising the gas and the drug(s) in situ. IPNs containing anionic polymers are formed by cross-linking using divalent or multivalent cations. Cross-linking of anionic polymers can be achieved in vitro or in vivo or both. When such crosslinking is achieved in-vivo, use of pH sensitive crosslinking agent allows one to achieve floating IPN formation in certain preselected pH range. In certain embodiments, IPNs containing galactomannan polymers are formed by cross-linking with borax and/or glutaraldehyde. In certain embodiments, IPNs containing at least one anionic polymer and at least one galactomannan polymers can be formed in vitro but would undergo additional crosslinking with crosslinking agent provided in-situ or in vivo or semi-IPN can be formed in vitro followed by full IPN formation in vivo. In certain embodiments, IPNs formed completely in-vitro may contain, at a minimum, one non-ionic polymer. A variety of methods for preparing IPN and semi IPN have been described in the literature, including, e.g., casting evaporation, emulsification cross-linking, mini-emulsion/inverse mini-emulsion techniques. See, e.g., Bhardwaj L. et al., African J of Basic & Applied Sciences, Vol. 3 (6), 2011, Pg. 300-312 and Nirmal H. B., et al., Int. J. of PharmTech Research, Vol. 2 (2), 2010, pg. 1398-1408. See, also, J. Lu, et al, Saudi Journal of Biological Sciences, (2016), 23, S22-S31 (available online June 2015); A. Lohani et al, J Drug Delivery, Vol. 2014, pp. 1-11, dx.doi.org/10.1155/2014/583612; U.S. Pat. Nos. 4,575,539; 5,604,927 (semi-IPN); which are incorporated by reference herein.

In certain embodiments, at least one polymer of semi-IPN or polymer network of IPN formed before administration is further crosslinked in situ with crosslinking agent provided to form floating IPN with at least one moiety and non-toxic gas entrapped therein.

Certain embodiments utilize two different crosslinking methods, one for galactomannan and other for anionic polymers and combines both to form full IPN directly or stepwise. For example, for an IPN comprising two galactomannans both of which are crosslinked, the semi-IPN is typically formed prior to being placed in a final product formulation (e.g., during manufacturing) which forms IPN in situ (e.g., in vivo). In another example, for an IPN comprising one galactomannan and one anionic polymer, either anionic polymer or galactomannan may be crosslinked during manufacturing to form semi-IPN and either anionic polymer or galactomannan may be crosslinked in situ to afford floating-IPN with moiety and non-toxic gas entrapped therein. In a further example, for an IPN comprising two anionic polymers, at least one will be crosslinked during manufacturing to form semi-IPN and at least one anionic polymer will be crosslinked in situ to afford full-IPN. Alternatively, at least crosslinked network of full-IPN formed during manufacturing would undergo additional crosslinking in situ to afford floating-IPN with moiety and entrapped non-toxic gas. In one embodiment of a stepwise process, galactomannan may be crosslinked during manufacturing and anionic polymer is crosslinked with divalent cations in situ once the cross-linking agent (e.g., crosslinker electrolyte) dissolves in acid (e.g., gastric acid). In an alternative stepwise process, anionic polymer is crosslinked with divalent cations during manufacturing and galactomannan is crosslinked in situ. In another process combining simultaneous and stepwise processes, an IPN comprising one galactomannan and one anionic polymer, both may be crosslinked simultaneously during manufacturing and then additionally crosslinked in situ. In another process combining simultaneous and stepwise processes, IPN comprising two galactomannans both of which are crosslinked during manufacturing and then additionally crosslinked in situ. In another process combining simultaneous and stepwise processes, IPN comprising two anionic polymers both of which are crosslinked during manufacturing and then additionally crosslinked in situ. Certain aspects of the published methods for separately cross-linking of galactomannan or cross-linking of anionic polymers may be applied to the combination provided herein. See, e.g., J. D. Kosmala, D. B. Henthorn, and L. Brannon-Peppas, "Preparation of interpenetrating networks of gelatin and dextran as degradable biomaterials," Biomaterials, vol. 21, no. 20, pp. 2019-2023, 2000; S. S. Bhattacharya, S. Shukla, S. Banerjee, P. Chowdhury, P. Chakraborty, and A. Ghosh, "Tailored IPN hydrogel bead of sodium carboxymethyl cellulose and sodium carboxymethyl xanthan gum for controlled delivery of diclofenac sodium," Polymer-Plastics Technology and Engineering, vol. 52, pp. 795-805, 2013; S. Banerjee, G. Chaurasia, D. Pal, A. K. Ghosh, A. Ghosh, and S. Kaity, "Investigation on crosslinking density for development of novel interpenetrating polymer network (IPN) based formulation," Journal of Scientific and Industrial Research, vol. 69, no. 10, pp. 777-784, 2010; K. Landfester, "Synthesis of colloidal particles in miniemulsions," Annual Review of Materials Research, vol. 36, pp. 231-279, 2006. V. Koul, R. Mohamed, D. Kuckling, H.-J. P. Adler, and V. Choudhary, "Interpenetrating polymer network (IPN) nanogels based on gelatin and poly(acrylic acid) by inverse mini-emulsion technique: synthesis and characterization," Colloids and Surfaces B, vol. 83, no. 2, pp. 204-213, 2011. See, also, P. J. Subrahmanyam Design and development of guar gum and borax crosslinked guar gum matrix tablets of theophylline for colon specific drug Journal of Chemical and Pharmaceutical Research, 2012, 4(2):1052-1060; Pawar Ashish Yashwantrao et al, A Raft forming system: A Novel approach for gastro-retention, Int. J. Pure App. Biosci. 3 (4): 2015 (178-192).

Without wishing to be bound by theory, it is believed that following administration, the floating IPN is formed in vivo in less than about 30 minutes, and in certain embodiments, in less than about 20 minutes, and in certain embodiments, in less than about 10 minutes. The onset of floating of a floating IPN may be determined in vitro, using simulated gastric fluid (SGF) and/or another suitable acid. At least one suitable in vitro assay is provided in the examples section herein, and is incorporated by reference herein. Additionally, the floating IPN provided herein may have a duration of floating in vivo of about least 2 hours, and more desirably, at least 3 hours to 24 hours, or about 6 hours to about 12 hours, or about 8 hours to about 10 hours. Duration of floating may be determined through use of an in vitro assay which utilized SGF, such as are described in the examples section and incorporated by reference herein. Additionally, or alternatively, duration of the floating of floating IPN and/or the ability of the IPN to maintain its network may be determined based on the in vitro and/or in vivo release profile of the drug(s) in the composition.

As provided herein, a "gas generating agent" refers to an agent that generates nontoxic gas upon contact with gastric fluid. Suitable gas-generating agents include, without limitation, carbonates or bicarbonates of an alkali or alkaline earth metal, such as potassium carbonate or potassium bicarbonate, sodium carbonate or sodium bicarbonate, calcium carbonate, sodium glycine carbonate, magnesium carbonate, and aluminum carbonate; and sulfites such as sodium sulfite, sodium bisulfite, and sodium metabisulfite. These salts may be used alone or in combination with an acid source as a gas-generating couple. In general, once the gas is entrapped in the floating IPN formed in situ, floating continues as long as integrity of the IPN is retained. Thus, same concentration of gas which works for 3-hour (hr) floating is also suitable for longer time periods, e.g., a 12 hr float. In certain embodiments, a gas generating agent is present in concentration range of about 1% w/w to about 25% w/w of the total weight of the floating IPN. Suitably, the gas generating agent provides rapid onset (less than about 15 min) and at least or greater than about 3 hr floating. Float may be assessed in vitro using a suitable assay such as those described herein, e.g., in 500 ml simulated gastric fluid without enzymes, and/or other assays known in the art.

Suitably, the floating IPN provides a biologically useful moiety (e.g., drug) entrapped therein with a period of retention in the stomach which is longer than the period of time which the moiety would have if administered directly. In certain embodiments, this results in increase bioavailability, absorption, and/or activity in the "gastrointestinal tract" including, the stomach, duodenum, and/or jejunum. "GIT" is an abbreviation for gastrointestinal tract.

As used herein, the term "modified release" refers to release profile of the drug (API) or other moiety over length of time where the unaltered drug will demonstrate immediate release profile. Onset of release may be in less than one hour, but release may be delayed, and/or extended, controlled, or sustained over a predetermined period of time. In certain embodiments, this may reflect a period of about 8 hours up to about 24 hours. The term "modified release" may include, e.g., composition which are extended release formulations, controlled release formulations, sustained release formulations, and/or delay release formulations. In certain embodiments, a floating IPN of the invention may be used in conjunction with a delayed release component, such as, e.g., the novel trigger pulse system Raft system described in the co-pending US provisional patent application entitled "Modified Release Drug Powder Composition Comprising Gastro-Retentive Raft Forming Systems Having Trigger Pulse Drug Release", filed on the same date herewith.

"Extended release" refers to the release profile of the active moiety over an extended period of time, e.g. over a period of at least 2 hours, and more desirably, at least about 3, about 4, about 6, about 8, about 10, about 12, about 16, about 20 or about 24 hours. The term "immediate release" ("IR") refers to the release of an active ingredient from a pharmaceutical formulation where the rate of release of the active pharmaceutical ingredient from the pharmaceutical formulation is not substantially retarded by means of a controlled release matrix or other such means and where the components of the pharmaceutical formulation are designed such that, upon ingestion, maximum exposure of said active pharmaceutical ingredient to body tissues occurs in the minimum period of time. As described herein, an "immediate release" component releases about 100% in less than 1 hour.

Components of IPN and IPN Forming Systems

In the following discussion, it should be understood that the IPN forming blend described herein may be included in an oral composition as separate polymers, a semi IPN (which may form fully networked IPN in situ (in vivo)), or a previously formed IPN which further crosslinks in situ to form a floating IPN, where at least one polymer network of the said IPN would be further crosslinked in situ with crosslinking agent provided. The floating IPN provided herein are characterized by rapid onset (e.g., less than about 15 min) and a sufficient amount of gas to provide a duration of floating of at least about >3 hr, more preferably at least 6 hr, more preferably about 12 hr) when assessed in vitro, e.g., in 500 ml simulated gastric fluid (SGF) without enzyme. In addition, the dosage form based on floating IPN is characterized by having enough strength to be able to retain integrity for the desired period of time, e.g., at least for a period about at least about 3 hours, more preferably for at least about 6 hr, more preferably about 12 hr when assessed in vitro, e.g., in 500 ml SGF without enzyme agitated using mechanical shaker set at 37° C. and 75 rpm. Within these parameters, the following components are not limiting, as other IPN forming components may be included in the composition.

a. Anionic Polymers and Crosslinking Agents

One or more anionic polymers may be used to form an IPN or semi-IPN, optionally in combination with galactomannan and/or another polymer, e.g., a non-ionic polymer. Such anionic polymers may include, without limitation, at least of each pectins, alginic acid, gellan gum, carrageenan, xanthan gum, and/or combinations thereof. In certain embodiments, pectins are included. Pectins have a polymer backbone which mainly comprises $\alpha$-(1-4)-D galacturonic acid residues. Free calcium ions, which crosslink the galacturonic acid chains. A source of divalent ions, generally calcium ions is required to produce vehicles for drug delivery. The main advantage of using pectin for these formulations is that it is water soluble, so organic solvents are not necessary in the formulation. Calcium ions in the complexed form may be included in the formulation for the induction of pectin cross-linking. In other embodiments, alginic acid is included. Alginic acid is a linear block copolymer polysaccharide consisting of $\beta$-D-mannuronic acid and $\alpha$-L-glucuronic acid residues joined by 1,4-glycosidic linkages. Dilute aqueous solutions of alginates undergo crosslinking with di and trivalent metal ions by a cooperative process involving consecutive glucuronic residues in the $\alpha$-L-glucuronic acid blocks of the alginate chain. Alginic acid can be chosen as a vehicle for formulations, since it exhibits favorable biological properties such as biodegradability and nontoxicity. Gellan gum (commercially available as Gelrite™ or Kelcogel™) is an anionic deacetylated exocellular polysaccharide secreted by *Pseudomonas elodea* with a tetrasaccharide repeating unit of one $\alpha$-L-rhamnose, one $\beta$-D-glucuronic acid and two $\beta$-D-glucuronic acid residues. Chemical structure of the polysaccharide has a tetrasaccharide repeat unit consisting of two glucose (Glc) residues, one glucuronic acid (GlcA) residue, and one rhamnose (Rha) residue. Similar to alginic acid and pectin, gellan gum chains are crosslinked by divalent or trivalent metal ions. Carrageenans are a family of linear sulfated polysaccharides that are extracted from red edible seaweeds. There are three main varieties of carrageenan, which differ in their degree of sulphation. Kappa-carrageenan has one sulphate group per disaccharide, Iota-carrageenan has two, and Lambda-carrageenan has three. Iota carrageenan is cross linked by divalent cations while kappa carrageenan is crosslinked by monovalent cations. Xanthan gum is anionic polysaccharide composed of pentasaccharide repeat units, comprising glucose, mannose, and glucuronic acid in the molar ratio 2:2:1.

In certain embodiments, an IPN forming system comprises about 3% w/w to about 30% w/w of one or more anionic polymer(s), or about 3% w/w to about 20% w/w, or about 3% w/w to about 15% w/w, or about 3% w/w to about 10% w/w, or about 5%, or about 10%, or about 5% w/w to about 30% w/w, or about 10% w/w to about 30% w/w, or about 15% w/w to about 25% w/w.

One or more cross-linking agents suitable for anionic polymers may be selected from the following non-limiting list of divalent and trivalent metal salts: Calcium salts such as, e.g., calcium carbonate, calcium chloride, calcium gluconate; magnesium salts, ferrous salts, ferric salts, aluminum salts, zinc salts, or combinations thereof. Cross-linking metal ions might be provided by crosslinking agent in the composition or such metal ion might be provided by mono- or di- or polyvalent metal ion salt forms of moiety. Otherwise, such crosslinking metal ion can be provided by any other excipients. For example, calcium carbonate can be used as gas generating agent but it also provides calcium ions for crosslinking anionic polymers including pectin, carrageenan iota, gellan gum, xanthan gum and the like. In certain embodiments, an IPN forming system comprises about 2% w/w to about 15% w/w of the anionic polymer(s) cross-linking agent(s), or about 2% w/w to about 10% w/w, or about 2% w/w to about 5% w/w, or about 5%, or about 7%, or about 5% w/w to about 15% w/w, or about 10% w/w to about 15% w/w.

b. Galactomannan Polysaccharides and Crosslinking Agents

Galactomannans are polysaccharides consisting of a mannose backbone with galactose side groups (more specifically, a (1-4)-linked beta-D-mannopyranose backbone with branch-points from their 6-positions linked to alpha-D-galactose, i.e. 1-6-linked alpha-D-galactopyranose). Examples of suitable galactomannans include, in order of increasing number of mannose-to-galactose ratio: fenugreek gum, mannose:galactose 1:1; guar gum, mannose:galactose 2:1; tara gum, mannose:galactose 3:1; locust bean gum or carob gum, mannose:galactose 4:1. Combinations of galactomannans may be utilized in the IPN forming systems (e.g., the floating IPN forming systems and the IPN forming blend) provided herein. These are not limitations on the galactomannans which are useful, and which may be obtained from a variety of sources, including those identified below.

In certain embodiments, the IPN forming systems comprise about 3% w/w to about 30% w/w of galactomannan(s), or about 3% w/w to about 20% w/w, or about 3% w/w to about 15% w/w, or about 3% w/w to about 10% w/w, or about 5%, or about 10%, or about 5% w/w to about 30% w/w, or about 10% w/w to about 30% w/w, or about 15% w/w to about 25% w/w.

TABLE 1

Galactomannans of Leguminosae species

| Botanical name | | |
|---|---|---|
| Subfamily | Species | M/G ratio |
| CAESALPINIACAE | Cassia absus | 3.00 |
| | C. emarginata | 2.70 |
| | C. Fistula | 3.00 |
| | C. leptocarpa | 3.05 |
| | C. marylandica | 3.76 |
| | C. nodosa | 2.7-3.5 |
| | C. accidentalis | 3.00 |
| | C. tora | 3.00 |
| | Ceratonia siliqua | 3.75 |
| | Caesalpinia cacalaco | 2.50 |
| | C. pulcherims | 2.7 |
| | C. spinosa | — |
| | Cercidium torreyanum | 3.38 |
| | Delonix regia | 4.28 |
| | Gleditsia amorphoides | 2.5 |
| | G. triacanthos | 3.2 |
| | Gymnocladus diocia | 2.71 |
| | Parkinsonia aculeata | 2.70 |
| MIMOSACEAE | Besmanthus illinoensis | 2.69 |
| | Leucaena galauca | 1.33 |
| FABACEAE | Sophora japonica | 5.19 |
| | Genista raetam | 4.14 |
| | G. scoparia | 1.59 |

TABLE 1-continued

Galactomannans of Leguminosae species

| Botanical name | | |
|---|---|---|
| Subfamily | Species | M/G ratio |
| | G. cretica | 1.56-167 |
| | G. foenum-graecum | 1.2 |
| | G. hamosa | 1.17 |
| | G. monspeliaca | 1.08 |
| | G. polyserata | 1.13 |
| | G. radiata | 1.17 |
| | Anthyllis vulneraria | 1.33 |
| | Lotus corniculatus | 1.25 |
| | L. pedunculatus | 1.04 |
| | L. scoparius | 1.13 |
| | Alysicarpus veginalis | 1.14 |
| | Desmodium pulchellum | 2.00 |

TABLE 2

Galactomannans of non-leguminous plants

| Botanical name | | |
|---|---|---|
| | Species | M/G ratio |
| ANNONACEAE | Annona muricata | 4.46 |
| CONVOLVULACEAE | Convolvutus tricolor | 1.75 |
| | Ipomoea muricata | 1.8 |
| EBENACEAE | Diospyros virginiana | — |
| LOGANIACEAE | Strychonos nux-vomica | — |
| PALMAE | Borassus flabellifer | 2.4 |
| | Cocos mucifera | 2.57 |
| | Arenga saccharifera | 2.26 |
| | Phytelephas macrocarpa | 50 |
| | Hyphaene thebaica | 19 |
| | Phoenix dactylifera | 10 |

Suitable cross-linking agent for use with a galactomannan may selected from the following non-limiting list: borax, glutaraldehyde, boric acid, organotitanates, other organometallic crosslinkers including Zr, Al, Cr, or combinations thereof.

In certain embodiments, an IPN forming blend comprises about 2% w/w to about 15% w/w of the galactomannan(s) cross-linking agent(s), or about 2% w/w to about 10% w/w, or about 2% w/w to about 5% w/w, or about 5%, or about 7%, or about 5% w/w to about 15% w/w, or about 10% w/w to about 15% w/w.

c. Non-Ionic Polymers as Components of IPN Forming System

Selected from non-limiting list of non-ionic polymers: cellulose polymers and their derivatives (such as for example, hydroxyethylcellulose, hydroxypropylcellulose, hydroxypropyl methyl cellulose, methyl cellulose), polysaccharides and their derivatives, polyalkylene oxides, polyethylene glycols, xyloglucan.

In certain embodiments, non-ionic polymers may be present in the floating IPN forming systems provided herein in an amount of about 2% w/w to about 15% w/w of the IPN forming blend, or about 2% w/w to about 10% w/w, or about 2% w/w to about 5% w/w, or about 5%, or about 7%, or about 5% w/w to about 15% w/w, or about 10% w/w to about 15% w/w. However, higher or lower amounts of such polymers may be selected as needed or desired.

d. Liquid Crystals Formers as Optional Components of Floating IPN Forming System In addition to an anionic polymer and/or galactomannan component, liquid crystal forms may be included in a floating IPN forming system. The cubic phases are used as the carriers for hydrophilic, lipophilic, or amphiphilic drugs.

The hexagonal phase is composed of cylindrical micelles packed in a hexagonal pattern. In contrast to the cubic phase, the water channels in the hexagonal phase are closed. The distribution of drugs in hexagonal phase is similar to that in cubic phase. Cubic and hexagonal phases provide a slow drug release matrix and protect peptides, proteins, and nucleic acids from chemical and physical degradation.

Suitable Cubic Phase-Forming Lipids may include, e.g., Glyceryl monooleate (GMO, 2,3-dihydroxypropyl oleate), phytantriol (PT, 3,7,11,15-tetramethyl-1,2,3-hexadecanetriol) and other lipids such as monolinolein, monoelaidin, phosphatidylethanolamine, oleoylethanolamide, phospholipids, PEGylated phospholipids, alkyl glycerates, and glycolipids have been reported to form cubic phase. Suitable hexagonal Phase-Forming Lipids may include, e.g., Oleyl glycerate (OG,2,3-dihydroxypropionic acid octadec-9-enyl ester) and phytanyl glycerate (PG, 2,3-dihydroxypropionic acid 3,7,11,15-tetramethyl-hexadecyl ester) are found to form hexagonal phase at physiological temperature when exposed to excess water, which further expands the lipid pool to form hexagonal phases.

In certain embodiments, liquid crystal formers may be present in the floating IPN forming systems provided herein in an amount of about 2% w/w to about 15% w/w of the IPN forming blend, or about 2% w/w to about 10% w/w, or about 2% w/w to about 5% w/w, or about 5%, or about 7%, or about 5% w/w to about 15% w/w, or about 10% w/w to about 15% w/w. However, higher or lower amounts of liquid crystal formers may be selected as needed or desired.

e. Illustrative Floating IPN Forming Systems

As provided herein, orally pharmaceutical compositions (final dosage forms) are provided which contain a floating IPN forming system, composed of at least one biologically active moiety, at least one gas generating agent, and an IPN forming blend containing at least one crosslinking agent and two IPN forming polymers (optionally already in the form of a semi IPN or full IPN). In certain embodiments, when the composition contains a floating IPN forming system in which the IPN forming blend comprises a semi IPN and a crosslinking agent, such that the full-IPN synthesis is formed in vivo. The floating IPN further the gas generated and at least one biologically active moiety. In certain embodiments, the composition contains a floating IPN forming system, in which the IPN forming blend is composed of a full IPN, an crosslinking agent for at least one of the polymer networks of the IPN, which that further crosslinking for the IPN occurs in situ along with gas entrapment to forms the floating IPN in situ (in vivo). Optionally, such systems may include a liquid crystal IPN.

In certain embodiments, the IPN forming blend comprises at least one anionic polymer, at least one galactomannan and at least two cross-linking agents. In certain embodiments, the IPN forming blend comprises carrageenan iota (anionic polymer), guar gum (galactomannan), borax (crosslinking agent) and calcium carbonate (crosslinking agent).

In certain embodiments, the IPN forming blend comprises at least two anionic polymers and at least one cross-linking agent. In certain embodiments, the IPN forming blend comprises carrageenan iota (anionic polymer), pectin (anionic polymer) and calcium carbonate (crosslinking agent).

In certain embodiments, the IPN forming blend comprises at least one galactomannan, at least one anionic polymer, at least one non-ionic polymer and at least two cross-linking agents. In certain embodiments, the IPN forming blend comprises guar gum (galactomannan), carrageenan kappa (anionic polymer), HPMC K100M (non-ionic polymer), borax (crosslinking agent) and potassium bicarbonate (crosslinking agent).

In certain embodiments, the IPN forming blend comprises at least one galactomannan, at least two anionic polymers, at least one non-ionic polymer and at least two cross-linking agents. In certain embodiments, the IPN forming blend comprises fenugreek gum (galactomannan), carrageenan iota (anionic polymer), pectin (anionic polymer), HPMC K100M (non-ionic polymer), borax (crosslinking agent) and calcium carbonate (crosslinking agent).

In certain embodiments, the IPN forming blend comprises at least two galactomannan polymers, at least one gas generating agent and at least one cross-linking agent. In certain embodiments, the IPN forming blend comprises fenugreek gum (galactomannan), guar gum (galactomannan), calcium carbonate (gas generating agent) and borax (crosslinking agent).

In certain embodiments, the IPN forming blend comprises at least two galactomannan polymers, at least one anionic polymer and at least two cross-linking agents. In certain embodiments, the IPN forming blend comprises fenugreek gum (galactomannan), guar gum (galactomannan), pectin (anionic polymer), calcium carbonate (crosslinking agent) and borax (crosslinking agent).

In certain embodiments, the IPN forming blend comprises at least two galactomannan polymers, at least one anionic polymer, at least one non-ionic polymer and at least two cross-linking agents. In certain embodiments, the IPN forming blend comprises fenugreek gum (galactomannan), guar gum (galactomannan), carrageenan iota (anionic polymer), HPMC K100M (non-ionic polymer), calcium carbonate (crosslinking agent) and borax (crosslinking agent).

In certain embodiments, the IPN forming blend comprises at least two galactomannan polymers, at least one non-ionic polymer, at least one gas generating agent and at least one cross-linking agent. In certain embodiments, the IPN forming blend comprises fenugreek gum (galactomannan), guar gum (galactomannan), HPMC K100M (non-ionic polymer), borax (crosslinking agent) and calcium carbonate ((gas generating agent).

Components of Composition

In addition to the floating IPN forming system which includes the gas generating agent(s) and IPN forming blend as described above, the compositions provided herein include, at a minimum, at least one biologically active moiety. The moiety may be included in the composition in an uncomplexed form (e.g., as a free API or as an salt), or may be prepared in a granule, particle, complex (e.g., drug-ion exchange resin complex). These various forms of the moiety (e.g., a drug) may be uncoated or provided with one or more modified release coating. In certain embodiments, the compositions contain one or more different drugs and/or other moieties. In certain embodiments, the compositions may contain the same moiety in two or more different forms (e.g., uncoated and modified release coated, two different immediate release forms, an immediate release and a modified release, two different modified release forms, or combinations thereof). Various combinations of the same moieties in different forms and/or different moieties in the same or different forms is permitted. Examples of suitable doses of a drug(s) which could be incorporated into the floating IPN may be in the range of about 0.01 mg to 20 gm, 0.1 mg to 15 gm, 1 mg to 10 mg, or ranges or values therebetween. In certain embodiments, higher or lower amounts of a drug(s) may be included.

Biologically Active/Useful Moieties

In certain embodiments, the drug is selected is one which, when administered outside of the composition, has more rapid clearance from the stomach and, optionally other parts of the gastrointestinal tract than is desired. Thus, the compositions provide herein can provide a modified release profile to a drug and/or increased bioavailability. This is particularly desirable for drugs which are to be targeted to the gastrointestinal tract (particularly the stomach). In certain embodiments, a drug is selected which exhibits faster and greater absorption in upper parts of (stomach, duodenum, jejunum) gastro intestinal tract. In certain embodiments, drug selected has local action to diseases in stomach, small intestine, hepatic portal vein and liver. However, this is not a limitation on its utility.

Regardless of the form in which they are to be incorporated in the floating IPN, the selected biologically useful moieties or their particles, granules, complexes, etc., selected for inclusion in the floating IPN have an average size of less than about 500 microns in size, preferably less than about 425 microns. However, moieties (particles, granules, complexes, etc.) having a larger size may be selected depending upon the total weight (dose) being delivered and/or by adjusting the amount of gas generating agent.

The drugs that are suitable for use in these preparations in terms of chemical nature are acidic, basic, amphoteric, or zwitterionic molecules. Examples of suitable drugs include, e.g., dextromethorphan hydrobromide, amphetamine sulfate, morphine hydrochloride, tramadol hydrochloride, baclofen, glycopyrrolate, pregabalin, phenylephrine hydrochloride, viloxazine hydrochloride, mazindol hydrochloride, montelukast sodium, lercarnidipine hydrochloride, ofloxacin, levofloxacin, rebamipide, acebutolol, acecamide hydrochloride, aceclofenac, acetophenazine maleate, acetosulfone sodium, acodazole hydrochloride, adatanserin hydrochloride, albuterol hydrochloride, alendronate sodium, alendronic acid, alentemol hydrobromide, aletamine hydrochloride, alfentanil hydrochloride, alosetron hydrochloride, alprenolol hydrochloride, alprenoxime hydrochloride, alrestatin sodium, altanserin tartrate, amantadine hydrochloride, amedalin hydrochloride, amfenac sodium, amifloxacin, amifostine, amikacin, amiloride hydrochloride, aminacrine hydrochloride, aminobenzoate potassium, aminobenzoate sodium, amiprilose hydrochloride, amiquinsin hydrochloride, amlodipine, amobarbital sodium, amodiaquine, amodiaquine hydrochloride, amoxicillin, amphetamine sulfate, amphomycin, amphotericin B, ampicillin, ampiroxicam, ampyzine sulfate, apomorphine hydrochloride, apraclonidine hydrochloride, aprindine hydrochloride, aprosulate sodium, apurinic acid, aspirin, aspoxicillin, atenolol, atorvastatin, azalanstat dihydrochloride, azaloxan fumarate, azanator maleate, azathioprine sodium, azithromycin, azlocillin, azolimine, azosemide, azotomycin, azumolene sodium, bacampicillin hydrochloride, bacitracin, baclofen, balofloxacin, bamethan sulfate, bamifylline hydrochloride, barnidipine, batanopride hydrochloride, batelapine maleate, benapryzine hydrochloride, benazepril hydrochloride, benazeprilat, bendacalol mesylate, benidipine, benoxaprofen, benoxinate hydrochloride, benzethonium chloride, benzetimide hydrochloride, benzilonium bromide, benzindopyrine hydrochloride, benzoctamine hydrochloride, benzydamine hydrochloride, bepridil hydrochloride, betaxolol hydrochloride, bevantolol hydrochloride, bezafibrate, bialamicol hydrochloride, bicifadine hydrochloride, biclodil hydrochloride, bipenamol hydrochloride, biphenamine hydrochloride, bisoprolol, bithionolate sodium, bleomycin sulfate, brifentanil hydrochloride, brompheniramine maleate, buclizine hydrochloride, budesonide, budipine, buformin, bunolol hydrochloride, bupivacaine hydrochloride, buprenorphine hydrochloride, bupropion hydrochloride, buspirone hydrochloride, butabarbital, butaclamol hydrochloride, butedronate tetrasodium, butoprozine hydrochloride, butorphanol, butoxamine hydrochloride, butriptyline hydrochloride, candesartan, candicidin, captopril, carbaspirin calcium, carbenicillin potassium, carbenoxolone sodium, carbidopa, carbidopa-levodopa, carbinoxamine maleate, carbiphene hydrochloride, carbuterol hydrochloride, carphenazine maleate, carprofen, carteolol hydrochloride, carubicin hydrochloride, carumonam sodium, carvedilol, carvotroline hydrochloride, cefaclor, cefadroxil, cefamandole, cefaparole, cefatrizine, cefazaflur sodium, cefazolin, cefbuperazone, cefcapene pivoxil, cefdaloxime pentexil tosilate, cefdinir, cefditoren pivoxil, cefepime, cefetamet, cefetecol, cefixime, cefluprenam, cefinenoxime hydrochloride, cefinetazole, cefminlox, cefodizime, cefonicid sodium, cefoperazone sodium, ceforamide, cefoselis, cefotaxime sodium, cefotetan, cefotiam, cefoxitin, cefozopran, cefpimizole, cefpiramide, cefpirome, cefpodoxime proxetil, cefprozil, cefroxadine, cefsulodin, ceftazidime, cefteram, ceftibuten, ceftizoxime sodium, ceftriaxone, cefuroxime, cephacetrile sodium, cephalexin, cephaloglycin, cetaben sodium, cetalkonium chloride, cetamolol hydrochloride, cetirizine, cetophenicol, cetraxate hydrochloride, chlophedianol hydrochloride, chlorhexidine gluconate, chloroprocaine hydrochloride, chlorpheniramine maleate, ciladopa hydrochloride, cilastatin sodium, cinanserin hydrochloride, cinepazet maleate, ciprofloxacin, clavulanate potassium, Clentiazem maleate, clidinium bromide, clinafloxacin, clomipramine hydrochloride, clonidine, cloroperone hydrochloride, clorprenaline hydrochloride, cloxacillin, codeine, colestipol hydrochloride, cyclophenazine hydrochloride, cyclophosphamide, cycloplatam, dapoxetine hydrochloride, darglitazone sodium, desipramine hydrochloride, dexbrompheniramine maleate, dexchlorpheniramine maleate, dexclamol hydrochloride, dexfenfluramine hydrochloride, dextroamphetamine, dextromethorphan, dextromethorphan hydrochloride, dextrothyroxine sodium, dexverapamil, diacetolol hydrochloride, diamocaine cyclamate, diapamide, dibenzepin hydrochloride, diclofenac sodium, dicloxacillin, difloxacin hydrochloride, difluanine hydrochloride, dilevalol hydrochloride, diltiazem hydrochloride, dimefline hydrochloride, dimoxamine hydrochloride, dioxadrol hydrochloride, dipivefin hydrochloride, divalproex sodium, dizocilpine maleate, duloxetine hydrochloride, ephedrine, epinephrine, eprosartan, estrazinol hydrobromide, ethacrynate sodium, ethacrynic acid, ethambutol hydrochloride, etodolac, felodipine, fenofibrate, fenoprofen, flurbiprofen, fluvastatin, fluvastatin sodium, foscarnet sodium, furosemide, gabentin, glicetanile sodium, glycopyrrolate, homatropine hydrobromide, hydralazine hydrochloride, hydrocodone bitartrate, hydromorphone hydrochloride, hydroxyamphetamine hydrobromide, hydroxyzine hydrochloride, ibuprofen, imipramine hydrochloride, indolapril hydrochloride, indomethacin sodium, indoprofen, niacinate, isoproterenol hydrochloride, ketoprofen, ketorolac, labetalol hydrochloride, lamotrigine, letimide hydrochloride, levofloxacin, levorphanol tartrate, losulazine hydrochloride, meclofenamate sodium, medazepam hydrochloride, mefenamic acid, mefloquine hydrochloride, memantine hydrochloride, meperidine hydrochloride, metformin, methicillin sodium, methotrexate, methylphenidate hydrochloride, montelukast sodium, morphine, morphine sulfate, nadolol, nafcillin sodium, nafoxidine hydrochloride, nicardipine hydrochloride, nifedipine, norepinephrine bitartrate, ofloxacin, oxprenolol hydrochloride, oxybutynin chloride, oxycodone, oxymorphone hydrochloride, papaverine hydrochloride, pargyline hydrochloride, paroxetine, pemedolac, penicillin G potassium, penicillin G Sodium, penicillin V potassium, phenmetrazine hydrochloride, phenoxybenzamine hydrochloride, phentermine hydrochloride, phenylephrine hydrochloride, phenylpropanolamine hydrochloride, piperacillin sodium, piperamide maleate, pitavastatin, prazosin hydrochloride, pregabalin, promethazine hydrochloride, propafenone hydrochloride, propranolol hydrochloride, pseudoephedrine hydrochloride, desloratadine/pseudoephedrine sulfate, ramipril, remacemide hydrochloride, remifentanil hydrochloride, ropinirole, rosuvastatin, taciamine hydrochloride, tacrine hydrochloride, talampicillin hydrochloride, talopram hydrochloride, tametraline hydrochloride, N Desmethyl tamoxifen hydrochloride, tampramine fumarate, tamsulosin hydrochloride, tandamine hydrochloride, telmisartan, teloxantrone hydrochloride, teludipine hydrochloride, temafloxacin hydrochloride, tiapamil hydrochloride, tiaramide hydrochloride, tioperidone hydrochloride, tiprenolol hydrochloride, tipropidil hydrochloride, tiquinamide hydrochloride, tramadol hydrochloride, tramazoline hydrochloride, trazodone hydrochloride, trazodone-hcl, trebenzomine hydrochloride, trefentanil hydrochloride, trifluoperazine hydrochloride, valproate sodium, valproic acid, valsartan vardenafil, venlafaxine, desvenlafaxine, veradoline hydrochloride, verapamil hydrochloride, verilopam hydrochloride, viloxazine hydrochloride, zofenopril calcium, zolamine hydrochloride, zolazepam hydrochloride.

In certain embodiments, a composition comprising the floating IPN forming system comprises a dose of about 0.01 mg to 20 grams of drug(s). However, other suitable doses may be selected.

Optionally, one or more drugs may be used in at least one drug-ion exchange resin complex. Typically, this involves exchanging the acid or base salt of the compound (e.g., a drug or mineral) with the counterion from an ion exchange resin. However, zwitterionic or non-salt forms of certain drugs may form a complex with an ion exchange resin complex. Such complexes may contain one or more drugs. In certain embodiments, two or more drug-ion exchange resin complexes having different drugs may be used in a single composition. In certain embodiments, two or more drug-ion exchange resin complexes which are in different release forms, e.g., immediate release, modified release, including different modified release coatings, may be used in a single composition.

Methods of complexing drugs with ion exchange resins is known in the art. For example, suitable methods for preparing such complexes and examples of suitable ion exchange resins are described in U.S. Pat. Nos. 8,062,667, 8,287,848, 8,202,542, which are incorporated herein by reference. See, also, US 2007/0148239A1; WO 2007/001300; U.S. Pat. No. 4,352,891, and K. Hanninen, et al, Eur J Pharm Sci., 31 (2007): 306-317. Ion exchange resins suitable for pharmaceutical use are typically water-insoluble and comprise a preferably pharmacologically inert organic and/or inorganic matrix containing functional groups that are ionic or capable of being ionized under the appropriate conditions of pH, in order to permit ion exchange with the drug (other moiety) being complexed therewith. The organic matrix may be synthetic (e.g., polymers or copolymers of acrylic acid, methacrylic acid, sulfonated styrene, sulfonated divinylbenzene), or partially synthetic (e.g. modified cellulose and dextrans). The inorganic matrix preferably comprises silica gel modified by the addition of ionic groups. Covalently bound ionic groups may be strongly acidic (e.g., sulfonic acid, phosphoric acid), weakly acidic (e.g., carboxylic acid), strongly basic (e.g., primary amine), weakly basic (e.g. quaternary ammonium), or a combination of acidic and basic groups. In general, the types of ion exchangers suitable for use in ion-exchange chromatography and for such applications as deionization of water are suitable for use in the controlled release of drug preparations. Such ion-exchangers are described by H. F. Walton in "Principles of Ion Exchange" (pp: 312-343) and "Techniques and Applications of Ion-Exchange Chromatography" (pp: 344-361) in Chromatography. (E. Heftmann, editor), van Nostrand Reinhold Company, New York (1975). Ion exchange resins that can be used in the present invention have exchange capacities of about 6 milliequivalents (meq)/gram and preferably about 5.5 meq/gram or below. Typically the size of the ion-exchange particles is from about 5 microns to about 750 microns, preferably the particle size is within the range of about 40 microns to about 250 microns for liquid dosage forms although particles up to about 1,000 micron can be used for solid dosage forms, e.g., tablets, pellets, powders (including powders for suspensions), and capsules. Particle sizes substantially below the lower limit are generally difficult to handle in all steps of the processing. Generally, uncoated drug-ion exchange resin particles will tend to be at the lower end of this range, whereas coated drug-ion exchange resin particles will tend to be at the higher end of this range. However, both uncoated and coated drug-ion exchange resin particles may be designed within this size range.

The most common organic resins used in formulations are cross-linked polystyrene and polymethacrylate polymers. Ion exchange resins are broadly classified into two main categories, as cation exchange resins and anion exchange resins. Cation exchange resins contain anions attached to polymer and active cations. Cation exchange resins are prepared by the copolymerization of styrene and divinyl benzene and have sulfonic acid groups ($-SO_3H$) introduced into most of the benzene rings. Strong cation acid resins are so named because their chemical behavior is similar to that of a strong acid. These resins are highly ionized in both the acid ($R-SO_3H$) and salt ($RSO_3Na$) form of the sulfonic acid group ($-SO_3H$). The hydrogen and sodium forms of strong acid resins are highly dissociated, and the exchangeable $Na^+$ and $H^+$ are readily available for exchange over the entire pH range. Consequently, the exchange capacity of strong acid resins is independent of the solution pH. For example, sodium polystyrene sulfonate USP (Amberlite IRP 69). Weak Acid Cation Exchange Resins: These resins behave similarly to weak organic acids that are weakly dissociated. In a weak acid resin the ionizable group is a carboxylic acid (COOH) as opposed to the sulfonic acid group ($SO_3H$) used in strong acid resins. The degree of dissociation of a weak acid resin is strongly influenced by the solution pH. Consequently, resin capacity depends in part on the solution pH. A typical weak acid resin has limited capacity below a pH of 6.0.

Anion exchange resins can be prepared by first chloromethylating the benzene rings of styrene-divinylbenzene copolymer to attach $CH_2Cl$ groups and then causing these to react with tertiary amines such as triethylamine. A strong base type anion exchange resin is highly ionized and exchange capacity is not affected by pH. In certain embodiments, a strongly basic anion exchanger contains quaternary ammonium groups attached to a styrene and divinylbenzene copolymer. An example of strong base anion exchange resin is cholestyramine. Duolite AP143/1083 is cholestyramine USP supplied by Dow Chemical Company. A weak base type anion exchange resins exhibit minimal exchange capacity above pH 7. An example of a weakly basic anion exchangers contain polyalkylamine groups attached to a styrene and divinyl benzene.

Inorganic ion exchangers include zeolites, which are microporous, aluminosilicate minerals. Zeolites have a porous structure that can accommodate a wide variety of cations, such as Na+, K+, Ca2+, Mg2+ and others. These positive ions are rather loosely held and can readily be exchanged for others in a contact solution. Some of the more common mineral zeolites are analcime, chabazite, clinoptilolite, heulandite, natrolite, phillipsite, and stilbite. An example of the mineral formula of a zeolite is: $Na_2Al_2Si_3O10.2H_2O$, the formula for natrolite.

The selected ion-exchange resins may be further treated by the manufacturer or the purchaser to maximize the safety for pharmaceutical use or for improved performance of the compositions. Impurities present in the resins may be removed or neutralized by the use of common chelating agents, anti-oxidants, preservatives such as disodium edetate, sodium bisulfite, and so on by incorporating them at any stage of preparation either before complexation or during complexation or thereafter. These impurities along with their chelating agent to which they have bound may be removed before further treatment of the ion exchange resin with a granulating agent and optional modified release coating.

Binding of the selected drug or combination of drugs to the ion exchange resin can be accomplished using methods known in the art. The binding may be performed, for example as a batch or column process, as is known in the art. Typically the drug-ion exchange resin complex thus formed is collected by filtration and washed with appropriate solvents to remove any unbound drug or by-products. The complexes can be air-dried in trays, in a fluid bed dryer, or other suitable dryer, at room temperature or at elevated temperature.

In one example, drug-ion exchange resin complex can be prepared by dissolving the drug(s) in deionized water, adding ion exchange resin USP under stirring and continuing stirring further. The stirring is continued further for a period of 15 min to 20 hrs. More preferably, for 30 min to 10 hr, more preferably from 1 hr to 5 hr. In one embodiment, the drug-ion exchange resin complexes can be prepared using methods known in the art, such as, but not limited to, blending, slurrying, kneading, grinding, sieving, filling, compressing, lyophilization, spray-drying, fluid-bed drying or centrifugal granulation. The drug-resin binding may be performed, for example, as a batch or column process, as is known in the art. In one illustrative embodiment, drug-resin complex is prepared by batch process. In one embodiment the drug-resin complexes were prepared by stirring aqueous slurry of drug and ion exchange resin for about 0.5 hours to about 12 hours, followed by filtration and drying of the formed drug-resin complex. Drug:ion exchange resin by weight ratio in the complex (also termed a resinate) can be from 1:0.1 to 1:100, more preferably from 1:1 to 1:10. The amount of drug that can be loaded onto a resin will typically range from about 1% to about 75% w/w of the drug-ion exchange resin particles. In one embodiment, loading of about 10% to about 40% w/w, more desirably, about 15% to about 30% w/w, of the drug-ion exchange resin particles can be employed. Typical loadings of about 25% w/w of the drug-ion exchange resin particles can be advantageously employed.

Optionally, a drug-ion exchange resin complex may be granulated with a polymer in preparation for formulation and/or for further processing (e.g., coating). Such a polymer may optionally provide modified release properties to the drug(s) in the complex. Suitably, the granulating agent does not form a separate coating layer on the drug-ion exchange resin complex, but forms a matrix therewith. Examples of suitable polymer systems include, for example, a polyvinyl acetate polymer or a mixture of polymers containing same (e.g., KOLLICOAT® SR 30D), cellulose acetates, ethylcellulose polymers (e.g., AQUACOAT™ ECD-30 or SURELEASE™), acrylic based polymers or copolymers (e.g., represented by the EUDRAGIT family of acrylic resins), cellulose phthalate, or any combination of such water-insoluble polymers or polymer systems. One suitable polymer system which may provide release retardant properties is a polyvinyl acetate polymer as described herein or an acrylic polymer from the EUDRAGIT family. Examples of suitable acrylic polymers from the EUDRAGIT family may include, e.g., a copolymer comprising ethyl acrylate and methyl methacrylate (e.g., EUDRAGIT NE-30D), or EUDRAGIT RS, RL30D, RL100, or NE, which are largely pH-independent polymers; although less desirable, certain pH-dependent members of the EUDRAGIT polymer family, e.g., the L, S, and E, polymers may be selected. Examples of polymers and/or polymer systems which do not provide any significant release retardant properties include the impregnating agents described for example in U.S. Pat. No. 4,221,778 and published US Patent Application Publication No. US 2003/009971 A1, the disclosures of which are incorporated herein by reference. Specific examples of suitable impregnating agents include propylene glycol, polyethylene glycol, polyvinyl alcohol, polyvinyl pyrrolidone (e.g., KOLLIDON® K30) mannitol, methyl cellulose, hydroxypropyl methylcellulose, hydroxypropyl cellulose, and sorbitol. The quantity of the granulating agent typically ranges from about 3% w/w to about 30% w/w or more by weight of the uncoated drug-ion exchange resin particles. The granulating agent, if used, is generally in the range from about 5% w/w to about 20% w/w, or about 10% w/w to about 15% w/w of the uncoated drug-ion exchange resin complex. These granulating agents can be added during the formation of the drug-ion exchange resin complex either in the beginning, during the middle, or after substantial amount of complex formation has taken place. In the more preferred embodiment, the retardant is added after the formation of drug-ion exchange resin complex. Upon admixing, the drug-ion exchange resin complex particles with the granulating agent, the mixture is dried and milled appropriately. In some cases, the milling may be carried out before the complete drying of the complex and then again further drying followed by milling to obtain the desired size or other desired characteristics.

The drug-ion exchange resin complexes (optionally in a matrix with at least one granulating agent) may be coated with at least one modified release coating. Optionally, the drug-ion exchange resin complex may have two or more different modified release coatings. These coatings may be pH-dependent (such as enteric or reverse enteric coatings) or pH-independent.

The modified release coatings that may be employed include, but are not limited to, water-insoluble release modifiers or water-soluble release modifiers or combinations thereof. The water-insoluble release modifiers that may be employed include polymeric water-insoluble release modifier or non-polymeric water-insoluble release modifier or combinations thereof. Suitable polymeric water-insoluble release modifiers include, but are not limited to, cellulose polymers and derivatives thereof, polyacrylic acid and polymethacrylic acid polymers and derivatives thereof, maleic acid copolymers and derivatives thereof, polyvinyl derivatives; and the like or any combinations thereof. In one embodiment, suitable polymeric water-insoluble release modifiers include, but are not limited to, polyvinyl acetate, polyvinyl chloride, polyvinyl carbonate, ethyl cellulose, nitrocellulose, vinylidene chloride-acrylonitrile copolymer, acrylonitrile-styrene copolymer, ethylene vinyl acetate, cellulose acetate, cellulose acetate phthalate, cellulose acetate butyrate, copolymers of vinyl pyrrolidone, blend of polymers comprising polyvinyl acetate, hydroxypropyl methylcellulose phthalate, methacrylic acid copolymers such as Eudragit® L100/S100/L100-55 and the like or mixtures thereof; methacrylate copolymers such as Eudragit® E100/EPO, Eudragit® RL100/RL30D/RLPO, Eudragit® RS100/RS30D/RSPO and the like or mixtures thereof. Suitable non-polymeric water-insoluble release modifiers include, but are not limited to, fats, oils, waxes, fatty acids, fatty acid esters, glycerides, long chain monohydric alcohols and their esters, phospholipids, terpenes or combinations thereof. Suitable release modifiers in each of these categories have been listed hereinbefore.

In one embodiment, the coating is a pH-independent, water insoluble, water-permeable barrier coating which optionally contains one or more plasticizers, and which is optionally cured. Optionally, the coating includes a plasticizer is used in the percent range, or a mixture of plasticizers combine to total, about 2% w/w to about 50% w/w of the coating layer, or about 2.5% w/w to about 20% w/w of the coating layer on the coated drug-ion exchange resin complex. In certain embodiments, a plasticizer in range of about 5% w/w to about 10% w/w of the coating layer based on the coated complex provides the most desirable properties. Suitable plasticizers are water soluble and water insoluble. Examples of suitable plasticizers include, e.g., dibutyl sebacate, propylene glycol, polyethylene glycol, polyvinyl alcohol, triethyl citrate, acetyl triethyl citrate, acetyl tributyl citrate, tributyl citrate, triacetin, and Soluphor P, and mixtures thereof. Other plasticizers are described in Patent Application Publication No. US 2003/0099711 A1, May 29, 2003, page 4 (0041) the disclosure of which is incorporated herein by reference. In general, the plasticizer is selected to enhance high flexibility or elongation (elasticity) of the film coating at break measured by the texture analyzer TA-XT2 HiR (Stable Microsystems) and by the method reported by the manufacturer in its literature [i.e., Jan-Peter Mittwollen, Evaluation of the Mechanical Behavior of Different Sustained Release Polymers, Business Briefing: Pharmagenerics, 2003, pp. 1-3, BASF], of at least about 100% to about 400% or higher, of at least about 125% and preferably in a range between about 150% to about 400% while not substantially increasing the tackiness of the polymer film greater than about 2 (wherein the film is measured by the Hössel method referenced above independent of any composition on which it has been deposited).

In certain embodiments, the pH-independent barrier coating system contains polyvinyl acetate polymer, which in certain embodiments in applied as an aqueous coating dispersion. The polyvinylacetate is insoluble in water at room temperature and may be used in either substantially pure form or as a blend. A commercial blend contains primarily a polyvinyl acetate polymer, a stabilizer, and minor amounts of a surfactant such as sodium lauryl sulfate. More specifically, a desirable aqueous based coating solution is KOLLICOAT® SR 30 D (BASF Corporation) and whose composition is about 27% polyvinyl acetate, about 2.7% polyvinylpyrrolidone (PVP), about 0.3% sodium lauryl sulfate (solids content 30% w/w). In one embodiment, if a substantially pure form of PVA is used, it can be dissolved in a suitable non-aqueous solvent to provide a coating solution for the drug ion-exchange resin complex. The KOLLICOAT® SR-30D aqueous dispersion may be cured for about 1 to about 24 hours. In alternate embodiments, the coating is cured for about 4 to about 16 hours, and preferably about 5 hours at high temperature, e.g., about 50° C. to about 65° C., and preferably about 60° C. Where the barrier coating comprises polyvinyl acetate, the polyvinyl acetate is present in an amount of about 70% w/w to about 90% w/w of the final barrier coating layer, at least about 75% w/w, at least about 80% w/w, about 85% w/w of the final barrier coating layer. Where the barrier coating also comprises PVP as a stabilizer component (e.g., as is present in KOLLICOAT® SR 30D), the final barrier coating layer generally contains about 5 to about 10% w/w of polyvinyl pyrrolidone.

The non-polymeric water-insoluble release modifiers that may be employed in the compositions of the present invention include, but are not limited to, Cutina® (hydrogenated castor oil), Hydrobase® (hydrogenated soybean oil), Castorwax® (hydrogenated castor oil), Croduret® (hydrogenated castor oil), Carbowax®, Compritol® (glyceryl behenate), Sterotex® (hydrogenated cottonseed oil), Lubritab® (hydrogenated cottonseed oil), Apifil® (wax yellow), Akofine® (hydrogenated cottonseed oil), Softisan® (hydrogenated palm oil), Hydrocote® (hydrogenated soybean oil), Corona® (Lanolin), Gelucire® (macrogolglycerides Lauriques), Precirol® (glyceryl palmitostearate), Emulcire™ (cetyl alcohol), Plurol® diisostearique (polyglyceryl diisostearate), Geleol® (glyceryl stearate), and mixtures thereof. In another embodiment, lipids or waxes can also be employed in the form of an aqueous dispersion stabilized by surfactants and suitable stabilizers. Suitable water-soluble release modifiers that may be employed include, but are not limited to, cellulose polymers and derivatives thereof, gums, polyvinyl derivatives and the like or combinations thereof. In one embodiment, suitable water soluble release modifiers that may be employed include, but are not limited to, polyvinylpyrrolidone, poloxamer, guar gum, xanthan gum, fenugreek gum or galactomannan, gum arabic, fenugreek fibers comprising soluble and insoluble fibers, tragacanth, cellulose derivatives such as hydroxypropyl methylcellulose, hydroxypropyl cellulose, methylcellulose, and hydroxyethyl cellulose, carboxymethylethyl cellulose, hydroxyethylmethyl carboxymethyl cellulose, hydroxyethyl methyl cellulose, carboxymethyl cellulose, methylhydroxyethyl cellulose, methylhydroxypropyl cellulose or any mixtures thereof. In one embodiment the release modifier employed is ethyl cellulose. The release modifiers of the present invention may be used in admixture with at least one pharmaceutically acceptable excipient, such as but not limited to, plasticizers, pigments, anti-tacking agents and the like or any mixtures thereof. Suitable plasticizers include, but are not limited to, dibutyl sebacate, propylene glycol, polyethylene glycol, polyvinyl alcohol, triethyl citrate, acetyl triethyl citrate, acetyl tributyl citrate, tributyl citrate, triacetin or the like or any combinations thereof. Suitable anti-tacking agents that may be employed include, but are not limited to, talc, colloidal silicon dioxide and the like or combinations thereof. In a further embodiment, stabilizers as described under drug-resin complexes may be employed in the release rate modifier layer.

Any suitable coating procedure known to a person skilled in the art, which provides a substantially complete coating without significant agglomeration of the drug-ion exchange resin complex particles, may be used. Coating may be applied to the drug-resin complex particles by processes such as, but not limited to, melt coating, spray coating, pan coating, fluidized bed coating and the like. Coatings may be applied in a coating pan or with a fluid-bed coating apparatus. The release modifier coatings may be applied from aqueous suspension or organic solvents such as, but not limited to, isopropyl alcohol. Optionally after coating the coated drug-resin complexes may be cured at a suitable temperature and for a suitable amount of time. The term "substantially coated" as used herein means that the drug-ion exchange resin complex particles discussed herein above is substantially completely coated with the release modifier. While complete coating over the drug-resin complex particles, with release modifier is ideal, minor variations in this are possible in practice during coating and are therefore referred to as "substantially coated". Optimum coat weight and coat thickness may be determined and generally depends on the drug release characteristics of the resin for that particular active moiety. In one embodiment, the particles may be coated with at least one release modifier to a weight gain of about 1% to about 75%, or about 5% to about 60%, or about 10% to about 50%, or about 15% to about 40%, or about 5% to about 30%, or about 10% to about 25%, or values in between. In one embodiment the particles are variably coated at different levels of release modifier coating and the variably coated particles are present in particular proportions in the modified release compositions. The presence of such variably coated beads helps achieve the desired release profiles that does not result either in dose dumping or excessive release retardation. In one embodiment the compositions of the present invention comprise at least two variably coated populations of coated particles. In another embodiment at least two populations of variably coated particles are present in a ratio from about 1:99 to about 99:1. In one embodiment, coated and uncoated modified release particles may be incorporated in the compositions. The modified release particles may be present in the compositions in an amount from about 5% w/w to about 95% w/w of the biologically active moiety in the composition.

In certain embodiments, a barrier coating is present in amount of about 2% w/w to about 200% w/w of an uncoated drug, uncoated drug-ion exchange resin complex, or a precoated drug-ion exchange resin complex, i.e. a drug-ion exchange resin complex-matrix. In certain embodiments, the modified release barrier coating is a pH-independent, water-permeable, water-insoluble coating which is present in an amount of about 2% w/w to about 40% w/w, about 2% to about 35% w/w, about 2% w/w to about 30% w/w, about 5% w/w to 50% w/w, about 10% w/w to about 40% w/w, about 15% w/w, about 5% w/w, about 10% w/w, or about 15% w/w. In certain embodiments, the barrier coating is a blend comprising about 70% w/w to about 90% w/w polyvinylacetate, with at least one stabilizer and a plasticizer. In certain embodiments, the stabilizer is a polyvinylpyrrolidone and/or sodium lauryl sulfate.

In certain embodiments, a biologically active moiety (e.g., a drug), is included in a composition of the invention in the form of a particle or granule which is not an ion exchange resin complex. In other embodiments, a biologically active moiety may be layered onto an ion exchange resin bead, or an inert (sugar) sphere bead to form a pellet or particle. Additionally, or alternatively, a "free" API or other "free" moiety may be admixed with other components and optionally coated, to form a granule, particle, or pellet, etc. In order to form a granule or particle, the active moiety (e.g., drug(s)) are typically admixed with suitable excipients. In certain embodiments, particles or granules are formed by admixing one or more biologically active moieties (e.g., a drug) with one or more excipients to form a particle or granule which may optionally be coated with one or more of the coating materials described in the preceding paragraphs. Suitable excipients for inclusion in such particles or granules include, e.g., at least one release retarding agent, a binder, and/or a diluent, such as are described in the following paragraphs. Formation and coating of such particles and granules are known to those of skill in the art.

In certain embodiments, a drug-ion exchange resin complex (which may contain one or more different drugs) has been granulated with a hydrophilic or hydrophobic matrix forming polymer. In certain embodiments, the matrix forming polymer is present in an amount of about 5% w/w to about 40% w/w, or about 5% w/w to about 35% w/w, or about 5% w/w to about 30% w/w, or about 5% w/w to about 25% w/w, or about 5% w/w to about 20% w/w, or about 10% w/w to about 35% w/w, or about 15% w/w to about 35% w/w. based on the uncoated drug-ion exchange resin complex. In one embodiment, the matrix comprises a hydrophilic polymer, or a blend containing same, such as Kollidon® SR (80% polyvinyl acetate, 19% polyvinylpyrrolidone, 0.8% sodium lauryl sulfate, 0.2% Silica), available from BASF. Other hydrophilic polymers may be selected.

Pharmaceutically Acceptable Excipients

The compositions of the invention may be in liquid form, such a suspension, or in solid form (e.g., a powder, powder for suspension (POS), tablet, capsule, other suitable form). The excipients for the composition are selected accordingly. For example, excipients in a tablet may include binders, diluents, disintegrating agent, osmogents, release retarding polymers, flow aids, compression aids, lubricants and/or anti-adherents. Excipients in a capsule may include binders, diluents, release retarding polymers, flow aids. Excipients in a suspension, powder, pudding, paste and/or ER POS may include suspending agents and/or thickening agent, wetting agents, and/or preservatives. Excipients are discussed in subsequent section.

Modified Release Tablet Excipients

Excipients in a tablet may include one or more of each: binders, diluents, superdisintegrant, osmogents, release retarding agent, flow aids, compression aids, lubricants and/or anti-adherents. One or more superdisintegrants can be selected from low-substituted hydroxypropyl cellulose, microcrystalline cellulose, cross-linked sodium or calcium carboxymethyl cellulose, cellulose fiber, cross-linked polyvinyl pyrrolidone, cross-linked polyacrylic acid, cross-linked Amberlite resin, alginates, colloidal magnesium-aluminum silicate, corn starch granules, rice starch granules, potato starch granules, pregelatinised starch and sodium carboxymethyl starch. Examples of suitable binders include, but are not limited to, starch, pregelatinized starch, polyvinyl pyrrolidone (PVP), copovidone, cellulose derivatives, such as hydroxypropylmethyl cellulose (HPMC), hydroxypropyl cellulose (HPC) and carboxymethyl cellulose (CMC) and their salts. Examples of suitable diluents include, but are not limited to, starch, dicalcium phosphate, microcrystalline cellulose, lactose monohydrate, dextrate hydrated and the like. Examples of suitable lubricants include, but are not limited to, magnesium stearate, calcium stearate, stearic acid, talc, and sodium stearyl fumarate. Compositions may optionally also include a glidant such as, but not limited to, colloidal silica, silica gel, precipitated silica, or combinations thereof. Release retarding agent can be polymeric, or non-polymeric type. Release retardant can be pH dependent or pH independent. Release retardant may be hydrophilic or hydrophobic or both. hydrophobic release controlling agents are selected from the group comprising ammonio methacrylate copolymers type A and B as described in USP, methacrylic acid copolymer type A, B and C as described in USP, polyacrylate dispersion 30% as described in Ph. Eur., polyvinyl acetate dispersion, ethylcellulose, cellulose acetate, cellulose propionate (lower, medium or higher molecular weight), cellulose acetate propionate, cellulose acetate butyrate, cellulose acetate phthalate, cellulose triacetate, poly(methyl methacrylate), poly(ethyl methacrylate), poly(butyl methacrylate), polyrisobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acetylate), poly(octadecyl acrylate), waxes such as beeswax, carnauba wax, microcrystalline wax, and ozokerite; fatty alcohols such as cetostearyl alcohol, stearyl alcohol; cetyl alcohol and myristyl alcohol; and fatty acid esters such as glyceryl monostearate; glycerol monooleate, acetylated monoglycerides, tristearin, tripalmitin, cetyl esters wax, glyceryl palmitostearate, glyceryl behenate and hydrogenated castor oil. Examples of hydrophilic polymers suitable for use in this invention are cellulose polymers and their derivatives (such as for example, hydroxyethylcellulose, hydroxypropylcellulose, carboxymethylcellulose, polysaccharides and their derivatives, polyalkylene oxides, polyethylene glycols, chitosan, poly(vinyl alcohol), xanthan gum, maleic anhydride copolymers, starch-based polymers, crosslinked polyacrylic acids and their derivative, Kollidon® SR (PVA PVP copolymer). Suitable examples of osmogents or pharmaceutically acceptable inert water-soluble compounds are selected from the group comprising carbohydrates such as xylitol, mannitol, sorbitol, arabinose, ribose, xylose, glucose, fructose, mannose, galactose, sucrose, maltose, lactose, dextrose and raffinose; water-soluble salts of inorganic acids such as magnesium chloride, magnesium sulfate, potassium sulfate, lithium chloride, sodium chloride, potassium chloride, lithium hydrogen phosphate, sodium hydrogen phosphate, potassium hydrogen phosphate, lithium dihydrogen phosphate, sodium dihydrogen phosphate, potassium dihydrogen phosphate, and sodium phosphate tribasic; water-soluble salts of organic acids such as sodium acetate, potassium acetate, magnesium succinate, sodium benzoate, sodium citrate, and sodium ascorbate; water-soluble amino acids such as glycine, leucine, alanine, methionine; urea or its derivatives; propylene glycol; glycerin; polyethylene oxide; xanthan gum; hydroxypropylmethyl cellulose; or mixtures thereof.

In certain embodiments, a modified release tablet comprises i. biologically active moiety optionally granulated and/or coated with release retardant ii. an IPN forming blend, optionally comprising a (semi or full) IPN, comprising at least one anionic polymer, at least one galactomannan, and at least two cross linking agents iii. At least one gas generating agent iv. at least one super-disintegrant v. at least one binder vi. lubricant and flow aid. In certain embodiments, a modified release tablet comprises i. biologically active moiety granulated with matrix forming release retardant forming release retardant (e.g., polyvinylacetate and coated with water permeable diffusion barrier forming release retardant (5% w/w, 2-20% w/w) Kollicoat SR 30D. ii. an IPN forming blend, optionally comprising a (semi or full) IPN, comprising pectin (10% w/w, 5-30% w/w), guar gum (10% w/w, 5-30% w/w), borax (2% w/w, 1-6% w/w) and calcium chloride (5% w/w, 2-15% w/w). iii. Gas generating agent, Calcium carbonate (5% w/w, 2-15% w/w) iv. Superdisintegrating agent Crospovidone (13% w/w, 6-25% w/w) v. Binder copovidone (5% w/w, 3-10% w/w) vi. Magnesium stearate (0.5% w/w, 0.5-2% w/w) and colloidal silicon dioxide (0.02% w/w, 0.1-1% w/w). In certain embodiments, a composition comprises i. biologically active moiety optionally granulated and/or coated with release retardant ii. an IPN forming blend, optionally comprising a (semi or full) IPN, comprising at least two anionic polymers and at least one cross linking agent iii. At least one gas generating agent iv. at least one super-disintegrant v. at least one binder vi. a lubricant and flow aid. In certain embodiments, a composition (e.g. a modified release tablet), comprises i. biologically active moiety granulated with a pH-independent matrix forming release retardant (e.g., polyvinylacetate, or a blend containing same, such as Kollidon® SR (80% PVAc, 19% Povidone, 0.8% SLS, 0.2% Silica), available from BASF (15% w/w, 5-40% w/w) and coated with water permeable pH-independent diffusion barrier forming release retardant (15% w/w, 2-20% w/w)(e.g., a polyvinylacetate blend such as Kollicoat® SR 30D (polyvinyl acetate stabilized with polyvinylpyrrolidone and sodium lauryl sulfate)). ii. an IPN forming blend, optionally comprising a (semi or full) IPN, comprising pectin (10% w/w, 5-30% w/w) (anionic polymer), carrageenan iota (10% w/w, 5-30% w/w) (anionic polymer), and calcium chloride (5% w/w, 2-15% w/w). iii. Gas generating agent, Calcium carbonate (5% w/w, 2-15% w/w) iv. Superdisintegrating agent Crospovidone (18% w/w, 6-25% w/w) v. Binder copovidone (5% w/w, 3-10% w/w) vi. Magnesium stearate (0.5% w/w, 0.5-2% w/w) and colloidal silicon dioxide (0.02% w/w, 0.1-1% w/w).

In certain embodiments, a modified release tablet comprises i. biologically active moiety optionally granulated and/or coated with release retardant ii. an IPN forming blend, optionally comprising a (semi or full) IPN, comprising at least one galactomannan, at least one anionic polymer, at least one non-ionic polymer and at least two cross linking agents iii. At least one gas generating agent iv. at least one super-disintegrant v. at least one binder vi. a lubricant and flow aid. In certain embodiments, a modified release tablet comprises i. biologically active moiety granulated with of a pH-independent matrix forming release retardant (e.g., polyvinylacetate, or a blend containing same, such as Kollidon® SR (80% PVAc, 19% Povidone, 0.8% SLS, 0.2% Silica), available from BASF (2% w/w, 1-40% w/w) and coated with a water permeable pH-independent diffusion barrier forming release retardant (e.g., a polyvinylacetate blend such as Kollicoat® SR 30D (polyvinyl acetate stabilized with polyvinylpyrrolidone and sodium lauryl sulfate))(1% w/w, 0.5-20% w/w). ii. an IPN forming blend, optionally comprising a (semi or full) IPN, comprising pectin (10% w/w, 5-30% w/w), fenugreek gum (10% w/w, 5-20% w/w), HPMC K100M (3% w/w, 1-20% w/w), calcium chloride (7% w/w, 2-15% w/w) and borax (5% w/w, 2.5-10% w/w). iii. Gas generating agent, Calcium carbonate (15% w/w, 5-15% w/w) iv. Superdisintegrating agent Crospovidone (25% w/w, 6-40% w/w) v. Binder copovidone (5% w/w, 3-10% w/w) vi. Magnesium stearate (0.5% w/w, 0.5-2% w/w) and colloidal silicon dioxide (0.02% w/w, 0.1-1% w/w).

In certain embodiments, a modified release tablet comprises i. biologically active moiety optionally granulated and/or coated with release retardant ii. an IPN forming blend, optionally comprising a (semi or full) IPN, comprising at least one galactomannan, at least two anionic polymers, at least one non-ionic polymer and at least two cross linking agents iii. At least one gas generating agent iv. at least one super-disintegrant v. at least one binder vi. a lubricant and flow aid. In certain embodiments, a modified release tablet comprises i. biologically active moiety granulated with matrix forming release retardant (e.g., Kollidon® SR) (2% w/w, 1-40% w/w) and coated with water permeable diffusion barrier forming release retardant or about 1% w/w) (e.g., Kollicoat SR 30D). ii. an IPN forming blend, optionally comprising a (semi or full) IPN, comprising pectin (5% w/w, 3-15% w/w), carrageenan iota (5% w/w, 3-15% w/w), fenugreek gum (10% w/w, 5-20% w/w), HPMC K100M (3% w/w, 1-20% w/w), calcium chloride (7% w/w, 2-15% w/w) and borax (5% w/w, 2.5-10% w/w). iii. Gas generating agent, Calcium carbonate (15% w/w, 5-15% w/w) iv. Superdisintegrating agent Crospovidone (25% w/w, 6-40% w/w) v. Binder copovidone (5% w/w, 3-10% w/w) vi. Magnesium stearate (0.5% w/w, 0.5-2% w/w) and colloidal silicon dioxide (0.02% w/w, 0.1-1% w/w).

In certain embodiments, a modified release tablet comprises i. biologically active moiety optionally granulated and/or coated with release retardant ii. an IPN forming blend, optionally comprising a (semi or full) IPN, comprising at least two galactomannan polymers and at least one cross linking agent iii. At least one gas generating agent iv. at least one super-disintegrant v. at least one binder vi. a lubricant and flow aid. In certain embodiments, a modified release tablet comprises i. biologically active moiety granulated with matrix forming release retardant (e.g., Kollidon® SR) (10% w/w, 5-40% w/w) and coated with water permeable diffusion barrier forming release retardant (5% w/w, 2-20% w/w) (e.g., Kollicoat® SR 30D). ii. an IPN forming blend, optionally comprising a (semi or full) IPN, comprising fenugreek gum (10% w/w, 5-30% w/w), guar gum (10% w/w, 5-30% w/w), borax (8% w/w, 4-24% w/w). iii. Gas generating agent, Calcium carbonate (5% w/w, 2-15% w/w) iv. Superdisintegrating agent Crospovidone (13% w/w, 6-25% w/w) v. Binder copovidone (5% w/w, 3-10% w/w) vi. Magnesium stearate (0.5% w/w, 0.5-2% w/w) and colloidal silicon dioxide (0.02% w/w, 0.1-1% w/w).

In certain embodiments, a modified release tablet comprises i. biologically active moiety optionally granulated and/or coated with release retardant ii. an IPN forming blend, optionally comprising a (semi or full) IPN, comprising at least two galactomannan polymers, at least one anionic polymer and at least two cross linking agents iii. At least one gas generating agent iv. at least one super-disintegrant v. at least one binder vi. a lubricant and flow aid. In certain embodiments, a modified release tablet comprises i. biologically active moiety granulated with matrix forming release retardant (e.g., Kollidon® SR) (10% w/w, 5-40% w/w) and coated with water permeable diffusion barrier forming release retardant (5% w/w, 2-20% w/w) (e.g., Kollicoat® SR 30D). ii. (semi or full) IPN comprising Pectin (anionic polymer) (10% w/w, 5-30% w/w), fenugreek gum (galactomannan) (5% w/w, 3-15% w/w), guar gum (galactomannan) (5% w/w, 3-15% w/w), borax (4% w/w, 2-12% w/w) (crosslinking agent) and calcium chloride (crosslinking agent) (5% w/w, 2-15% w/w). iii. Gas generating agent, Calcium carbonate (5% w/w, 2-15% w/w) iv. Superdisintegrating agent Crospovidone (10% w/w, 6-25% w/w) v. Binder copovidone (5% w/w, 3-10% w/w) vi. Magnesium stearate (0.5% w/w, 0.5-2% w/w) and colloidal silicon dioxide (0.02% w/w, 0.1-1% w/w).

In certain embodiments, a modified release tablet comprises i. biologically active moiety optionally granulated and/or coated with release retardant ii. an IPN forming blend, optionally comprising a (semi or full) IPN, comprising at least two galactomannan polymers, at least one anionic polymer, at least one non-ionic polymer and at least two cross linking agents iii. At least one gas generating agent iv. at least one super-disintegrant v. at least one binder vi. a lubricant and flow aid. In certain embodiments, a modified release tablet comprises i. biologically active moiety granulated with matrix forming release retardant (e.g., Kollidon® SR) (10% w/w, 5-40% w/w) and coated with water permeable diffusion barrier forming release retardant (5% w/w, 2-20% w/w) (e.g., Kollicoat® SR 30D). ii. an IPN forming blend, optionally comprising a (semi or full) IPN, comprising Pectin (anionic polymer) (10% w/w, 5-30% w/w), fenugreek gum (5% w/w, 3-15% w/w) (galactomannan), guar gum (5% w/w, 3-15% w/w) (galactomannan), HPMC K100M (5% w/w, 2-15% w/w) (non-ionic polymer), borax (4% w/w, 2-12% w/w) (crosslinking agent) and calcium chloride (5% w/w, 2-15% w/w) (crosslinking agent). iii. Gas generating agent, Calcium carbonate (5% w/w, 2-15% w/w) iv. Superdisintegrating agent Crospovidone (10% w/w, 6-25% w/w) v. Binder copovidone (5% w/w, 3-10% w/w) vi. Magnesium stearate (0.5% w/w, 0.5-2% w/w) and colloidal silicon dioxide (0.02% w/w, 0.1-1% w/w).

In certain embodiments, a modified release tablet comprises i. biologically active moiety optionally granulated and/or coated with release retardant ii. an IPN forming blend, optionally comprising a (semi or full) IPN, comprising at least two galactomannan polymers, at least one non-ionic polymer and at one cross linking agent iii. At least one gas generating agent iv. at least one super-disintegrant v. at least one binder vi. a lubricant and flow aid. In certain embodiments, a modified release tablet comprises i. biologically active moiety granulated with matrix forming release retardant (e.g., Kollidon® SR) (10% w/w, 5-40% w/w) and coated with water permeable diffusion barrier forming release retardant (5% w/w, 2-20% w/w) (e.g., Kollicoat® SR 30D). ii. an IPN forming blend, optionally comprising a (semi or full) IPN, comprising Pectin (10% w/w, 5-30% w/w), fenugreek gum (10% w/w, 3-25% w/w), guar gum (5% w/w, 3-15% w/w), HPMC K100M (5% w/w, 2-15% w/w), borax (6% w/w, 2-15% w/w) iii. Gas generating agent, Calcium carbonate (5% w/w, 2-15% w/w) iv. Superdisintegrating agent Crospovidone (10% w/w, 6-25% w/w) v. Binder copovidone (5% w/w, 3-10% w/w) vi. Magnesium stearate (0.5% w/w, 0.5-2% w/w) and colloidal silicon dioxide (0.02% w/w, 0.1-1% w/w).

In certain embodiments, a modified release tablet comprises i. drug-ion exchange resin complex optionally granulated and/or coated with release retardant ii. an IPN forming blend, optionally comprising a (semi or full) IPN, comprising at least one anionic polymer, at least one galactomannan, and at least two cross linking agents iii. At least one gas generating agent iv. at least one super-disintegrant v. at least one binder vi. lubricant and flow aid. In certain embodiments, a modified release tablet comprises. i. drug-ion exchange resin complex granulated with matrix forming release retardant (e.g., Kollidon® SR) (10% w/w, 5-40% w/w) and coated with water permeable diffusion barrier forming release retardant (5% w/w, 2-20% w/w) (e.g., Kollicoat® SR 30D). ii. an IPN forming blend, optionally comprising a (semi or full) IPN, comprising Pectin (10% w/w, 5-30% w/w), fenugreek gum (5% w/w, 3-15% w/w), borax (4% w/w, 2-12% w/w) and calcium chloride (5% w/w, 2-15% w/w). iii. Gas generating agent, Calcium carbonate (5% w/w, 2-15% w/w) iv. Superdisintegrating agent Crospovidone (10% w/w, 6-25% w/w) v. Binder copovidone (5% w/w, 3-10% w/w) vi. Magnesium stearate (0.5% w/w, 0.5-2% w/w) and colloidal silicon dioxide (0.02% w/w, 0.1-1% w/w).

In certain embodiments, a modified release tablet comprises i. drug-ion exchange resin complex optionally granulated and/or coated with release retardant ii. an IPN forming blend, optionally comprising a (semi or full) IPN, comprising at least two anionic polymers and at least one cross linking agent iii. At least one gas generating agent iv. at least one super-disintegrant v. at least one binder vi. a lubricant and flow aid. In certain embodiments, a modified release tablet comprises. i. drug-ion exchange resin complex granulated with matrix forming release retardant Kollidon® SR (10% w/w, 5-40% w/w) and coated with water permeable diffusion barrier forming release retardant (5% w/w, 2-20% w/w) Kollicoat® SR 30D. ii. an IPN forming blend, optionally comprising a (semi or full) IPN, comprising Pectin (10% w/w, 5-30% w/w), Carrageenan iota (5% w/w, 3-15% w/w), and calcium chloride (5% w/w, 2-15% w/w). iii. Gas generating agent, Calcium carbonate (5% w/w, 2-15% w/w) iv. Superdisintegrating agent Crospovidone (10% w/w, 6-25% w/w) v. Binder copovidone (5% w/w, 3-10% w/w) vi. Magnesium stearate (0.5% w/w, 0.5-2% w/w) and colloidal silicon dioxide (0.02% w/w, 0.1-1% w/w).

In certain embodiments, a modified release tablet comprises i. drug-ion exchange resin complex optionally granulated and/or coated with release retardant ii. an IPN forming blend, optionally comprising a (semi or full) IPN, comprising at least one galactomannan, at least one anionic polymer, at least one non-ionic polymer and at least two cross linking agents iii. At least one gas generating agent iv. at least one super-disintegrant v. at least one binder vi. a lubricant and flow aid. In certain embodiments, a modified release tablet comprises. i. drug-ion exchange resin complex granulated with matrix forming release retardant Kollidon® SR (10% w/w, 5-40% w/w) and coated with water permeable diffusion barrier forming release retardant (5% w/w, 2-20% w/w) Kollicoat® SR 30D. ii. an IPN forming blend, optionally comprising a (semi or full) IPN, comprising Pectin (10% w/w, 5-30% w/w), Guar gum (5% w/w, 3-15% w/w), HPMC K100M (5% w/w, 2-20% w/w), Borax (2% w/w, 0.8-6% w/w) and calcium chloride (5% w/w, 2-15% w/w). iii. Gas generating agent, Calcium carbonate (5% w/w, 2-15% w/w) iv. Superdisintegrating agent Crospovidone (10% w/w, 6-25% w/w) v. Binder copovidone (5% w/w, 3-10% w/w) vi. Magnesium stearate (0.5% w/w, 0.5-2% w/w) and colloidal silicon dioxide (0.02% w/w, 0.1-1% w/w).

In certain embodiments, a modified release tablet comprises i. drug-ion exchange resin complex optionally granulated and/or coated with release retardant ii. an IPN forming blend, optionally comprising a (semi or full) IPN, comprising at least one galactomannan, at least two anionic polymers, at least one non-ionic polymer and at least two cross linking agents iii. At least one gas generating agent iv. at least one super-disintegrant v. at least one binder vi. a lubricant and flow aid. In certain embodiments, a modified release tablet comprises. i. drug-ion exchange resin complex granulated with matrix forming release retardant Kollidon® SR (5% w/w, 2-20% w/w) and coated with water permeable diffusion barrier forming release retardant (2% w/w, 0.5-15% w/w) Kollicoat® SR 30D. ii. an IPN forming blend, optionally comprising a (semi or full) IPN, comprising Guar gum (5% w/w, 2-15% w/w), Pectin (5% w/w, 5-30% w/w), Carrageenan iota (5% w/w, 3-15% w/w), HPMC K100M (5% w/w, 2-20% w/w), Borax (1% w/w, 0.4-3% w/w) and calcium chloride (5% w/w, 2-15% w/w). iii. Gas generating agent, Calcium carbonate (5% w/w, 2-15% w/w) iv. Superdisintegrating agent Crospovidone (10% w/w, 6-25% w/w) v. Binder copovidone (5% w/w, 3-10% w/w) vi. Magnesium stearate (0.5% w/w, 0.5-2% w/w) and colloidal silicon dioxide (0.02% w/w, 0.1-1% w/w).

In certain embodiments, a modified release tablet comprises i. drug-ion exchange resin complex optionally granulated and/or coated with release retardant ii. an IPN forming blend, optionally comprising a (semi or full) IPN, comprising at least two galactomannan polymers and at least one cross linking agent iii. At least one gas generating agent iv. at least one super-disintegrant v. at least one binder vi. a lubricant and flow aid. In certain embodiments, a modified release tablet comprises. i. drug-ion exchange resin complex granulated with matrix forming release retardant Kollidon® SR (5% w/w, 2-20% w/w) and coated with water permeable diffusion barrier forming release retardant (2% w/w, 0.5-15% w/w) Kollicoat® SR 30D. ii. an IPN forming blend, optionally comprising a (semi or full) IPN, comprising Guar gum (10% w/w, 2-20% w/w), Fenugreek gum (10% w/w, 5-30% w/w), and Borax (8% w/w, 3-15% w/w). iii. Gas generating agent, Calcium carbonate (5% w/w, 2-15% w/w) iv. Superdisintegrating agent Crospovidone (10% w/w, 6-25% w/w) v. Binder copovidone (5% w/w, 3-10% w/w) vi. Magnesium stearate (0.5% w/w, 0.5-2% w/w) and colloidal silicon dioxide (0.02% w/w, 0.1-1% w/w).

In certain embodiments, a modified release tablet comprises i. biologically active moiety (e.g., API or any salt thereof) optionally granulated and/or coated with release retardant ii. an IPN forming blend, optionally comprising a (semi or full) IPN, comprising at least two galactomannan polymers, at least one anionic polymer and at least two cross linking agents iii. At least one gas generating agent iv. at least one super-disintegrant v. at least one binder vi. a lubricant and flow aid. In certain embodiments, a modified release tablet comprises. i. drug-ion exchange resin complex granulated with matrix forming release retardant Kollidon® SR (5% w/w, 2-20% w/w) and coated with water permeable diffusion barrier forming release retardant (2% w/w, 0.5-15% w/w) Kollicoat® SR 30D. ii. an IPN forming blend, optionally comprising a (semi or full) IPN, comprising Guar gum (5% w/w, 2-20% w/w), Fenugreek gum (5% w/w, 5-30% w/w), Carrageenan kappa (5% w/w, 2-20% w/w), potassium citrate (1% w/w, 0.5-5% w/w) and Borax (8% w/w, 3-15% w/w). iii. Gas generating agent, Calcium carbonate (5% w/w, 2-15% w/w) iv. Superdisintegrating agent Crospovidone (10% w/w, 6-25% w/w) v. Binder copovidone (5% w/w, 3-10% w/w) vi. Magnesium stearate (0.5% w/w, 0.5-2% w/w) and colloidal silicon dioxide (0.02% w/w, 0.1-1% w/w).

In certain embodiments, a modified release tablet comprises i. drug-ion exchange resin complex optionally granulated and/or coated with release retardant ii. an IPN forming blend, optionally comprising a (semi or full) IPN, comprising at least two galactomannan polymers, at least one anionic polymer, at least one non-ionic polymer and at least two cross linking agents iii. At least one gas generating agent iv. at least one super-disintegrant v. at least one binder vi. a lubricant and flow aid. In certain embodiments, a modified release tablet comprises. i. drug-ion exchange resin complex granulated with matrix forming release retardant Kollidon® SR (5% w/w, 2-20% w/w) and coated with water permeable diffusion barrier forming release retardant (2% w/w, 0.5-15% w/w) Kollicoat® SR 30D. ii. an IPN forming blend, optionally comprising a (semi or full) IPN, comprising Guar gum (5% w/w, 2-20% w/w), Fenugreek gum (5% w/w, 5-30% w/w), Carrageenan kappa (5% w/w, 2-20% w/w), HPMC K100M (5% w/w, 1-15% w/w), potassium citrate (1% w/w, 0.5-5% w/w) and Borax (8% w/w, 3-15% w/w). iii. Gas generating agent, Calcium carbonate (5% w/w, 2-15% w/w) iv. Superdisintegrating agent Crospovidone (10% w/w, 6-25% w/w) v. Binder copovidone (5% w/w, 3-10% w/w) vi. Magnesium stearate (0.5% w/w, 0.5-2% w/w) and colloidal silicon dioxide (0.02% w/w, 0.1-1% w/w).

In certain embodiments, a modified release tablet comprises i. drug-ion exchange resin complex optionally granulated and/or coated with release retardant ii. an IPN forming blend, optionally comprising a (semi or full) IPN, comprising at least two galactomannan polymers, at least one non-ionic polymer and at one cross linking agent iii. At least one gas generating agent iv. at least one super-disintegrant v. at least one binder vi. a lubricant and flow aid. In certain embodiments, a modified release tablet comprises. i. drug-ion exchange resin complex granulated with matrix forming release retardant Kollidon® SR (5% w/w, 2-20% w/w) and coated with water permeable diffusion barrier forming release retardant (2% w/w, 0.5-15% w/w) Kollicoat® SR 30D. ii. an IPN forming blend, optionally comprising a (semi or full) IPN, comprising Guar gum (5% w/w, 2-20% w/w), Fenugreek gum (5% w/w, 5-30% w/w), HPMC K100M (5% w/w, 2-20% w/w), and Borax (8% w/w, 3-15% w/w). iii. Gas generating agent, Calcium carbonate (5% w/w, 2-15% w/w) iv. Superdisintegrating agent Crospovidone (10% w/w, 6-25% w/w) v. Binder copovidone (5% w/w, 3-10% w/w) vi. Magnesium stearate (0.5% w/w, 0.5-2% w/w) and colloidal silicon dioxide (0.02% w/w, 0.1-1% w/w).

In certain embodiments, a modified release tablet comprises components as per any of the above embodiments plus one or more liquid crystal forming substances.

In certain embodiments, a modified release tablet comprises components as per any of the above embodiments plus one or more liquid crystal forming substances.

Suspension Excipients

In certain embodiments, a powder composition comprising a floating IPN system is reconstituted with an aqueous media to form a pudding (or paste) or suspension. In certain embodiments, the sole ingredient used for this reconstitution is water (e.g., a purified water, deionized water, or tap or bottled water). In other embodiments, the water is included in an aqueous suspension base which may include various excipients in addition to water. Optionally, the suspension base may include one or more additional components of the IPN forming system and/or an additional active ingredient. Preferably, for reconstitution, the amount of the floating IPN system to water ratio is controlled. In certain embodiments, the) powder composition to water ratio is about 1 to about 0.1 to about 1 to about 15 (1:0.1 to 1:15). In certain embodiments, the powder to water ratio is about 1 to about 0.5 to about 1 to about 10 (1:0.5 to 1:10). In other embodiments, the powder to water ratio is about 1 to about 2 to about 1 to about 7 (1:2 to 1:7). In certain embodiments, the product reconstituted according to these powder:water ratios is a suspension (e.g., at a solid content of less than 20 wt %), a pudding or a paste (e.g., at a solids content of 20 wt % to 50 wt %).

An aqueous suspension base may include, e.g., one or more of each of the following: binders, diluents, salivating agents, surfactants, flavors, sweeteners, colorants, souring agents, viscolizers, glidants, chelating agents, lubricants, solubilizers, stabilizers, suspending agents, preservatives, cosolvents, anti-caking agents, buffers and/or the like or any combinations thereof. Examples of suitable binders include, but are not limited to, starch, pregelatinized starch, polyvinyl pyrrolidone, copovidone, cellulose derivatives, such as hydroxypropylmethyl cellulose, hydroxypropyl cellulose and carboxymethyl cellulose and their salts. Examples of suitable diluents include, but are not limited to, starch, microcrystalline cellulose, lactose, xylitol, mannitol, maltose, polyols, fructose, guar gum, sorbitol, magnesium hydroxide, dicalcium phosphate, coprocessed mannitol and calcium silicate and the like or any combinations thereof. Examples of lubricants include, but are not limited to, magnesium stearate, calcium stearate, stearic acid, talc, and sodium stearyl fumarate. Suitable glidants includes but are not limited to, colloidal silica, silica gel, precipitated silica, or combinations thereof. Suitable salivating agents include, but are not limited to, micronized polyethylene glycol, sodium chloride or precipitated micronized silica. Examples of solubilizers include, but are not limited to cetostearyl alcohol, cholesterol, diethanolamine, ethyl oleate, ethylene glycol palmitostearate, glycerin, glyceryl monostearate, isopropyl myristate, lecithin, medium-chain glyceride, monoethanolamine, oleic acid, propylene glycol, polyoxyethylene alkyl ether, polyoxyethylene castor oil glycoside, polyoxyethylene sorbitan fatty acid ester, polyethylene sorbitan fatty acid ester, polyoxyethylene stearate, propylene glycol alginate, sorbitan fatty acid ester, stearic acid, sunflower oil, triethanolamine, or combinations thereof. Souring agents include, but are not limited to, monosodium fumarate and/or citric acid. The compositions of the present invention may also include stabilizers such as, but not limited to, those described above under drug-resin complexes. Suitable chelating agents that may be employed have been discussed herein above. Suitable viscolizers include, but are not limited to, coprocessed microcrystalline cellulose such as but not limited to, Avicel RC591, Avicel CL-611, D-sorbitol solution, polyalkylene oxides such as, but not limited to polyethylene oxide; cellulose ethers such as, but not limited to hydroxyethyl cellulose, hydroxypropylcellulose, hydroxypropyl methyl cellulose, methyl cellulose, ethyl cellulose, sodium carboxy methylcellulose, calcium carboxymethyl cellulose, microcrystalline cellulose; gums such as but not limited to gum arabic alginates, agar, sodium alginate guar gum, locust bean, carrageenan, tara, gum arabic, tragacanth, pectin, xanthan, gellan, maltodextrin, galactomannan, pusstulan, laminarin, scleroglucan, gum arabic, inulin, karaya, whelan; polyols such as, but not limited to dipropylene glycol, polypropylene glycol, propylene glycol, polyethylene glycol (PEG), sorbitol and glycerol; carbopol, starch and starch-based polymers such as, but not limited to, pregelatinized starch, acrylic acid and methacrylic acid polymers, and esters thereof, maleic anhydride polymers; polymaleic acid; poly(acrylamides); poly(olefinic alcohol)s; poly(N-vinyl lactams); polyoxyethylated saccharides; polyoxazolines; polyvinylamines; polyvinylacetates; polyimines; povidone, vinylpyrrolidone/vinyl acetate copolymer and polyvinyl acetate, mixture of polyvinyl acetate and polyvinylpyrrolidone, chitin, cyclodextrin, gelatin, chitosan and the like or any mixtures thereof. Suitable surfactants include, but are not limited to, anionic, nonionic, cationic, and zwitterionic surfactants or a mixture thereof. The non-ionic surfactants employed in the composition may include, but are not limited to, ethoxylated fatty acid ester, ethoxylated fatty acid ethers, ethoxylated sorbitan ethers, ethoxylated alkyl-phenols, glycerol esters, glycerol sugar esters, polyoxyethyleneglycerol monolaurate, polyoxyethyleneglycerol monostearate, polyoxyethylene-20-cetyl stearate, polyoxyethylene-25-cetyl stearate, polyoxyethylene (25)-oxypropylene monostearate, polyoxyethylene-20-sorbitan monopalmitate, poly-oxyethylene-16-tert-octyl phenol, polyoxyethylene-20-cetyl ether, polyethylene glycol (1000) monocetyl ether, ethoxylated castor oil, polyoxyethylene sorbitol-lanolin derivatives, polyoxyethylene(25)propylene glycol stearate, polyoxyethylenesorbitol esters, polyoxyethylene-20-sorbitan monopalmitate, polyoxyethylene-16-tert-octylphenol, polyoxyethylene-20-cetyl ether, glyceryl undecylenate and Polysorbate 60, capmul (medium chain glyceride), peceol (glyceryl monooleate), glyceryl laurate and glyceryl caprylate (Capmul MCM), PEG sorbitan fatty acid esters like PEG-20 sorbitan monolaurate (Tween 20), PEG-20 sorbitan monostearate (Tween 60), PEG-20 sorbitan monooleate (Tween 80), sorbitan fatty acid esters like sorbitan monolaurate (Span 20), glyceryl stearate (Cithrol GMS) or the like and mixtures thereof. Suitable cationic surfactants include, but are not limited to, quaternary ammonium compounds, alkylamidoamines and quaternary ester compounds, distearyl dimethyl ammonium chloride, dimyristyl dimethyl ammonium chloride, dipalmityl dimethyl ammonium chloride or the like and mixtures thereof. Suitable anionic surfactants include, but are not limited to, fatty alcohol sulfates, alpha olefin sulfonates, sulfosuccinates, phosphate esters, carboxylates, sarcosinates, alkyl benzene sulfonates, alkyl sulfonates, olefin sulfonates, alkyl ethersulfonates, glycerol ethersulfonates, a-methyl estersulfonates, sulfonic fatty acids, alkyl sulfates, fatty alcohol ethersulfates, glycerol ethersulfates, mixed hydroxy ethersulfates, monoglyceride (ether)sulfates, fatty acid amide (ether)sulfates, sulfosuccinates, sulfosuccinamates, sulfotriglycerides, amide soaps, ether carboxylic acids, isethionates, sarcosinates, taurides, alkyl oligoglycoside sulfates, alkyl (ether)phosphates or the like and mixtures thereof. Suitable zwitterionic surfactants employed include, but are not limited to, N-alkyl-N,N-dimethyl ammonium glycinates, for example cocoalkyl dimethyl ammonium glycinate, N-acyl aminopropyl-N,N-dimethyl ammonium glycinates, cocoacyl aminoethyl hydroxyethyl carboxymethyl glycinate or the like and mixtures thereof. Further, the composition of the present invention may further comprise a preservative such as but not limited to methyl parahydroxybenzoate, propyl parahydroxybenzoate and sodium benzoate. Suitable cosolvent that may be used includes, but is not limited to, ethanol and polyhydric alcohols such as, but not limited to, glycerin, propylene glycol, low molecular weight polyethylene glycols, and mixtures thereof. Further anti-caking agents that may be optionally incorporated include, but are not limited to, colloidal silicon dioxide, tribasic calcium phosphate, powdered cellulose, magnesium trisilicate, starch, and mixtures thereof. Suitable sweetening agent includes, but is not limited to, aspartame, stevia extract, glycyrrhiza, saccharine, saccharine sodium, acesulfame, sucralose, dipotassium glycyrrhizinate, galactose, fructose, high fructose corn syrup, dextrose, sucrose, sugar, maltose, partially hydrolyzed starch, corn syrup solids, sorbitol, xylitol, mannitol and the like or mixtures thereof. The compositions may comprise one or more natural and/or artificial flavors such as, but not limited to, mint flavor, orange flavor, lemon flavors, strawberry aroma, vanilla flavor, raspberry aroma, cherry flavor, tutti frutti flavor, magna sweet 135, key lime flavor, grape flavor, and fruit extracts and the like. Suitable colorants include, but are not limited to, pigments and dyes such as FD&C Red, FD&C Yellow, FD&C Green, and FD&C Blue and the like or combinations thereof.

The exemplary combinations of recited components from the section relating to modified release tablets herein is incorporated by reference into this section. The weight percentages from this section are hereby incorporated by reference as well, with the total weight being based on the powder, or the solids in the suspension, rather than the total tablet.

In certain embodiments, a modified release powder comprises i. drug-ion exchange resin complex ii. drug-ion exchange resin complex coated with water permeable diffusion barrier iii. an IPN forming blend, optionally comprising a an IPN forming blend, optionally comprising a (semi or full) IPN, comprising at least one anionic polymer, at least one galactomannan, and at least two cross linking agents iv. At least one gas generating agent.

In certain embodiments, a modified release powder comprises i. drug-ion exchange resin complex ii. drug-ion exchange resin complex coated with water permeable diffusion barrier iii. an IPN forming blend, optionally comprising a (semi or full) IPN, comprising at least two anionic polymers and at least one cross linking agent iv. At least one gas generating agent In certain embodiments, a modified release powder comprises i. drug-ion exchange resin complex ii. drug-ion exchange resin complex coated with water permeable diffusion barrier iii. an IPN forming blend, optionally comprising a (semi or full) IPN, comprising at least one galactomannan, at least one anionic polymer, at least one non-ionic polymer and at least two cross linking agents iv. At least one gas generating agent.

In certain embodiments, a modified release powder comprises i. drug-ion exchange resin complex ii. drug-ion exchange resin complex coated with water permeable diffusion barrier iii. an IPN forming blend, optionally comprising a (semi or full) IPN, comprising at least one galactomannan, at least two anionic polymers, at least one non-ionic polymer and at least two cross linking agents iv. At least one gas generating agent.

In certain embodiments, a modified release powder comprises i. drug-ion exchange resin complex ii. drug-ion exchange resin complex coated with water permeable diffusion barrier iii. an IPN forming blend, optionally comprising a (semi or full) IPN, comprising at least two galactomannan polymers and at least one cross linking agent; and iv. At least one gas generating agent.

In certain embodiments, a modified release powder comprises i. drug-ion exchange resin complex ii. drug-ion exchange resin complex coated with water permeable diffusion barrier iii. an IPN forming blend, optionally comprising a (semi or full) IPN, comprising at least two galactomannan polymers, at least one anionic polymer and at least two cross linking agents; and iv. At least one gas generating agent.

In certain embodiments, a modified release powder comprises i. drug-ion exchange resin complex ii. drug-ion exchange resin complex coated with water permeable diffusion barrier iii. an IPN forming blend, optionally comprising a (semi or full) IPN, comprising at least two galactomannan polymers, at least one anionic polymer, at least one non-ionic polymer and at least two cross linking agents; and iv. At least one gas generating agent.

In certain embodiments, a modified release powder comprises i. drug-ion exchange resin complex ii. drug-ion exchange resin complex coated with water permeable diffusion barrier iii. an IPN forming blend, optionally comprising a (semi or full) IPN, comprising at least two galactomannan polymers, at least one non-ionic polymer and at one cross linking agent; and iv. At least one gas generating agent.

In certain embodiments, a modified release powder comprises i. Granules comprising a biologically active moiety, a diluent and a binder ii. Granules comprising a biologically active moiety, at least one release retarding agent, a binder and optionally a diluent that are coated with water permeable diffusion barrier iii. an IPN forming blend, optionally comprising a (semi or full) IPN, comprising at least one anionic polymer, at least one galactomannan, and at least two cross linking agents; and iv. At least one gas generating agent.

In certain embodiments, a modified release powder comprises i. Granules comprising a biologically active moiety, a diluent and a binder ii. Granules comprising a biologically active moiety, at least one release retarding agent, a binder and optionally a diluent that are coated with water permeable diffusion barrier iii. an IPN forming blend, optionally comprising a (semi or full) IPN, at least one anionic polymer, at least two galactomannans, at least one non-ionic polymer and at least two cross linking agents; and iv. At least one gas generating agent In certain embodiments, a modified release powder comprises i. Granules comprising a biologically active moiety, a diluent and a binder ii. Granules comprising a biologically active moiety, at least one release retarding agent, a binder and optionally a diluent that are coated with water permeable diffusion barrier iii. an IPN forming blend, optionally comprising a (semi or full) IPN, forming blend comprising at least one anionic polymer, at least two galactomannans and at least two cross linking agents; and iv. At least one gas generating agent.

In certain embodiments, a modified release powder comprises i. Granules comprising a biologically active moiety, a diluent and a binder ii. Granules comprising a biologically active moiety, at least one release retarding agent, a binder and optionally a diluent that are coated with water permeable diffusion barrier iii. an IPN forming blend, optionally comprising a (semi or full) IPN, comprising at least one anionic polymer, at least one galactomannan, at least one non-ionic polymer and at least two cross linking agents; and iv. At least one gas generating agent In certain embodiments, a modified release powder comprises i. Granules comprising a biologically active moiety, a diluent and a binder ii. Granules comprising a biologically active moiety, at least one release retarding agent, a binder and optionally a diluent that are coated with water permeable diffusion barrier iii. an IPN forming blend, optionally comprising a (semi or full) IPN, comprising at least two galactomannans, at least one non-ionic polymer and at least one cross linking agent; and iv. At least one gas generating agent In certain embodiments, a modified release powder comprises i. Granules comprising a biologically active moiety, a diluent and a binder ii. Granules comprising a biologically active moiety, at least one release retarding agent, a binder and optionally a diluent that are coated with water permeable diffusion barrier iii. an IPN forming blend optionally comprising a (semi or full) IPN, comprising at least two anionic polymers, at least one galactomannan, and at least two cross linking agents; and iv. At least one gas generating agent.

In certain embodiments, a modified release powder comprises i. Granules comprising a biologically active moiety, a diluent and a binder ii. Granules comprising a biologically active moiety, at least one release retarding agent, a binder and optionally a diluent that are coated with water permeable diffusion barrier iii. an IPN forming blend, optionally comprising a (semi or full) IPN, comprising at least two anionic polymers, at least one non-ionic polymer and at least one cross linking agent; and iv. At least one gas generating agent.

In certain embodiments, a modified release powder comprises i. Granules comprising a biologically active moiety, a diluent and a binder ii. Granules comprising a biologically active moiety, at least one release retarding agent, a binder and optionally a diluent that are coated with water permeable diffusion barrier iii. drug-ion exchange resin complex iv. drug-ion exchange resin complex coated with water permeable diffusion barrier v. an IPN forming blend, optionally comprising a (semi or full) IPN, comprising at least one IPN forming anionic polymer, or at least one IPN forming galactomannan polysaccharide and at least one cross linking agent which interacts with at least one IPN forming anionic polymer or galactomannan to form an IPN; and iv. At least one gas generating agent.

In certain embodiments, the floating IPN forming system comprises components as per any of the above embodiments plus one or more liquid crystal forming substances.

In certain embodiments, the modified release powder is provided with components as per any of the embodiments along with suspension base which contains one or more IPN forming polymers in dissolved state and one or more cross-linking agents in dissolved and/or suspended state. Such POS would be reconstituted using said suspension base at the time of administration. Any of these modified release powders may be combined with a liquid to form a pudding, paste or suspension. Such puddings, pastes or powder-to-suspension (POS) may be reconstituted using suspension base (e.g., water) in the amount provided herein prior to administration. The product forms a floating IPN in situ.

Although the following embodiments refer to suspension products, it will be understood that by controlling the amount of water or suspension base used as describe in this specification and incorporated herein, the product may be formulated as a suspension, pudding or paste. As described herein, water may be used rather than a suspension base, regardless of whether to product is to be delivered to a patient as a suspension, pudding, or paste.

In certain embodiments, a modified release suspension comprises i. drug-ion exchange resin complex ii. drug-ion exchange resin complex coated with water permeable diffusion barrier iii. an IPN forming blend, optionally comprising a (semi or full) IPN, comprising at least one anionic polymer, at least one galactomannan, and at least two cross linking agents iii. At least one gas generating agent and iv. A suspension base.

In certain embodiments, a modified release suspension comprises i. drug-ion exchange resin complex ii. drug-ion exchange resin complex coated with water permeable diffusion barrier iii. an IPN forming blend, optionally comprising a (semi or full) IPN, comprising at least two anionic polymers and at least one cross linking agent iv. At least one gas generating agent and v. A suspension base.

In certain embodiments, a modified release suspension comprises i. drug-ion exchange resin complex ii. drug-ion exchange resin complex coated with water permeable diffusion barrier iii. an IPN forming blend, optionally comprising a (semi or full) IPN, comprising at least one galactomannan, at least one anionic polymer, at least one non-ionic polymer and at least two cross linking agents iv. At least one gas generating agent and v. A suspension base.

In certain embodiments, a modified release suspension comprises i. drug-ion exchange resin complex ii. drug-ion exchange resin complex coated with water permeable diffusion barrier iii. an IPN forming blend, optionally comprising a (semi or full) IPN, comprising at least one galactomannan, at least two anionic polymers, at least one non-ionic polymer and at least two cross linking agents iv. At least one gas generating agent and v. A suspension base.

In certain embodiments, a modified release suspension comprises i. drug-ion exchange resin complex ii. drug-ion exchange resin complex coated with water permeable diffusion barrier iii. an IPN forming blend, optionally comprising a (semi or full) IPN, comprising at least two galactomannan polymers, at least one anionic polymer and at least two cross linking agents iv. At least one gas generating agent and v. A suspension base.

In certain embodiments, a modified release suspension comprises i. drug-ion exchange resin complex ii. drug-ion exchange resin complex coated with water permeable diffusion barrier iii. an IPN forming blend, optionally comprising a (semi or full) IPN, comprising at least two galactomannan polymers, at least one anionic polymer, at least one non-ionic polymer and at least two cross linking agents iv. At least one gas generating agent and v. A suspension base.

In certain embodiments, a modified release product comprises components as per any of the above embodiments plus one or more liquid crystal forming substances.

In certain embodiments, the modified release products provided herein may include one or more immediate release components.

Uses

Suitably, the compositions of the invention contain floating IPN forming systems, which systems form in vivo in the presence of an acid (e.g., stomach or gastric acid). Without wishing to be bound by theory, it is believed that the upon reaction with the acid, a gas generating agent in the composition forms a non-toxic gas which enables the IPN containing the biologically active moiety to remain in the stomach for at least 2 hours, preferably, about 3 hours to about 24 hours, or about 4 hours to about 16 hours, or about 6 hours to about 12 hours, or about 8 hours to about 10 hours, or about 2.5 hours to about 8 hours, or about 3 hours to about 6 hours, or about 4 to about 5 hours. During its retention in the stomach, the IPN provides modified release of the active moiety (e.g., drug(s)) entrapped therein. Without wishing to be bound by theory, it is believed this retention time is caused by the floating IPN exceeding the size of the pyloric valve for at least two hours. Thus, it is believed that the composition forms a floating IPN of at least about 12 mm to 25 mm in width, at least about 15 mm in width, or about 20 mm in width for this length of time.

The compositions of the invention are well suited for treating subjects having a variety of conditions, disorders and/or diseases. In certain embodiments, the compositions provide subjects with a modified release of one or more drug(s) in the floating IPN, which modified release profile is at least 2 hours, more preferably, at least 3 hours to 24 hours. In certain embodiments, the compositions provide increase gastric delivery and/or increase bioavailability of the drugs in the floating IPN.

As used herein, a "powder for suspension" or "POS" refers to a composition which is formulated as a powder which designed to be suspended in a suspension base (e.g., purified water) prior to oral ingestion by a patient.

As used herein, a paste is a semi-solid dosage form comprising about 20% to about 50% solid dispersed in liquid to form paste/pudding like mass. For paste, powder: water by weight ratio is about 1:1 to 1:5. In certain embodiments, powder:water by weight ratios are 1:0.1 to 1:15, more preferably 1:0.5 to 1:10 or most preferably, 1:2 to 1:7. Depending upon the water amount, the powder forms a paste/pudding or suspension.

In certain embodiments, the powder is reconstituted in the form of a pudding. In yet another embodiment, the powder is reconstituted in the form of paste. In yet another embodiment, powder is in sachet supplied along-with suspension base in glass bottle.

The words "comprise", "comprises", and "comprising", and "contain", "containing", and "contains" are to be interpreted inclusively rather than exclusively. The words "consist", "consisting", and its variants, are to be interpreted exclusively, rather than inclusively.

As used herein in reference to numeric values provided herein, the term "about" may indicate a variability of as much as 10%.

EXAMPLES

While the invention has been described with reference to exemplary embodiments, it will be understood by those skilled in the art that various changes may be made and equivalents may be substituted for elements thereof without departing from the scope of the invention. Details of the present invention, including its objects and advantages, are provided in the non-limiting exemplary illustrations below.

Example 1A Glycopyrrolate ER Suspension

I. Preparation of Drug Resin Complex

| Ingredients | Gm |
| --- | --- |
| Glycopyrrolate hydrobromide | 4.8 |
| Sodium polystyrene sulfonate | 9.6 |

Weighed quantity of Glycopyrrolate HBr is dissolved in 100 ml water. Weight quantity of the resin is added to drug solution under stirring and stirring is continued further for a period of 4 hr. Drug-resin complex is isolated by filtration and dried at 60° C. Drug-resin complex is passed through #60 screen.

II. Preparation of Coated Drug-Resin Complex

| Ingredients | Gm |
| --- | --- |
| Glycopyrrolate - ion exchange resin complex | 14.4 |
| Kollicoat ® SR30D | 6.86 |
| Triacetin | 0.34 |

Triacectin is added in purified water under stirring and continue stirring to get clear solution. Triacetin solution is added gradually to Kollicoat® SR30D dispersion under stirring and continue stirring for 1 hr. The coating dispersion is screened through sieve #40 and stirring is continued throughout the coating process. Glycopyrrolate-ion exchange resin complex is coated using Kollicoat® coating dispersion in Fluid Bed Coater and coated complex is dried at 60° C. Coated complex is passed through #40 screen.

III. Preparation of ER Suspension: Composition of Glycopyrrolate ER Suspension

| No. | Ingredients | Gm/per 1000 gm suspension |
| --- | --- | --- |
| 1. | Glycopyrrolate - ion exchange resin complex coated | 10.8 |
| 2. | Glycopyrrolate - ion exchange resin complex uncoated | 7.2 |

-continued

| No. | Ingredients | Gm/per 1000 gm suspension |
|---|---|---|
| 3. | Guar gum | 45 |
| 4. | Carrageenan iota | 30 |
| 5. | Borax | 9 |
| 6. | Calcium carbonate | 30 |
| 7. | Co-Povidone | 4 |
| 8. | Sucrose | 350 |
| 9. | Methyl paraben | 1 |
| 10. | Propyl paraben | 0.1 |
| 11. | Anhydrous citric acid | 2 |
| 12. | Xanthan gum USP | 9 |
| 13. | Glycerin USP | 30 |
| 14. | Instant Clearjel | 8.5 |
| 15. | Flavor | 2.0 |
| 16. | Purified water, USP | To make 1000 gm |

III. Weighed quantities of guar gum and carrageenan iota are dispersed in 5000 ml of pH 6.8 buffer under stirring. The dispersion is kept aside for 2 hours. 900 ml of 1% w/v solution of borax is added to guar gum and carrageenan aqueous dispersion under stirring using mechanical stirrer and stirred further for a period of 45 min. Then kept aside for 4 hours without stirring. The residue obtained after filtration is dried at room temperature for 3 days. Dried residue is passed through #40 screen.

IV. Weighed quantities of drug-resin complex of step I, coated drug-resin complex of step II, screened residue of step III and calcium carbonate are mixed and then granulated using aqueous solution of co-povidone. Granules are dried in fluid bed processor at 45° C. and screened through #30 sieve.

V. Glycerin is heated to 50° C. Methylparaben and Propylparaben are added gradually under stirring to heated glycerin. Stirring is continued to get clear solution. Xanthan gum is dispersed in the solution. 100 ml purified water is taken and stirred using homogenizer. Instant Clearjel is added gradually and stirring is continued for 15 minutes. Instant clearjel dispersion is added to water under stirring. To this, the glycerin-paraben-xanthan gum dispersion is added. Granules of step IV are added to it under slow stirring and stirring is continued for further 30 min. Flavor is added, citric acid is added and volume is made using purified water.

In-Vitro Testing:

I. Onset and Duration of Duration of Floating

Amount of suspension (1 gm) equivalent to unit dose (4.8 mg) of Glycopyrrolate HBr is added to 500 ml Simulated Gastric Fluid (SGF) without enzyme. The anticipated time required for floating IPN to float and duration of floating are as follows.

| Onset of floating (minutes) | ≤2 |
|---|---|
| Duration of floating (hours) | 12 |

II. Resiliency of the Floating IPN

Amount of suspension (1 gm) equivalent to 4.8 mg Glycopyrrolate HBr is added to 500 ml (SGF) without enzyme. Then it is subjected to agitation using mechanical shaker set at 37° C. and 75 rpm. The floating IPN is expected to retain integrity for a period of 12 hours.

III. In Vitro Release Study

Figure 2:
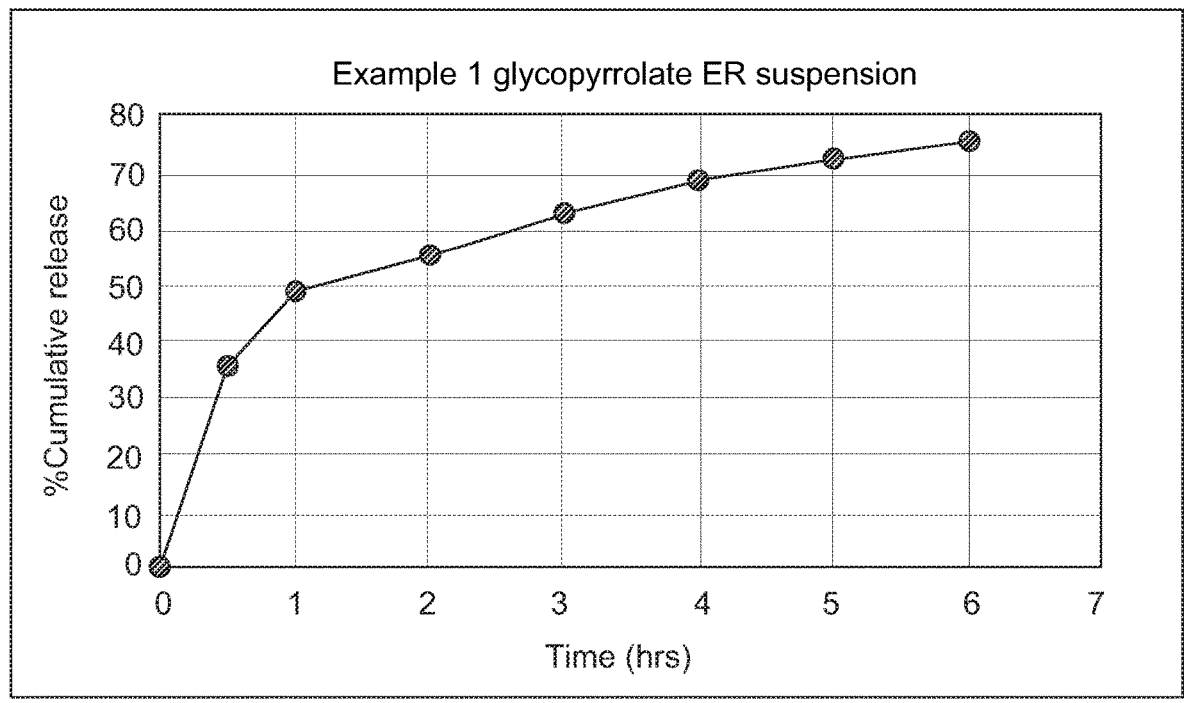
FIG. 2 provides a dissolution profile for an illustrative extended release glycopyrrolate floating IPN in suspension. Percent (%) cumulative release is graphed against time over a 6-hour test period.

Dissolution studies are performed using USP Apparatus Type II set at 50 rpm and 37° C. and 500 ml SGF without enzyme as medium. Sampling points: 0.5, 1, 2, 3, 4, 6 hours. The anticipated results are illustrated in FIG. 2.

Example 1B: Glycopyrrolate ER Suspension, eq. to 0.5 mg of Glycopyrrolate Hydrobromide Per mL

| Ingredients | % w/w |
|---|---|
| Guar Gum, NF | 0.55 |
| Carrageenan Iota (Gelcarin ® GP-379, NF) | 0.37 |
| Purified Water | Q.S. |
| Sodium Borate | 0.11 |
| Purified Water | Q.S. |
| Coated Glycopyrrolate Polistirex (PKT60)[1] | 1.36 |
| Uncoated Glycopyrrolate Polistirex[2] | 0.60 |
| Copovidone (Kollidon ® VA64) | 0.15 |
| Glycerin | 8.00 |
| Methylparaben | 0.18 |
| Propylparaben | 0.02 |
| Purified Water | Q.S. |
| Anhydrous Citric Acid | 0.62 |
| Sucralose | 0.25 |
| Calcium carbonate | 1.00 |
| Grape Flavor #792K, Virginia Dare | 0.10 |
| Purified Water | Q.S. |
| Total | 100.00 |

[1] eq. to 0.20 mg of Glycopyrrolate base (i.e. 0.25 mg of Glyco. HBr), Assay: 1.47% w/w Glyco. Base (50% dose)
[2] eq. to 0.20 mg of Glycopyrrolate base (i.e. 0.25 mg of Glyco. HBr), Assay: 3.34% w/w Glyco. Base (50% dose)

Procedure:

1. Glycopyrrolate hydrobromide was dissolved in water and Sodium Polistirex was added to it on stirring. The stirring was continued for 1 hour. The dispersion was filtered, and the wet resin complex was washed with purified water. The resin complex was then dried to get % LOD below 7% w/w. (Uncoated Glycopyrrolate complex)
2. The Glycopyrrolate polistirex was granulated using Povidone solution followed by drying and screening through Sieve #40. The granulated glycopyrrolate-polistirex was then coated in fluid bed dryer using Polyvinyl Acetate coating system to a coating level of 60% weight gain. The coated glycopyrrolate-polistirex was then dried at 60° C. for 5 hours and screened through Sieve #40.
3. Guar gum and Gelcarin were weighed and added to Purified water gradually on stirring in the order. Stirring was continued for about 60 minutes.
4. Sodium Borate was weighed and added on stirring to Purified water and stirring was continued to get clear solution.
5. Step-4 solution was added to step-1 dispersion gradually on stirring. The stirring was continued for about 2 hours. The dispersion was dried at room temperature for about 24 hours. The dried material was sized and screened through Sieve #30.
6. The required quantity of the step-5, uncoated glycopyrrolate polistirex, coated glycopyrrolate polistirex and Copovidone were weighed and co-sifted through Sieve #30. The co-sifted blend was mixed and granulated with purified water. The granules were dried in oven at about 40° C. to 60° C. The granules were sifted through Sieve #30.
7. Glycerin was weighed and heated to about 60° C. Methylparaben & Propylparaben were weighed and added to it gradually maintaining the temperature. The stirring was continued to get clear solution. The solution was allowed to cool to room temperature.

8. Purified water was weighed and Citric acid was added on stirring followed by Sucralose. Stirring was continued to get clear solution. The step-7 solution was added to it gradually and stirring was continued for 15 minutes.
9. To Step-8 dispersion, on stirring Step-4 granules were added gradually. Stirring was continued for about 1 hour. Calcium carbonate to it & stirring was continued for 10 minutes. pH was adjusted to 5.50 using dilute Citric acid solution. Stirring was continued and flavor was added.
10. Volume was made up with purified water.

The suspension (12 mL, eq. to 6 mg of Glycopyrrolate hydrobromide) was studied for dissolution using below dissolution conditions—

Dissolution conditions: USP Apparatus I (paddle), 50 RPM, 500 mL 0.1N HCL

| Time (hr) | % Glycopyrrolate release |
| --- | --- |
| 0.5 | 15 |
| 1 | 20 |
| 2 | 25 |
| 4 | 30 |
| 6 | 34 |
| 8 | 51 |

Example 2 Propranolol ER Suspension

I. Preparation of Drug Resin Complex

| Ingredients | Gm |
| --- | --- |
| Propranolol hydrochloride | 50.0 |
| Sodium polystyrene sulfonate | 100.0 |

Weighed quantity of Propranolol hydrochloride is dissolved in 1000 ml water. Weight quantity of the resin is added to drug solution under stirring and stirring is continued further for a period of 4 hr. Drug-resin complex is isolated by filtration and dried at 60° C. Drug-resin complex is passed through #60 screen.

II. Preparation of Coated Drug-Resin Complex

| Ingredients | Gm |
| --- | --- |
| Propranolol - ion exchange resin complex | 50.00 |
| Kollicoat® SR30D | 19.06 |
| Triacetin | 0.94 |

Triacectin is added in purified water under stirring and continued stirring to get clear solution. Triacetin solution is added gradually to Kollicoat® SR30D dispersion under stirring and continue stirring for 1 hr. The coating dispersion is screened through sieve #40 and stirring is continued throughout the coating process. Propranolol-ion exchange resin complex is coated using Kollicoat® coating dispersion in Fluid Bed Coater and coated complex is dried at 60° C. Coated complex is passed through #40 screen.

III Preparation of Propranolol Hydrochloride ER Suspension

Composition of Propranolol ER Suspension

| No. | Ingredients | Gm/per 1000 gm suspension |
| --- | --- | --- |
| 1. | Propranolol - ion exchange resin complex coated | 57.6 |
| 2. | Propranolol - ion exchange resin complex uncoated | 9.6 |
| 3. | Fenugreek gum | 12 |
| 4. | Carrageenan iota | 12 |
| 5. | Pectin | 12 |
| 6. | HPMC K100M | 12 |
| 5. | Borax | 2 |
| 6. | Calcium carbonate | 20 |
| 7. | Co-Povidone | 8 |
| 8. | Sucrose | 200 |
| 9. | Methyl paraben | 1 |
| 10. | Propyl paraben | 0.1 |
| 11. | Anhydrous citric acid | 2 |
| 12. | Xanthan gum USP | 9 |
| 13. | Glycerin USP | 40 |
| 14. | Instant Clearjel | 8.5 |
| 15. | Flavor | 2.0 |
| 16. | Purified water, USP | To make 1000 gm |

Fenugreek gum, pectin and carrageenan iota are dispersed in 2000 ml of pH 6.8 buffer under stirring. The dispersion is kept aside for 2 hours. 200 ml of 1% w/v solution of borax is added to fenugreek gum and carrageenan aqueous dispersion under stirring using mechanical stirrer and stirred further for a period of 45 min. Then allow to sit for 4 hours without stirring. The residue obtained after filtration is dried at room temperature for 3 days. Dried residue is passed through #40 screen.

IV. Drug-resin complex of step I, coated drug-resin complex of step II, screened residue of step III, HPMC K100M and calcium carbonate are mixed and then granulated using aqueous solution of co-povidone. Granules are dried in fluid bed processor at 45° C. and screened through #30 sieve.

V. Glycerin is heated to 50° C. Methylparaben and Propylparaben are added gradually under stirring to heated glycerin. Stirring is continued to get clear solution. Xanthan gum is dispersed in the solution. 100 ml purified water is taken and stirred using homogenizer. Instant Clearjel is added gradually and stirring is continued for 15 minutes. Instant clearjel dispersion is added to water under stirring. To this, the glycerin-paraben-xanthan gum dispersion is added. Granules of step IV are added to it under slow stirring and stirring is continued for further 30 min. Flavor is added, citric acid is added and volume is made using purified water.

In-Vitro Testing:

I. Onset and Duration of Duration of Floating

Amount of suspension (5 gm) equivalent to 80 mg Propranolol HCl is added to 500 ml SGF without enzyme solution. The time required for floating IPN to float and duration of floating are anticipated as follows.

| Onset of floating (minutes) | ≤15 |
| --- | --- |
| Duration of floating (hours) | 12 |

II. Resiliency of the Floating IPN

Amount of suspension (5 gm) equivalent to 80 mg Propranolol HCl is added to 500 ml SGF without enzyme solution. Then it is subjected to agitation using mechanical shaker set at 37° C. and 75 rpm. The floating IPN is anticipated to retain integrity for a period of 12 hours.

III. In Vitro Release Study

Figure 3:
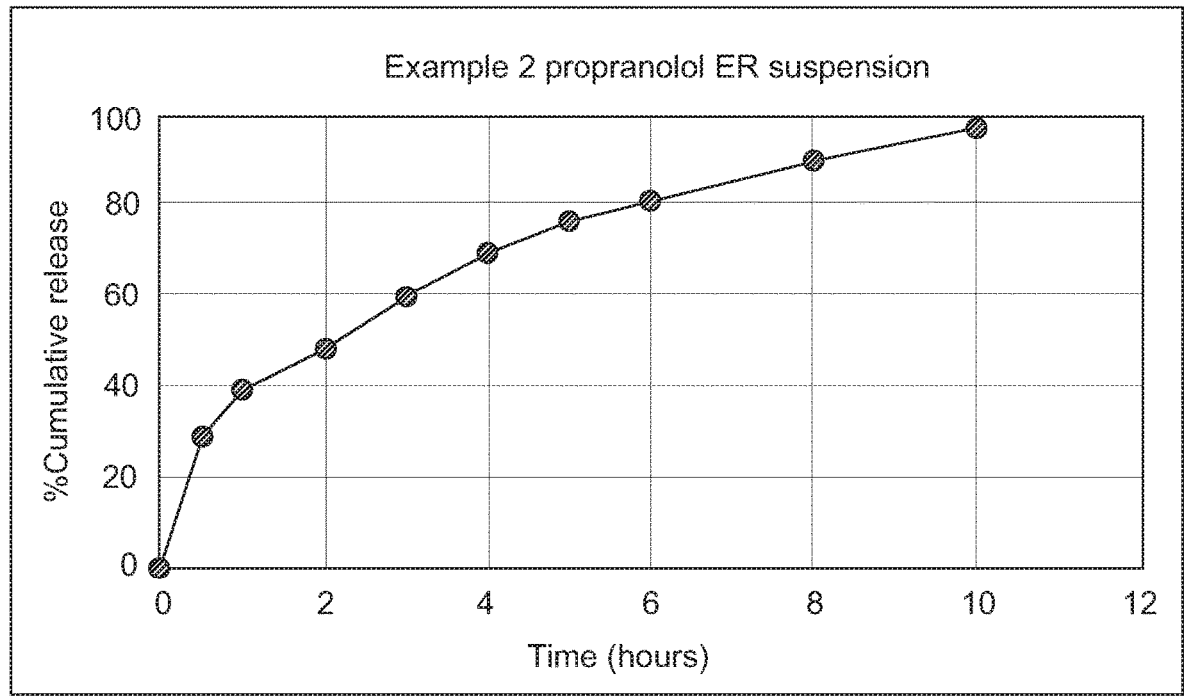
FIG. 3 provides a dissolution profile for an illustrative extended release propranolol floating IPN in suspension. Percent (%) cumulative release is graphed against time over a 10-hour test period.

Dissolution studies are performed using USP Apparatus Type II set at 50 rpm and 37° C. and 500 ml SGF without enzyme as medium. Sampling points: 0.5, 1, 2, 3, 4, 6, 8, 10 hours. The anticipated results are illustrated in FIG. 3.

Example 3 Metformin ER POS

I. Preparation of Drug Resin Complex

| Ingredients | Gm |
| --- | --- |
| Metformin hydrochloride | 50.0 |
| Sodium polystyrene sulfonate | 150.0 |

Weighed quantity of Metformin hydrochloride is dissolved in 1000 ml water. Weighed quantity of the resin is added to drug solution under stirring and stirring is continued further for a period of 4 hr. Drug-resin complex is isolated by filtration and dried at 60° C. Drug-resin complex is passed through #60 screen.

II. Preparation of Coated Drug-Resin Complex

| Ingredients | Gm |
| --- | --- |
| Metformin - ion exchange resin complex | 50.00 |
| Kollicoat® SR30D | 23.82 |
| Triacetin | 1.18 |

Triacectin is added in purified water under stirring and continue stirring to get clear solution. Triacetin solution is added gradually to Kollicoat® SR30D dispersion under stirring and continue stirring for 1 hr. The coating dispersion is screened through sieve #40 and stirring is continued throughout the coating process. Propranolol-ion exchange resin complex is coated using Kollicoat® coating dispersion in Fluid Bed Coater and coated complex is dried at 60° C. Coated complex is passed through #40 screen Preparation of ER POS Composition of Metformin ER Suspension

| No. | Ingredients | Gm/per 100 gm suspension |
| --- | --- | --- |
| 1. | Metformin - ion exchange resin complex coated | 7.5 |
| 2. | Metformin - ion exchange resin complex uncoated | 5 |
| 3. | Fenugreek gum | 0.75 |
| 4. | Carrageenan iota | 0.75 |
| 5. | Pectin | 0.75 |
| 6. | Guar gum | 0.50 |
| 5. | Borax | 0.30 |
| 6. | Calcium carbonate | 1.25 |
| 7. | Co-Povidone | 0.45 |
| 8. | HPMC low viscosity | 0.05 |
| 9. | Sucralose | 0.05 |
| 10. | Mannitol | 0.3 |
| 11. | Talc | 0.1 |
| 13. | Banana flavor | 0.04 |
| 14. | Purified water, USP | 82.2 |

III. Quantities of fenugreek gum, guar gum, pectin and carrageenan iota are dispersed in 500 ml of pH 6.8 buffer under stirring. The dispersion is kept aside for 2 hours. 30 ml of 1% w/v solution of borax is added to above aqueous dispersion under stirring using mechanical stirrer and stirred further for a period of 45 min. Then keep aside for 4 hours without stirring. The residue obtained after filtration is dried at room temperature for 3 days. Dried residue is passed through #40 screen.

IV. Weighed quantities of drug-resin complex of step I, coated drug-resin complex of step II, screened residue of step III, and calcium carbonate were mixed and then granulated using aqueous solution of co-povidone. Granules were dried in fluid bed processor at 45° C. and screened through #30 sieve.

V. The granules of step IV were mixed with weighed and screened (#40) quantities of HPMC K100LV, banana flavor, talc, mannitol and sucralose. This blend is reconstituted using 82.2 gm purified water.

In-Vitro Testing:

I. Onset and Duration of Duration of Floating

Amount of suspension (20 gm) equivalent to 500 mg Metformin HCl is added to 500 ml SGF without enzyme solution. The time required for floating IPN to float and duration of floating are anticipated to be:

| Onset of floating (minutes) | ≤20 |
| --- | --- |
| Duration of floating (hours) | 12 |

II. Resiliency of the Floating IPN

Amount of suspension (20 gm) equivalent to 500 mg Metformin HCl is added to 500 ml SGF without enzyme solution. Then it is subjected to agitation using mechanical shaker set at 37° C. and 25 rpm. The floating IPN is anticipated to retain integrity for a period of 12 hours.

Example 4: Phenylephrine ER Suspension

I. Preparation of Drug Resin Complex

| Ingredients | Gm |
| --- | --- |
| Phenylephrine hydrochloride | 50.0 |
| Sodium polystyrene sulfonate | 150.0 |

Weighed quantity of Propranolol hydrochloride is dissolved in 500 ml water. Weight quantity of the resin is added to drug solution under stirring and stirring is continued further for a period of 4 hr. Drug-resin complex is isolated by filtration and dried at 60° C. Drug-resin complex is passed through #60 screen.

II. Preparation of Coated Drug-Resin Complex

| Ingredients | Gm |
| --- | --- |
| Phenylephrine - ion exchange resin complex | 50.00 |
| Kollicoat® SR30D | 19.06 |
| Triacetin | 0.94 |

Triacetin is added in purified water under stirring and continue stirring to get clear solution. Triacetin solution is added gradually to Kollicoat® SR30D dispersion under stirring and continue stirring for 1 hr. The coating dispersion is screened through sieve #40 and stirring is continued throughout the coating process. Phenylephrine-ion exchange resin complex is coated using Kollicoat® coating dispersion in Fluid Bed Coater and coated complex is dried at 60° C. Coated complex is passed through #40 screen.

Preparation of Phenylephrine Hydrochloride ER Suspension

Composition of Phenylephrine ER Suspension

| No. | Ingredients | Gm/per 500 gm suspension |
|---|---|---|
| 1. | Phenyl ephedrine hydrochloride | 2.00 |
| 2. | Phenylephrine - ion exchange resin complex coated | 24.00 |
| 3. | Fenugreek gum | 6.00 |
| 4. | Carrageenan iota | 6.00 |
| 5. | Pectin | 6.00 |
| 6. | Borax | 1.20 |
| 7. | Calcium carbonate | 6.00 |
| 8. | Co-Povidone | 4.00 |
| 9. | Sucrose | 50 |
| 10. | Methyl paraben | 0.5 |
| 11. | Propyl paraben | 0.05 |
| 12. | Anhydrous citric acid | 1 |
| 13. | Xanthan gum USP | 3 |
| 14. | Glycerin USP | 15 |
| 15. | Instant Clearjel | 4.5 |
| 16. | Flavor | 1.0 |
| 17. | Purified water, USP | To make 500 gm |

III. Weighed quantities of coated drug-resin complex, fenugreek gum, pectin, carrageenan iota, calcium carbonate are granulated using 25 gm aqueous solution containing borax and co-povidone. Granules are dried at 60° C. in hot air oven. Dried granules are passed through #40 screen.

IV. Glycerin is heated to 50° C. Methylparaben and Propylparaben are added gradually under stirring to heated glycerin. Stirring is continued to get clear solution. Xanthan gum is dispersed in the solution. 100 gm purified water is taken and stirred using homogenizer. Instant Clearjel is added gradually and stirring is continued for 15 minutes. Instant clearjel dispersion is added to water under stirring. To this, the glycerin-paraben-xanthan gum dispersion is added. Weighed quantity of phenylephrine hydrochloride is dissolved in 50 gm water. Granules of step III and drug solution prepared are added to the prepared suspension base under slow stirring and stirring is continued for further 30 min. Flavor is added, citric acid is added and weight is adjusted using purified water.

In-Vitro Testing:

I. Onset and Duration of Duration of Floating

Amount of suspension (2.5 gm) equivalent to 30 mg Phenylephrine HCl is added to 500 ml SGF without enzyme. The time required for floating IPN to float and duration of floating are anticipated.

| Onset of floating (minutes) | ≤8 |
|---|---|
| Duration of floating (hours) | 12 |

II. Resiliency of the Floating IPN

Amount of suspension (2.5 gm) equivalent to 30 mg Phenylephrine HCl is added to 500 ml SGF without enzyme. Then it is subjected to agitation using mechanical shaker set at 37° C. and 75 rpm. The floating IPN is anticipated to retain integrity for a period of 12 hours.

III. In Vitro Release Study

Figure 4:
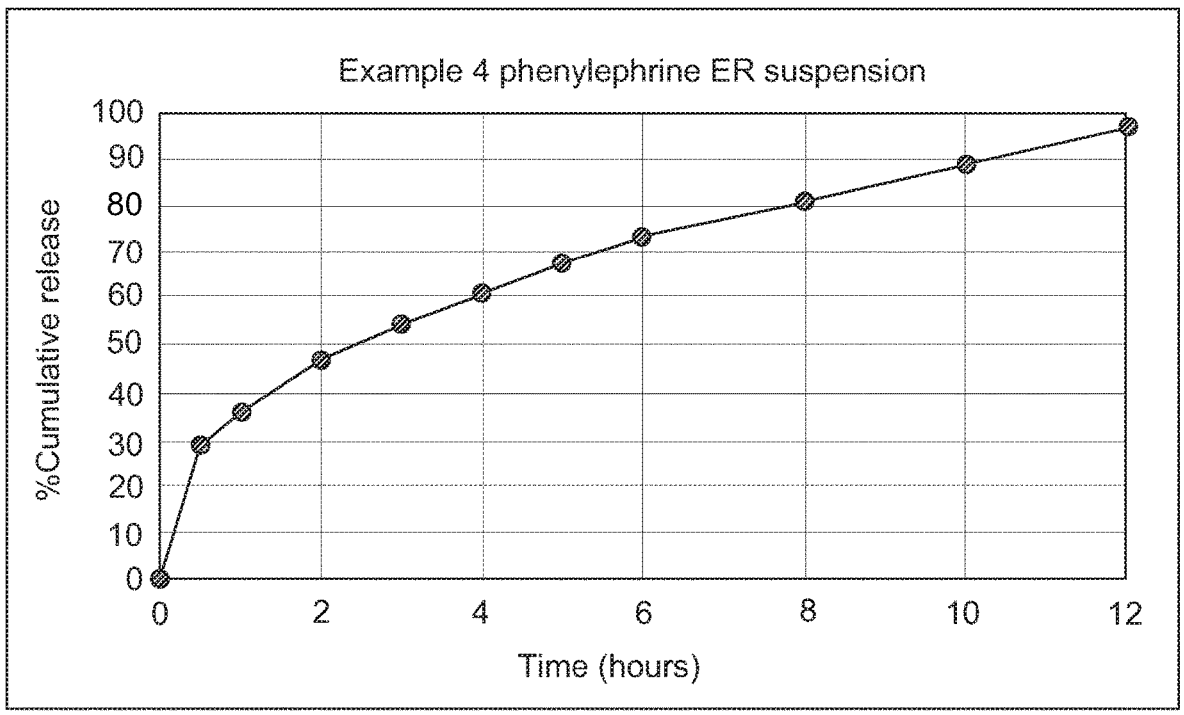
FIG. 4 provides a dissolution profile for an illustrative extended release metformin floating IPN powder in suspension. Percent (%) cumulative release is graphed against time over a 12-hour test period.

Dissolution studies are performed using USP Apparatus Type II set at 50 rpm and 37° C. and 500 ml SGF without enzyme as medium. Sampling points: 0.5, 1, 2, 3, 4, 6, 8, 10, 12 hours. The anticipated curve is illustrated in FIG. 4.

Example 5 Venlafaxine Hydrochloride ER Tablets

I. Preparation of ER Granules

| Ingredients | Gm |
|---|---|
| Venlafaxine hydrochloride | 100 |
| Kollidon ® SR | 100 |
| Co-Povidone | 100 |

Weighed quantity of venlafaxine hydrochloride, Kollidon® SR and 5.0 gm of co-povidone are mixed for 15 min. The remaining amount of Co-povidone is dissolved in 20 gm purified water. The blend is granulated using co-povidone solution. Wet granules are dried in a hot air oven at 60° C. Semi-dried granules are passed through #18 screen and dried granules are passed through #40 screen.

II. Preparation of Coated ER Granules

| Ingredients | Gm |
|---|---|
| ER granules of step I | 100.00 |
| Kollicoat ® SR30D | 47.64 |
| Triacetin | 2.36 |

Triacetin solution is added gradually to Kollicoat® SR30D dispersion under stirring and continue stirring for 1 hr. The coating dispersion is screened through sieve #40 and stirring is continued throughout the coating process. Propranolol-ion exchange resin complex is coated using Kollicoat® coating dispersion in Fluid Bed Coater and coated complex is dried at 60° C. Coated granules are passed through #30 screen.

Preparation of ER Tablets

Composition of Venlafaxine Hydrochloride (Equivalent to 150 mg Venlafaxine Base) ER Tablet

| No. | Ingredients | Mg per unit |
|---|---|---|
| 1. | Coated ER granules of step II | 534.68 |
| 2. | Guar gum | 30 |
| 3. | Fenugreek gum | 70 |
| 4. | Carrageenan iota | 40 |
| 5. | Pectin | 60 |
| 6. | HPMC K100M | 50 |
| 7. | Borax | 25 |
| 8. | Calcium carbonate | 25 |
| 9. | Calcium chloride | 25 |
| 10. | Co-Povidone | 50 |
| 11. | Cross-povidone | 100 |
| 12. | Cross-linked sodium carboxymethyl cellulose | 100 |
| 12. | Talc | 10 |
| 13. | Magnesium stearate | 5 |
| 14. | Colloidal silicon dioxide | 1.32 |

III. Weighed quantity of coated ER granules of step II (#30) is mixed for 15 minutes with weighed quantities of guar gum, fenugreek gum, pectin, carrageenan iota, HPMC K100M, calcium carbonate, calcium chloride, cross-povidone and cross-linked sodium carboxymethyl cellulose which are previously screened through #40 screen. The blend is and are granulated using aqueous solution containing borax and co-povidone. Granules are dried at 60° C. in hot air oven. Dried granules are passed through #16 screen.

IV. The granules of step III are mixed with weighed and screened (#60) quantities of talc, magnesium stearate and colloidal silicon dioxide for 5 min. This lubricated blend is compressed using 20×10 mm capsule shaped punches to prepare tablets with target weight 1126 mg±5% and hardness in the range 8 to 20 kP.

In-Vitro Testing:

I. Onset and Duration of Duration of Floating

One tablet (1126 mg±5%) is added to 500 ml SGF without enzyme. The time required for floating IPN to float and duration of floating are anticipated to be.

| Onset of floating (minutes) | ≤10 |
|---|---|
| Duration of floating (hours) | 12 |

II. Resiliency

One tablet (1126 mg±5%) is added to 500 ml SGF without enzyme. Then it is subjected to agitation using mechanical shaker set at 37° C. and 75 rpm. Anticipated Observation: The floating IPN retains integrity for a period of 12 hours.

III. In Vitro Release Study

Dissolution studies are performed using USP Apparatus Type II set at 50 rpm and 37° C. and 500 ml SGF without enzyme as medium. Sampling points: 0.5, 1, 2, 3, 4, 6, 8, 10, 12 hours.

Example 6 Venlafaxine Hydrochloride ER Capsules

I. Preparation of ER Granules

| Ingredients | Gm |
|---|---|
| Venlafaxine hydrochloride | 100 |
| Kollidon ® SR | 100 |
| Co-Povidone | 10 |

Weighed quantity of venlafaxine hydrochloride, Kollidon® SR and 5.0 gm of co-povidone are mixed for 15 min. The remaining amount of Co-povidone is dissolved in 20 gm purified water. The blend is granulated using co-povidone solution. Wet granules are dried in hot air oven at 60° C. Semi-dried granules are passed through #18 screen and dried granules are passed through #40 screen.

II. Preparation of Coated ER Granules

| Ingredients | Gm |
|---|---|
| ER granules of step I | 100.00 |
| Kollicoat ® SR30D | 47.64 |
| Triacetin | 2.36 |

Triacetin is added in purified water under stirring and continue stirring to get clear solution. Triacetin solution is added gradually to Kollicoat® SR30D dispersion under stirring and continue stirring for 1 hr. The coating dispersion is screened through sieve #40 and stirring is continued throughout the coating process. Propranolol-ion exchange resin complex is coated using Kollicoat® coating dispersion in Fluid Bed Coater and coated complex is dried at 60° C. Coated granules are passed through #30 screen.

Preparation of ER Capsule

Composition of Venlafaxine Hydrochloride (Equivalent to 75 mg Venlafaxine Base) ER Capsule

| No. | Ingredients | Mg per unit |
|---|---|---|
| 1. | Coated ER granules of step II | 267.34 |
| 2. | Guar gum | 15 |
| 3. | Fenugreek gum | 35 |
| 4. | Carrageenan iota | 20 |
| 5. | Pectin | 30 |
| 6. | HPMC K100M | 25 |
| 7. | Borax | 12.5 |
| 8. | Calcium carbonate | 12.5 |
| 9. | Calcium chloride | 12.5 |
| 10. | Co-Povidone | 25 |
| 11. | Cross-povidone | 50 |
| 12. | Cross-linked sodium carboxymethyl cellulose | 50 |
| 12. | Talc | 5 |
| 13. | Magnesium stearate | 2.5 |
| 14. | Colloidal silicon dioxide | 0.66 |

III. Weighed quantity of coated ER granules of step II (#30) is mixed for 15 minutes with weighed quantities of guar gum, fenugreek gum, pectin, carrageenan iota, HPMC K100M, calcium carbonate, calcium chloride, cross-povidone and cross-linked sodium carboxymethyl cellulose which are previously screened through #40 screen. The blend is and are granulated using aqueous solution containing borax and co-povidone. Granules are dried at 60° C. in hot air oven. Dried granules are passed through #16 screen.

IV. The granules of step III are mixed with weighed and screened (#60) quantities of talc, magnesium stearate and colloidal silicon dioxide for 5 min. This lubricated blend is compressed to prepare slugs with target weight 563 mg±5% and hardness in the range 4 to 10 kP using capsule shaped punch. The slugs are filled into capsule, one slug is filled into one capsule of size "0el".

In-Vitro Testing:

I. Onset and Duration of Duration of Floating

One capsule is added to 500 ml SGF without enzyme. The time required for floating IPN to float and duration of floating are anticipated:

| Onset of floating (minutes) | ≤20 |
|---|---|
| Duration of floating (hours) | 12 |

II. Resiliency

Figure 5:
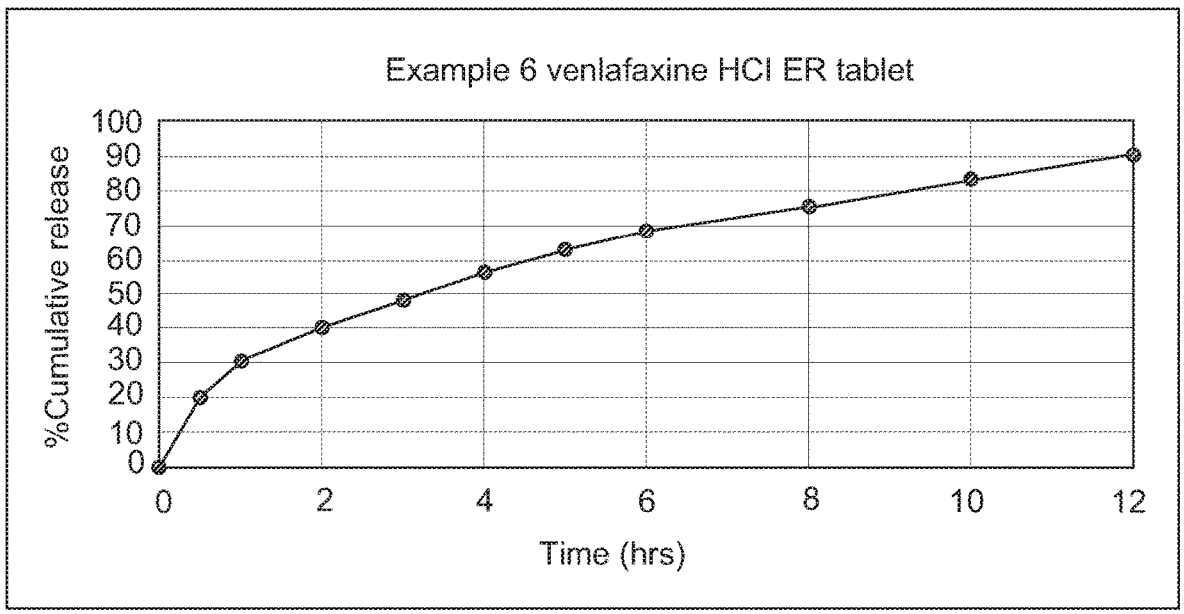
FIG. 5 provides a dissolution profile for an illustrative extended release venlafaxine tablet. Percent (%) cumulative release is graphed against time over a 12-hour test period.

One capsule is added to 500 ml SGF without enzyme. Then it is subjected to agitation using mechanical shaker set at 37° C. and 75 rpm. Anticipated Observation: The floating IPN is found to retain integrity for a period of 12 hours. The anticipated curve is provided in FIG. 5.

Example 7 Valsartan ER Tablets

I. Preparation of Melt Granules

| Ingredients | Gm |
|---|---|
| Valsartan | 100 |
| PEG 8000 | 100 |
| TPGS | 100 |
| Microcrystalline cellulose | 100 |

Weighed quantity of PEG 8000 and Poloxamer 407 are molten together. Weighed quantity of valsartan is added to molten mass under mixing and mixing is continued for 5 min more. Weighed quantity of microcrystalline cellulose is added under mixing. The entire mass is allowed to cool to ambient temperature under continuous mixing. The cooled mass is passed through #20 screen.

Preparation of ER Tablet

Composition of Valsartan (80 mg) ER Tablet

| No. | Ingredients | Mg per unit |
|---|---|---|
| 1. | Melt granules of step I | 400 |
| 2. | Fenugreek gum | 20 |
| 4. | Carrageenan iota | 40 |
| 5. | Pectin | 40 |
| 6. | Borax | 20 |
| 7. | Sodium bicarbonate | 40 |
| 8. | Calcium carbonate | 20 |
| 9. | Calcium chloride | 20 |
| 10. | Co-Povidone | 30 |
| 11. | Cross-povidone | 50 |
| 12. | Cross-linked sodium carboxymethyl cellulose | 100 |
| 12. | Talc | 8 |
| 13. | Magnesium stearate | 4 |
| 14. | Colloidal silicon dioxide | 2 |

II. Weighed quantity of melt granules of step I (#20) is mixed for 15 minutes with weighed quantities of fenugreek gum, pectin, carrageenan iota, calcium carbonate, calcium chloride, sodium bicarbonate, cross-povidone and cross-linked sodium carboxymethyl cellulose which are previously screened through #40 screen. The blend is and are granulated using aqueous solution containing borax and co-povidone. Granules are dried at 60° C. in hot air oven. Dried granules are passed through #16 screen.

III. The granules of step II are mixed with weighed and screened (#60) quantities of talc, magnesium stearate and colloidal silicon dioxide for 5 min. This lubricated blend is compressed to prepare tablets with target weight 794 mg±5% and hardness in the range 8 to 20 kP using 18×8 mm capsule shaped punches.

In-Vitro Testing:

I. Onset and Duration of Duration of Floating

One capsule is added to 500 ml SGF without enzyme. The time required for floating IPN to float and duration of floating are anticipated:

| Onset of floating (minutes) | ≤25 |
|---|---|
| Duration of floating (hours) | 12 |

II. Resiliency

One capsule is added to 500 ml SGF without enzyme. Then it is subjected to agitation using mechanical shaker set at 37° C. and 75 rpm. Anticipated observation: The floating IPN is found to retain integrity for a period of 12 hours Example 8A: Pregabalin ER POS I. Preparation of Drug-Ion Exchange Resin Complex

| Ingredients | Gm |
|---|---|
| Pregabalin | 100 |
| Cholestyramine | 400 |

Weighed quantity of Pregabalin is dissolved in 1000 ml buffer pH 6.8. Weight quantity of the resin is added to drug solution under stirring and stirring is continued further for a period of 4 hr. Drug-ion exchange resin complex is isolated by filtration and dried at 60° C. Drug-ion exchange resin complex is passed through #60 screen.

II. Preparation of Coated Drug-Ion Exchange Resin Complex

| Ingredients | Gm |
|---|---|
| Pregabalin - ion exchange resin complex | 100.00 |
| Kollicoat® SR30D | 38.12 |
| Triacetin | 1.88 |

Triacetin is added in purified water under stirring and continue stirring to get clear solution. Triacetin solution is added gradually to Kollicoat® SR30D dispersion under stirring and continue stirring for 1 hr. The coating dispersion is screened through sieve #40 and stirring is continued throughout the coating process. Pregabalin-ion exchange resin complex is coated using Kollicoat® coating dispersion in Fluid Bed Coater and coated complex is dried at 60° C. Coated complex is passed through #40 screen.

Preparation of ER POS

Composition of Pregabalin-Ion Exchange Resin Complex ER POS

| No. | Ingredients | Gm/per 300 mg pregabalin dose |
|---|---|---|
| 1. | Coated pregabalin - ion exchange resin complex | 2.10 |
| 2. | Fenugreek gum | 0.20 |
| 3. | Guar gum | 0.20 |
| 4. | Carrageenan iota | 0.30 |
| 5. | Pectin | 0.30 |
| 6. | HPMC K100M | 0.40 |
| 7. | Borax | 0.20 |
| 8. | Calcium carbonate | 0.20 |
| 9. | Calcium chloride | 0.20 |
| 10. | HPMC low viscosity | 0.05 |
| 11. | Sucralose | 0.05 |
| 12. | Mannitol | 0.40 |
| 13. | Talc | 0.10 |
| 14. | Sodium benzoate | 0.01 |
| 15. | Banana flavor | 0.04 |
| 16. | Purified water, USP | 20 gm |

III. Weighed quantities of coated pregabalin-ion exchange resin complex, fenugreek gum, guar gum, pectin, carrageenan iota, and HPMC K100M are dispersed in purified water. The dispersion is kept aside for 2 hours. Aqueous solution containing borax (5% w/v) is added to above dispersion under stirring using mechanical stirrer and stirred further for a period of 45 min. Then kept aside for 4 hours without stirring. The residue obtained after filtration is dried at 60° C. Dried residue is passed through #40 screen.

IV. The granules of step III are mixed with weighed and screened (#40) quantities of calcium carbonate, calcium chloride, HPMC K100LV, banana flavor, talc, sodium benzoate, mannitol and sucralose. The blend is to be reconstituted using 20 gm purified water at the time of administration.

In-Vitro Testing:

I. Onset and Duration of Duration of Floating

Amount of reconstituted suspension equivalent to 300 mg pregabalin is added to 500 ml SGF without enzyme. The time required for floating IPN to float and duration of floating are anticipated as follows:

| | |
|---|---|
| Onset of floating (minutes) | ≤20 |
| Duration of floating (hours) | 12 |

II. Resiliency of the Floating IPN

Amount of reconstituted suspension equivalent to 300 mg pregabalin is added to 500 ml SGF without enzyme. Then it is subjected to agitation using mechanical shaker set at 37° C. and 25 rpm. Anticipated Observation: The floating IPN is found to retain integrity for a period of 12 hours Example 81: Pregabalin ER Tablets 300 mg

| Sr. No. | Ingredients Pregabalin ER Granules | % w/w |
|---|---|---|
| 1 | Pregabalin | 40.82 |
| 2 | Guar gum | 4.76 |
| 3 | Carrageenan Iota (Glecarin ® GP-379 NF) | 4.08 |
| 4 | Pectin | 8.16 |
| 5 | Hypromellose, USP (Methocel ® K100M) | 4.76 |
| 6 | Crospovidone, NF | 2.72 |
| 7 | Sodium borate | 0.95 |
| 8 | Calcium Chloride | 3.40 |
| 9 | Calcium carbonate | 10.20 |
| 10 | Potassium Bicarbonate | 4.08 |
| 11 | Microcrystalline Cellulose, NF (Avicel ® PH 102) | 11.97 |
| 12 | Copovidone (Kollidon ® VA64) | 4.08 |
| | Total Tablet-blend | 100.00 |
| 12 | Pregabalin ER Granules | 84.00 |
| 13 | Crospovidone, NF | 1.37 |
| 14 | Microcrystalline Cellulose, NF (Avicel ® PH 102) | 10.71 |
| 15 | Copovidone (Kollidon ® VA64) | 2.86 |
| 16 | Silicon Dioxide, NF (Syloid ®244FP) | 0.14 |
| 17 | Mg. stearate | 0.91 |
| | Total | 100.00 |

Procedure: All the items 1 to 12 were weighed and co-sifted through Sieve #40. The blend was mixed in Cube blender for 5 minutes at 35 RPM. The resulting blend was roll compacted at 1000 PSI pressure to get ribbon-like compacts. The compacts were screened through Sieve #30. The granules were roll compacted again at the same roll pressure and the ribbon-like slugs were screened through Sieve #30. The roll-compacted granules were co-sifted with items 13 to 16 and blended for 5 minutes. Magnesium stearate was screened through Sieve #60 and added to step-3 blend. The blend was mixed for 3 minutes and compressed into tablets using rotary tablet press and 0.3310"×0.7210" Caplet tooling at the hardness of about 6-8 kp.

The tablet was studied for dissolution using below dissolution conditions—

Dissolution conditions: USP Apparatus I (paddle), 50 RPM, 900 mL 0.1N HCL

| Time (hr) | % Pregabalin release |
|---|---|
| 0.5 | 37 |
| 1 | 50 |
| 2 | 63 |
| 3 | 71 |
| 4 | 77 |
| 6 | 85 |
| 8 | 91 |
| 12 | 98 |

Example 9A: Baclofen ER Tablets

I. Preparation of ER Granules

| Ingredients | Gm |
|---|---|
| Baclofen | 100 |
| Kollidon ® SR | 10 |
| Co-Povidone | 5 |

Weighed quantity of API, Kollidon® SR and 2.5 gm of co-povidone are mixed for 15 min. The remaining amount of Co-povidone is dissolved in 10 gm purified water. The blend is granulated using co-povidone solution. Wet granules are dried in hot air oven at 60° C. Dried granules are passed through #18 screen.

Preparation of ER Tablets

Composition of Baclofen (20 mg) ER Tablet

| No. | Ingredients | Mg per unit |
|---|---|---|
| 1. | ER granules of step I | 23 |
| 2. | Guar gum | 6 |
| 3. | Fenugreek gum | 3 |
| 4. | Carrageenan iota | 6 |
| 5. | Pectin | 3 |
| 6. | HPMC K100M | 3 |
| 7. | Borax | 5 |
| 8. | Calcium carbonate | 15 |
| 9. | Calcium chloride | 7 |
| 10. | Co-Povidone | 3 |
| 11. | Cross-povidone | 30 |
| 12. | Talc | 2 |
| 13. | Magnesium stearate | 1.5 |
| 14. | Colloidal silicon dioxide | 0.5 |

II. Weighed quantity of ER granules of step I (#18) is mixed for 15 minutes with weighed quantities of guar gum, fenugreek gum, pectin, carrageenan iota, HPMC K100M, calcium carbonate, calcium chloride, and cross-povidone which are previously screened through #40 screen. The blend is granulated using aqueous solution containing borax and co-povidone. Granules are dried at 60° C. in hot air oven. Dried granules are passed through #16 screen.

III. The granules of step II are mixed with weighed and screened (#60) quantities of talc, magnesium stearate and colloidal silicon dioxide for 5 min. This lubricated blend is compressed using 7 mm round punches to prepare tablets with target weight 108 mg±5% and hardness in the range 4 to 15 kP.

In-Vitro Testing:

I. Onset and Duration of Duration of Floating

One tablet is added to 500 ml SGF without enzyme. The time required for floating IPN to float and duration of floating are anticipated as follows.

| | |
|---|---|
| Onset of floating (minutes) | ≤5 |
| Duration of floating (hours) | 12 |

II. Resiliency

Figure 6:
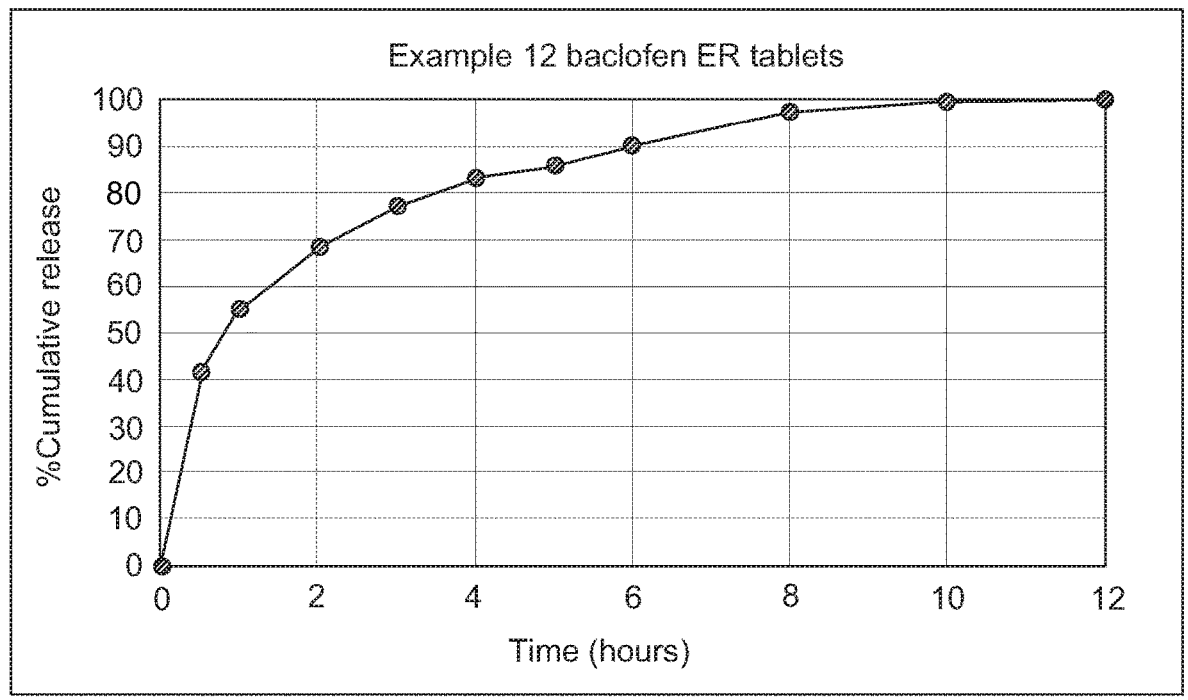
FIG. 6 provides a dissolution profile for an illustrative extended release baclofen tablet. Percent (%) cumulative release is graphed against time over a 12-hour test period.

One tablet is added to 500 ml SGF without enzyme. Then it is subjected to agitation using mechanical shaker set at 37° C. and 75 rpm. Anticipated observation: The floating IPN is found to retain integrity for a period of 12 hours III. In Vitro Release Study Dissolution studies are performed using USP Apparatus Type II set at 50 rpm and 37° C. and 500 ml SGF without enzyme as medium. Sampling points: 0.5, 1, 2, 3, 4, 6, 8, 10, 12 hours. The anticipated results are illustrated in FIG. 6.

Example 9B: Baclofen ER Tablets 20 mg

| Sr. No. | Ingredients Baclofen ER Granules | % w/w |
|---|---|---|
| 1 | Baclofen | 17.86 |
| 2 | Guar gum | 7.14 |
| 3 | Carrageenan Iota (Glecarin ® GP-379 NF) | 7.14 |
| 4 | Pectin | 7.14 |
| 5 | Hypromellose, USP (Methocel ® K100 M) | 7.14 |
| 6 | Crospovidone, NF | 10.71 |
| 7 | Sodium borate | 2.68 |
| 8 | Calcium Chloride | 4.46 |
| 9 | Calcium carbonate | 13.39 |
| 10 | Microcrystalline Cellulose, NF (Avicel ® PH 102) | 17.86 |
| 11 | Copovidone (Kollidon ® VA64) | 4.46 |
| | Total Tablet-blend | 100.00 |
| 12 | Baclofen ER Granules | 74.67 |
| 13 | Crospovidone, NF | 6.67 |
| 14 | Microcrystalline Cellulose, NF (Avicel ® PH 102) | 14.13 |
| 15 | Copovidone (Kollidon VA64) | 3.33 |
| 16 | Silicon Dioxide, NF (Syloid 244FP) | 0.20 |
| 17 | Mg. stearate | 1.00 |
| | Total | 100.00 |

Procedure:
1. All the items 1 to 11 were weighed and co-sifted through Sieve #40. The blend was mixed in Cube blender for 5 minutes at 35 RPM.
2. The step-1 blend was roll compacted at 1000 PSI pressure to get ribbon-like compacts. The compacts were screened through Sieve #30. The granules were roll compacted again at the same roll pressure and the ribbon-like slugs were screened through Sieve #30.
3. The roll-compacted granules were co-sifted with items 13 to 16 and blended for 5 minutes.
4. Magnesium stearate was screened through Sieve #60 and added to step-3 blend. The blend was mixed for 3 minutes and compressed into tablets using rotary tablet press and 0.2812" round tooling at the hardness of about 6 kp.

The tablet was studied for dissolution using below dissolution conditions—

Dissolution conditions: USP Apparatus I (paddle), 50 RPM, 500 mL 0.1N HCL

| Time (hr) | % Baclofen release |
|---|---|
| 0.5 | 57 |
| 1 | 74 |
| 2 | 89 |
| 3 | 95 |
| 4 | 97 |
| 6 | 99 |

Example 10 Gabapentin ER Tablet

I. Preparation of ER Granules

| Ingredients | Gm |
|---|---|
| Gabapentin | 100 |
| Kollidon ® SR | 100 |
| Co-Povidone | 10 |

Weighed quantity of Gabapentin, Kollidon® SR and 5.0 gm of co-povidone are mixed for 15 min. The remaining amount of Co-povidone is dissolved in 20 gm purified water. The blend is granulated using co-povidone solution. Wet granules are dried in hot air oven at 60° C. Semi-dried granules are passed through #18 screen and dried granules are passed through #40 screen.

II. Preparation of Coated ER Granules

| Ingredients | Gm |
|---|---|
| ER granules of step I | 100.00 |
| Kollicoat ® SR30D | 47.64 |
| Triacetin | 2.36 |

Triacetin is added in purified water under stirring and continue stirring to get clear solution. Triacetin solution is added gradually to Kollicoat® SR30D dispersion under stirring and continue stirring for 1 hr. The coating dispersion is screened through sieve #40 and stirring is continued throughout the coating process. Propranolol granules are coated using Kollicoat® coating dispersion in Fluid Bed Coater and coated complex is dried at 60° C. Coated granules are passed through #30 screen.

Preparation of ER Tablet: Composition of Gabapentin (200 mg) ER Tablet:

| No. | Ingredients | Mg per unit |
|---|---|---|
| 1. | Coated ER granules of step II | 630 |
| 2. | Guar gum | 15 |
| 3. | Fenugreek gum | 15 |
| 4. | Carrageenan iota | 50 |
| 5. | Pectin | 50 |
| 6. | Borax | 15 |
| 8. | Calcium carbonate | 50 |
| 9. | Calcium chloride | 50 |
| 10. | Co-Povidone | 50 |
| 11. | Cross-povidone | 75 |
| 12. | Cross-linked sodium carboxymethyl cellulose | 75 |
| 12. | Talc | 13 |
| 13. | Magnesium stearate | 10 |
| 14. | Colloidal silicon dioxide | 2 |

III. Weighed quantity of coated ER granules of step II (#30) is mixed for 15 minutes with weighed quantities of guar gum, fenugreek gum, pectin, carrageenan iota, calcium carbonate, calcium chloride, cross-povidone and cross-linked sodium carboxymethyl cellulose which are previously screened through #40 screen. The blend is granulated using aqueous solution containing borax and co-povidone. Granules are dried at 60° C. in hot air oven. Dried granules are passed through #16 screen.

IV. The granules of step III are mixed with weighed and screened (#60) quantities of talc, magnesium stearate and colloidal silicon dioxide for 5 min. This lubricated blend is compressed to prepare tablets with target weight 1100 mg±5% and hardness in the range 6 to 20 kP using 20×10 mm punch.

In-Vitro Testing:

I. Onset and Duration of Duration of Floating

One tablet is added to 500 ml SGF without enzyme. The time required for floating IPN to float and duration of floating are anticipated as follows:

| | |
|---|---|
| Onset of floating (minutes) | ≤20 |
| Duration of floating (hours) | 12 |

II. Resiliency

One tablet is added to 500 ml SGF without enzyme. Then it is subjected to agitation using mechanical shaker set at 37° C. and 75 rpm. Anticipated Observation: The floating IPN is found to retain integrity for a period of 12 hours.

Example 11 Telaprevir ER Tablet

I. Preparation of Melt Granules

| Ingredients | Gm |
|---|---|
| Telaprevir | 100 |
| PEG 8000 | 50 |
| Poloxamer 407 | 50 |
| Microcrystalline cellulose | 100 |

Weighed quantity of PEG 8000 and Poloxamer 407 are molten together. Weighed quantity of API is added to molten mass under mixing and mixing is continued for 5 min more. Weighed quantity of microcrystalline cellulose is added under mixing. The entire mass is allowed to cool to ambient temperature under continuous mixing. The cooled mass is passed through #20 screen.

Preparation of ER Tablet
Composition of Telaprevir (300 mg) ER Tablet

| No. | Ingredients | Mg per unit |
|---|---|---|
| 1. | Melt granules of step I | 900 |
| 2. | Fenugreek gum | 20 |
| 4. | Carrageenan iota | 40 |
| 5. | Pectin | 40 |
| 6. | Borax | 20 |
| 7. | Sodium bicarbonate | 80 |
| 8. | Calcium carbonate | 60 |
| 9. | Calcium chloride | 60 |
| 10. | Co-Povidone | 30 |
| 11. | Cross-povidone | 100 |
| 12. | Cross-linked sodium carboxymethyl cellulose | 100 |
| 12. | Talc | 22 |
| 13. | Magnesium stearate | 15 |
| 14. | Colloidal silicon dioxide | 3 |

II. Weighed quantity of melt granules of step I (#20) is mixed for 15 minutes with weighed quantities of fenugreek gum, pectin, carrageenan iota, calcium carbonate, calcium chloride, sodium bicarbonate, cross-povidone and cross-linked sodium carboxymethyl cellulose which are previously screened through #40 screen. The blend is and are granulated using aqueous solution containing borax and co-povidone. Granules are dried at 60° C. in hot air oven. Dried granules are passed through #16 screen.

III. The granules of step II are mixed with weighed and screened (#60) quantities of talc, magnesium stearate and colloidal silicon dioxide for 5 min. This lubricated blend is compressed to prepare tablets with target weight 1490 mg±5% and hardness in the range 8 to 20 kP using 22×11 mm capsule shaped punches.

In-Vitro Testing:

I. Onset and Duration of Duration of Floating

One capsule is added to 500 ml SGF without enzyme. The time required for floating IPN to float and duration of floating are anticipated.

| | |
|---|---|
| Onset of floating (minutes) | ≤25 |
| Duration of floating (hours) | 12 |

II. Resiliency

One capsule is added to 500 ml SGF without enzyme. Then it is subjected to agitation using mechanical shaker set at 37° C. and 75 rpm. Anticipated Observation: The floating IPN is found to retain integrity for a period of 12 hours Example 13 Baclofen ER POS Composition of Baclofen (80 mg) ER POS

| No. | Ingredients | Mg per unit dose |
|---|---|---|
| 1. | Baclofen | 80.0 |
| 2. | Guar gum | 125.0 |
| 3. | Carrageenan kappa | 125.0 |
| 4. | Carrageenan iota | 150.0 |
| 5. | HPMC K100M | 75.0 |
| 6. | Potassium citrate | 45.0 |
| 7. | Borax | 45.0 |
| 8. | Sodium bicarbonate | 70.0 |
| 9. | Calcium chloride | 60.0 |
| 10. | Microcrystalline cellulose | 125.0 |
| 11. | Crospovidone | 205.0 |
| 12. | Calcium carbonate | 55.0 |
| 13. | PVP K30 | 40.0 |
| 12. | HPMC K100LV | 20.0 |
| 13. | Sucralose | 20.0 |
| 14. | Mannitol | 50.0 |
| 15. | Talc | 20.0 |
| 16. | Sodium benzoate | 1.0 |
| 17. | Banana flavor | 4.0 |

I. Weighed quantities of coated baclofen, guar gum, carrageenan kappa, carrageenan iota, HPMC K100M, potassium citrate, sodium bicarbonate, calcium chloride, microcrystalline cellulose, crospovidone and calcium carbonate are mixed for a period of 15 minutes. The blend is granulated using aqueous solution containing borax (5% w/v) and PVP K30 (10% w/v). Wet granules are dried in hot air oven at 45° C. Dried granules are passed through #40 screen.

II. The granules of step I are mixed with weighed and screened (#40) quantities of HPMC K100LV, banana flavor, talc, sodium benzoate, mannitol and sucralose. 1315 mg of the blend is to be reconstituted using 4 gm purified water at the time of administration.

In-Vitro Testing:
I. Onset and Duration of Duration of Floating

Amount of reconstituted suspension equivalent to 80 mg baclofen is added to 500 ml SGF without enzyme. The time required for floating IPN to float and duration of floating are anticipated as follows:

| Onset of floating (minutes) | ≤2 |
| Duration of floating (hours) | 12 |

II. Resiliency of the Floating IPN

Amount of reconstituted suspension equivalent to 80 mg baclofen is added to 500 ml SGF without enzyme. Then it is subjected to agitation using mechanical shaker set at 37° C. and 75 rpm. Anticipated observation: The floating IPN is found to retain integrity for a period of 12 hours.

III. In Vitro Release Study

Figure 7:
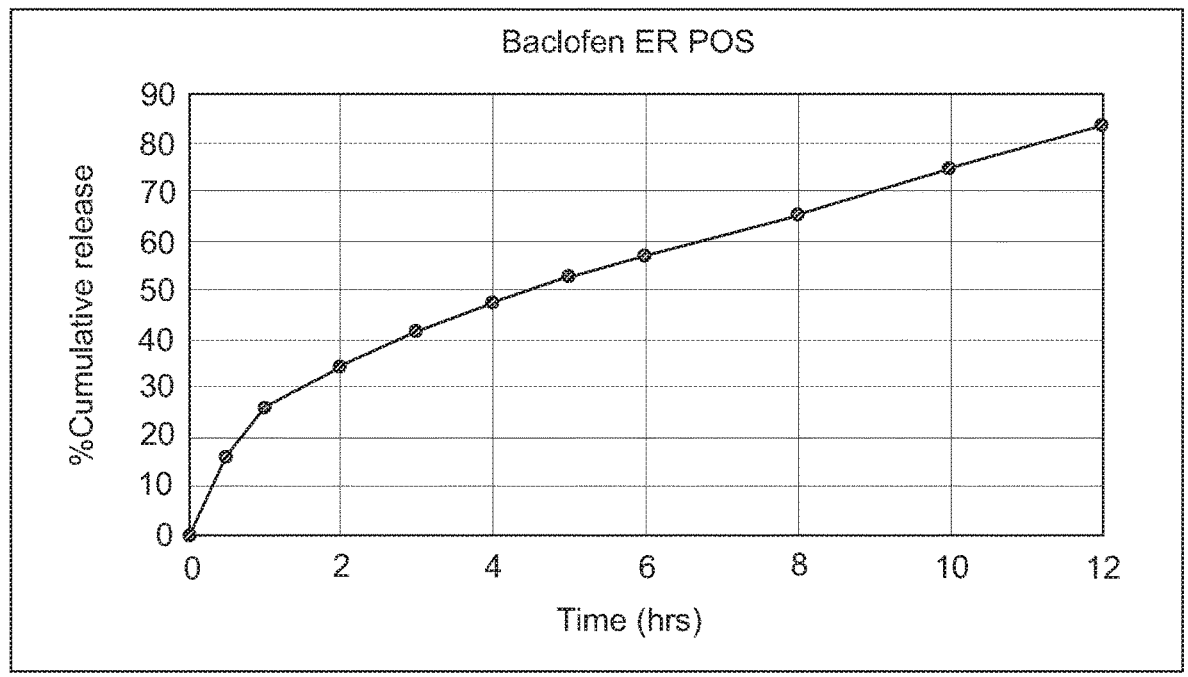
FIG. 7 provides a dissolution profile for an illustrative extended release baclofen powder in suspension. Percent (%) cumulative release is graphed against time over a 12-hour test period.

Dissolution studies are performed using USP Apparatus Type II set at 50 rpm and 37° C. and 500 ml SGF without enzyme as medium. Sampling points: 0.5, 1, 2, 3, 4, 6, 8, 10, 12 hours. The anticipated curve is provided in FIG. 7.

All patents, patent publications, and other publications listed in this specification, are incorporated herein by reference. Also incorporated by reference is U.S. Patent Application No. 62/607,129, filed Dec. 18, 2017, which is incorporated by reference. While the invention has been described with reference to a particularly preferred embodiment, it will be appreciated that modifications can be made without departing from the spirit of the invention. Such modifications are intended to fall within the scope of the appended claims.

The invention claimed is:

1. An orally administrable extended release composition which comprises a floating inter-penetrating network (IPN) forming system comprising:
(a) at least one drug in a drug-ion exchange resin complex;
(b) an inter-penetrating network (IPN) forming blend, which comprises:
(i) at least two IPN forming polymers comprising at least one IPN forming anionic polymer and at least a second, different, IPN forming anionic polymer or at least one IPN forming galactomannan, wherein there are no covalent bonds between the at least two IPN forming polymers;
(ii) at least one cross-linking agent which interacts with the at least one IPN forming anionic polymer and at least one cross-linking agent which interacts with the second IPN forming anionic polymer or IPN forming galactomannan (i) to form an IPN; and
(iii) at least one non-toxic gas generating agent, wherein the gas generating agent forms a non-toxic gas when exposed to stomach acid,
wherein following oral ingestion, the composition self-assembles into a floating IPN in situ, which comprises the drug-ion exchange resin complex and the non-toxic gas entrapped therein, thereby providing a floating IPN which further comprises the IPN-forming polymers individually cross-linked to cross-linking agent(s),
further wherein the at least two IPN-forming polymers are not cross-linked to each other,
provided that the composition does not include a gamma hydroxybutyrate and its salts, hydrates, tautomers, or solvates, or complexes thereof.

2. The orally administrable drug composition according to claim 1, wherein the self-assembling IPN forming blend comprises the at least one non-toxic gas generating agent and:
(a) at least two anionic polymers and at least one cross linking agent;
(b) at least one anionic polymer, at least one galactomannan, and at least two cross linking agents;
(c) at least one galactomannan, at least one anionic polymer, at least one non-ionic polymer and at least two cross linking agents;
(d) at least one galactomannan, at least two anionic polymers, at least one non-ionic polymer and at least two cross linking agents;
(e) at least two galactomannan polymers, at least one anionic polymer and at least two cross linking agents;
(f) at least two galactomannan polymers, at least one anionic polymer, at least one non-ionic polymer and at least two cross linking agents;
(g) at least one anionic polymer, at least one galactomannan, and at least two cross linking agents;
(h) at least one anionic polymer, at least one galactomannan, and at least two cross linking agents at least one of which is pH dependent cross-linking agent;
(i) at least one galactomannan, at least one anionic polymer, at least one non-ionic polymer and at least two cross linking agents;
(j) at least one galactomannan polysaccharide, at least two anionic polymers, at least one non-ionic polymer and at least two cross linking agents;
(k) at least two galactomannan polymers, at least one anionic polymer and at least two cross linking agents, at least one of which is a pH-dependent cross-linking agent; or
(l) at least two galactomannan polymers, at least one anionic polymer, at least one non-ionic polymer and at least two cross linking agents, at least one of which is a pH-dependent cross-linking agent.

3. An orally administrable drug composition comprising a floating inter-penetrating network (IPN) forming system comprising:
(a) at least one drug in a drug-ion exchange resin complex;
(b) an inter-penetrating network (IPN) forming blend, which comprises:
(i) at least two IPN forming polymers comprising at least one IPN forming anionic polymer and at least a second, different, IPN forming anionic polymer or at least one IPN forming galactomannan, wherein there are no covalent bonds between the at least two IPN forming polymers;
(ii) at least one cross-linking agent which interacts with the at least one IPN forming anionic polymer and at least one cross-linking agent which interacts with the second IPN forming anionic polymer or IPN forming galactomannan (i) to form an IPN; and
(iii) a non-toxic gas generating agent, wherein the gas generating agent forms a non-toxic gas when exposed to stomach acid,
wherein following oral ingestion, the composition self-assembles into a floating IPN in situ, which comprises the drug-ion exchange resin complex and the non-toxic gas entrapped therein, thereby providing a floating IPN which further comprises the IPN-forming polymers individually cross-linked to the cross-linking agent(s), wherein the IPN forming blend comprises at least one anionic polymer selected from sodium alginate, carrageenan I, pectin, gellan gum, alginic acid, carrageenan k, sodium carboxymethylcellulose, xanthan gum, or combinations thereof and at least a second polymer which are at least partially crosslinked with a crosslinking agent, further wherein the at least two IPN-forming polymers are not cross-linked to each other, provided that the composition does not include a gamma hydroxybutyrate and its salts, hydrates, tautomers, or solvates, or complexes thereof.

4. The orally administrable drug composition according to claim 1, wherein the IPN forming blend comprises at least one galactomannan polysaccharide which is at least partially cross-linked with borax, glutaraldehyde, or zirconium, divalent and trivalent metal salts, or combinations thereof.

5. The orally administrable drug composition according to claim 4, wherein the galactomannan is selected from guar gum, fenugreek gum, locust bean gum, or combinations thereof.

6. The orally administrable drug composition according to claim 1, wherein the gas-generating agent is selected from carbonates or bicarbonates of an alkali or alkaline earth metal, sulfites, or combinations thereof, or combinations thereof with an acid source which create a gas-generating couple.

7. The orally administrable drug composition according to claim 6, wherein the carbonate or bicarbonate of an alkali or alkaline earth metal are selected from potassium carbonate, potassium bicarbonate, sodium carbonate, sodium bicarbonate, calcium carbonate, sodium glycine carbonate, magnesium carbonate, or aluminum carbonate.

8. The composition according to claim 1, wherein the floating IPN provides extended release for at least about 3 hours to about 24 hours.

9. The composition according to claim 1, wherein the composition further comprises the at least one drug in the drug-ion exchange resin complex in more than one form.

10. The composition according to claim 1, wherein the drug-ion exchange resin complex is coated with at least one modified release coating, which is selected from an enteric coat, a reverse enteric coat, or a pH-independent barrier coating.

11. The composition according to claim 9, wherein the composition comprises an immediate release and a controlled release form of the same drug.

12. The composition according to claim 1, wherein the composition comprises two or more different drugs.

13. The composition according to claim 1 formulated as a tablet, capsule, suspension, powder, paste, or pudding.

14. The composition according to claim 1 which is a modified release composition.

15. The composition according to claim 14 which further comprises an immediate release component.

16. A product comprising a reconstituted orally administrable extended release powder composition which comprises a floating inter-penetrating network (IPN) forming system comprising:
(a) at least one drug in a drug-ion exchange resin complex;
(b) an IPN forming powder blend, which comprises:
(i) at least two IPN forming polymers comprising at least one IPN forming anionic polymer and at least a second, different, IPN forming anionic polymer or at least one IPN forming galactomannan, wherein there are no covalent bonds between the at least two IPN forming polymers;
(ii) at least one cross-linking agent which interacts with the at least one IPN forming anionic polymer and at least one cross-linking agent which interacts with the second IPN forming anionic polymer or IPN forming galactomannan; and
(iii) a non-toxic gas generating agent, wherein the gas generating agent forms a non-toxic gas when exposed to stomach acid,
wherein following oral ingestion, the composition self-assembles into a floating IPN in situ, which comprises the drug-ion exchange resin complex and the non-toxic gas entrapped therein, thereby providing a floating IPN comprising the IPN-forming polymers individually cross-linked to the cross-linking agent(s),
further wherein the at least two IPN-forming polymers are not cross-linked to each other,
provided that the composition does not include a gamma hydroxybutyrate and its salts, hydrates, tautomers, or solvates, or complexes thereof; and
(c) water,
wherein the ratio, by weight, of the composition to water is 1:0.1 to 1:15, or 1:0.5 to 1:10, or 1:2 to 1:7.

17. An orally administrable extended release drug composition, which comprises a floating inter-penetrating network (IPN) forming system comprising:
(a) at least one drug in a drug-ion exchange resin complex;
(b) an inter-penetrating network (IPN) forming blend, which comprises:
(i) at least two IPN forming polymers comprising at least one IPN forming anionic polymer and at least a second, different, IPN forming anionic polymer or at least one IPN forming galactomannan, wherein there are no covalent bonds between the at least two IPN forming polymers;
(ii) at least one cross-linking agent which interacts with the at least one IPN forming anionic polymer and at least one cross-linking agent which interacts with the second IPN forming anionic polymer or IPN forming galactomannan (i) to form an IPN; and
(iii) at least one non-toxic gas generating agent, wherein the gas generating agent forms a non-toxic gas when exposed to stomach acid,
wherein the at least one IPN forming anionic polymer is gellan gum, and wherein the at least second, different, IPN forming anionic polymer, is carrageenan and/or xanthan gum;
or the at least one IPN forming galactomannan is fenugreek gum or guar gum, wherein following oral ingestion, the composition self-assembles into a floating IPN in situ, which comprises the drug-ion exchange resin complex and the non-toxic gas entrapped therein, thereby providing a floating IPN which further comprises the IPN-forming polymers individually cross-linked to cross-linking agent(s),
further wherein the at least one cross-linking agent which interacts with the at least one IPN forming anionic polymer is calcium carbonate or calcium chloride, and further wherein the at least one cross-linking agent which interacts with the second IPN forming anionic polymer or IPN forming galactomannan is calcium carbonate or calcium chloride, provided that the composition does not include a gamma hydroxybutyrate, its salts, hydrates, tautomers, or solvates, or complexes thereof.

* * * * *